Dec. 7, 1965    F. E. SAKALAY    3,222,652
SPECIAL-FUNCTION DATA PROCESSING
Filed Aug. 7, 1961    24 Sheets-Sheet 1

INVENTOR
FRED E. SAKALAY
BY Melvin P. Williams
AGENT

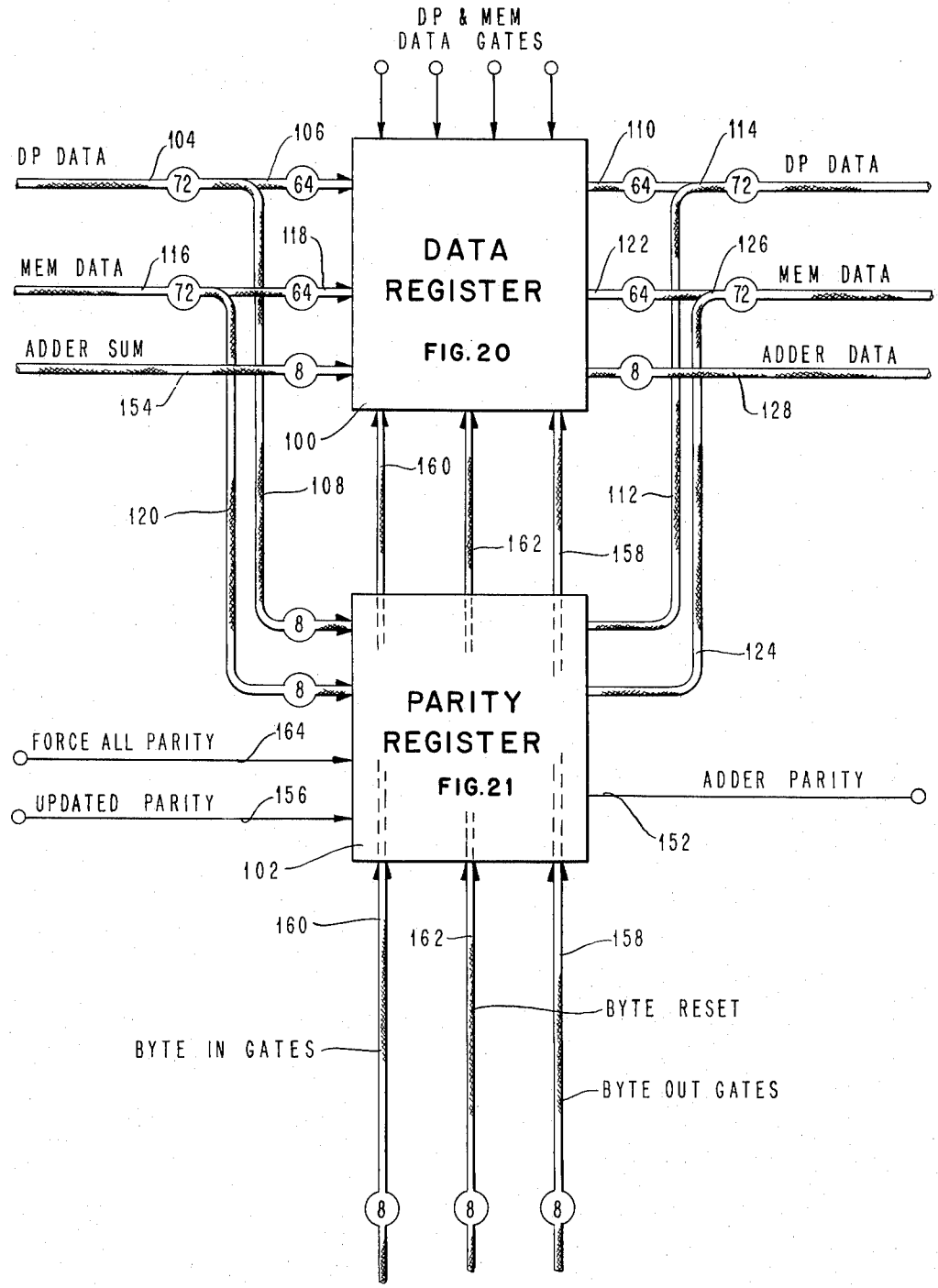

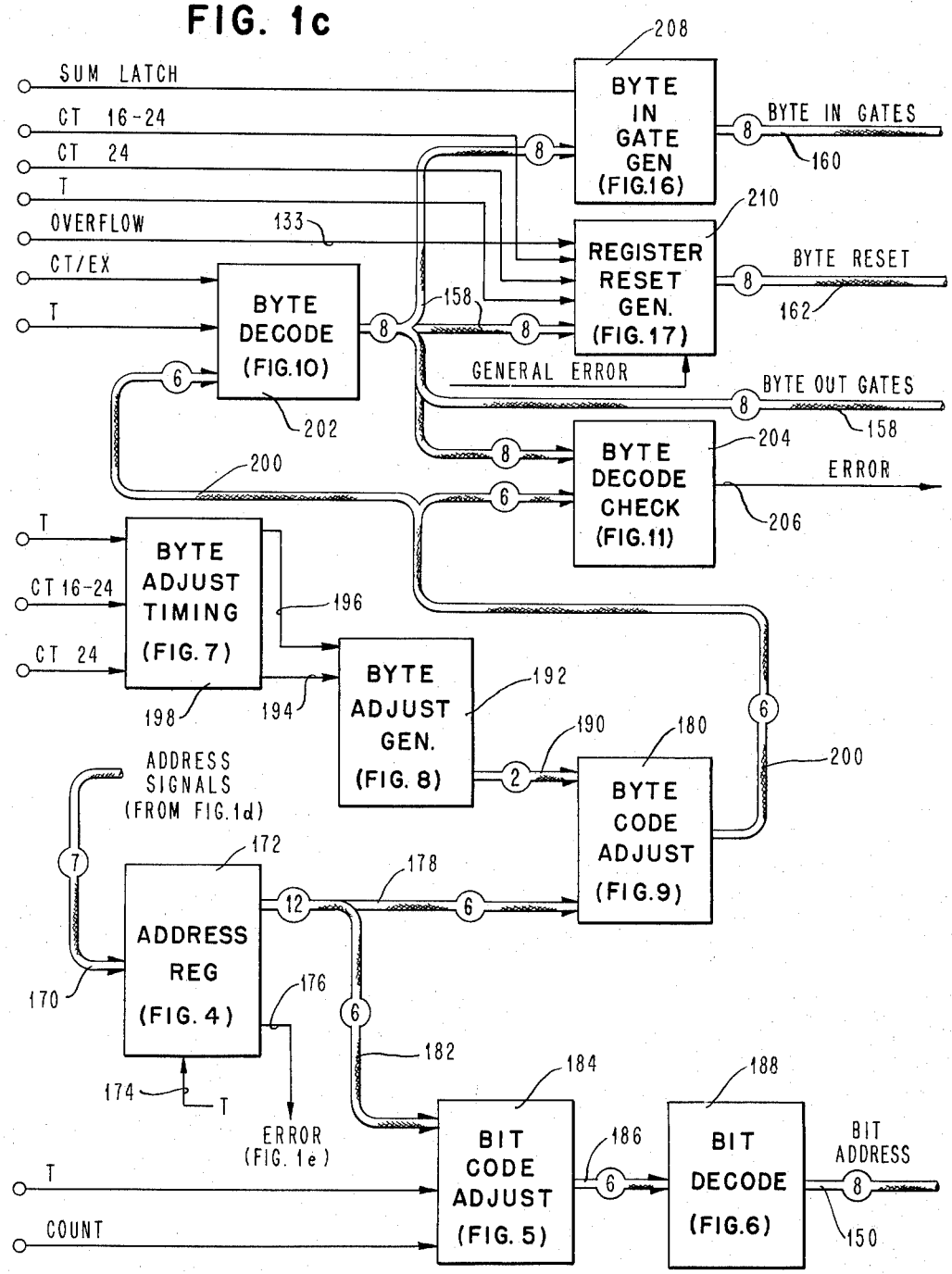

Dec. 7, 1965  F. E. SAKALAY  3,222,652
SPECIAL-FUNCTION DATA PROCESSING
Filed Aug. 7, 1961  24 Sheets-Sheet 4
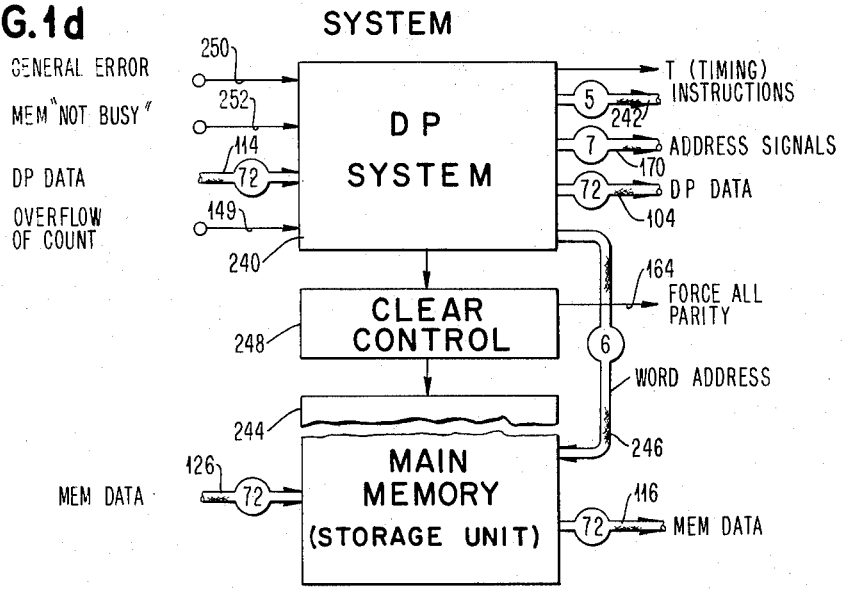
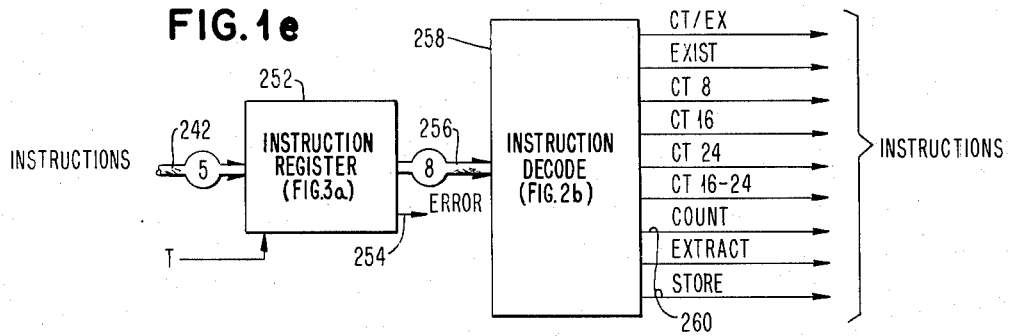
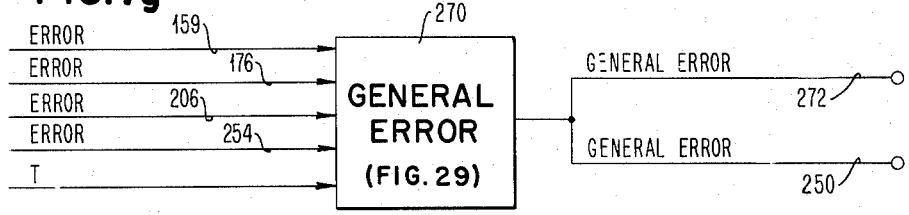
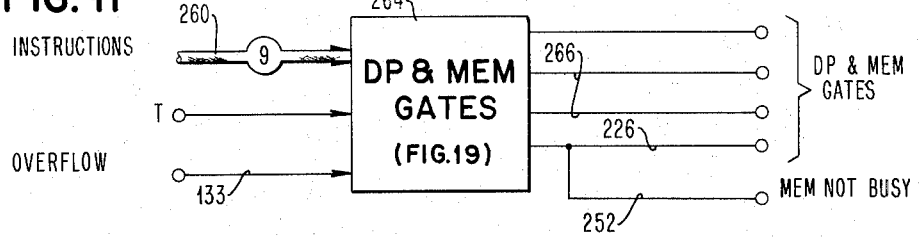

COUNT 24 OPERATION

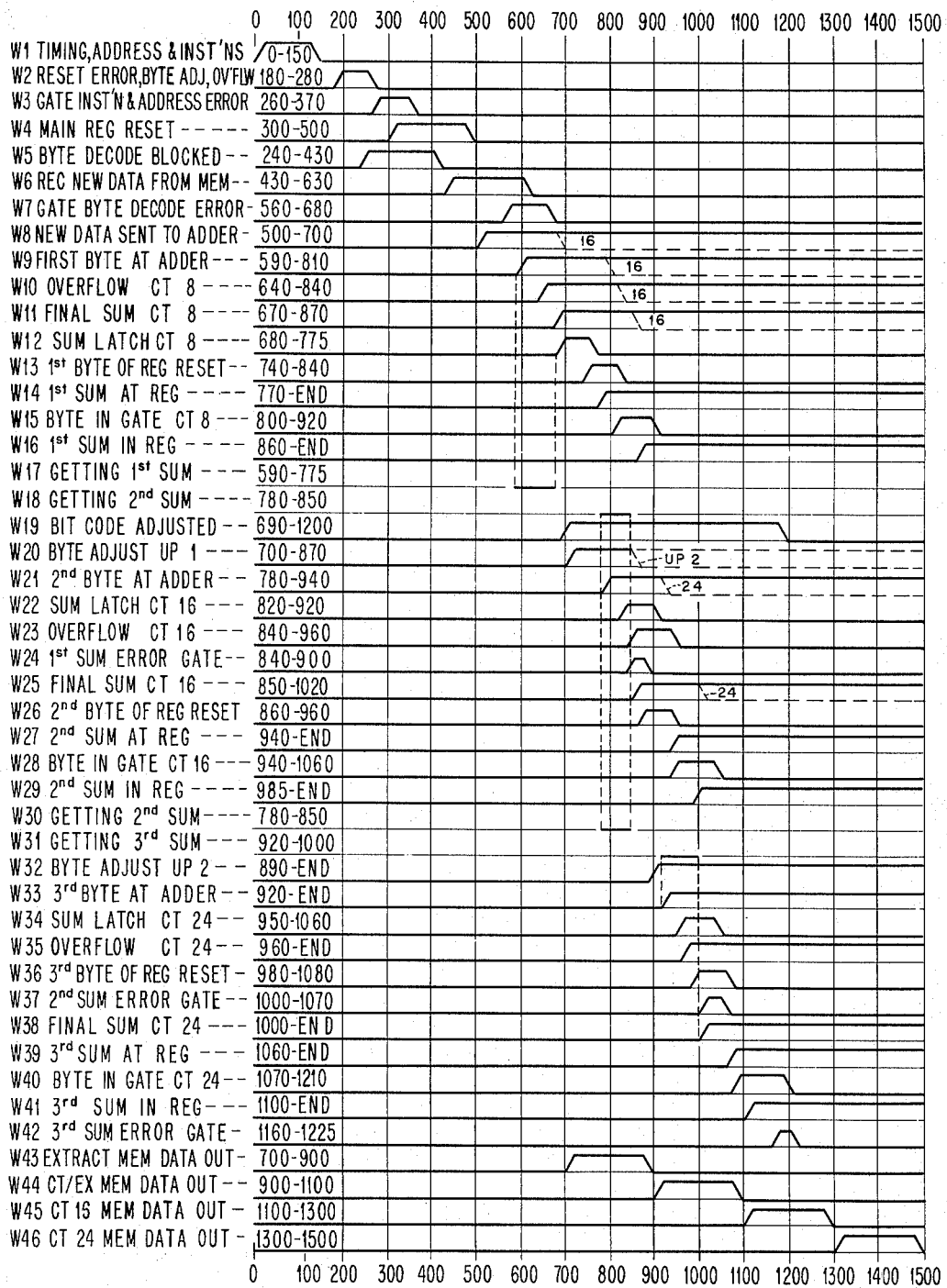

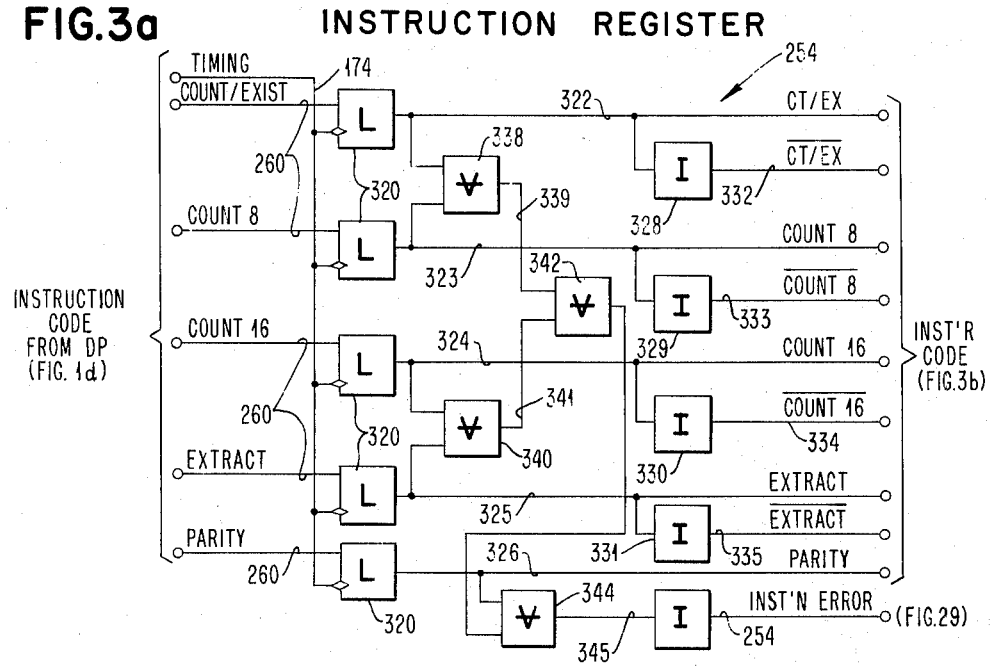
FIG.3a INSTRUCTION REGISTER
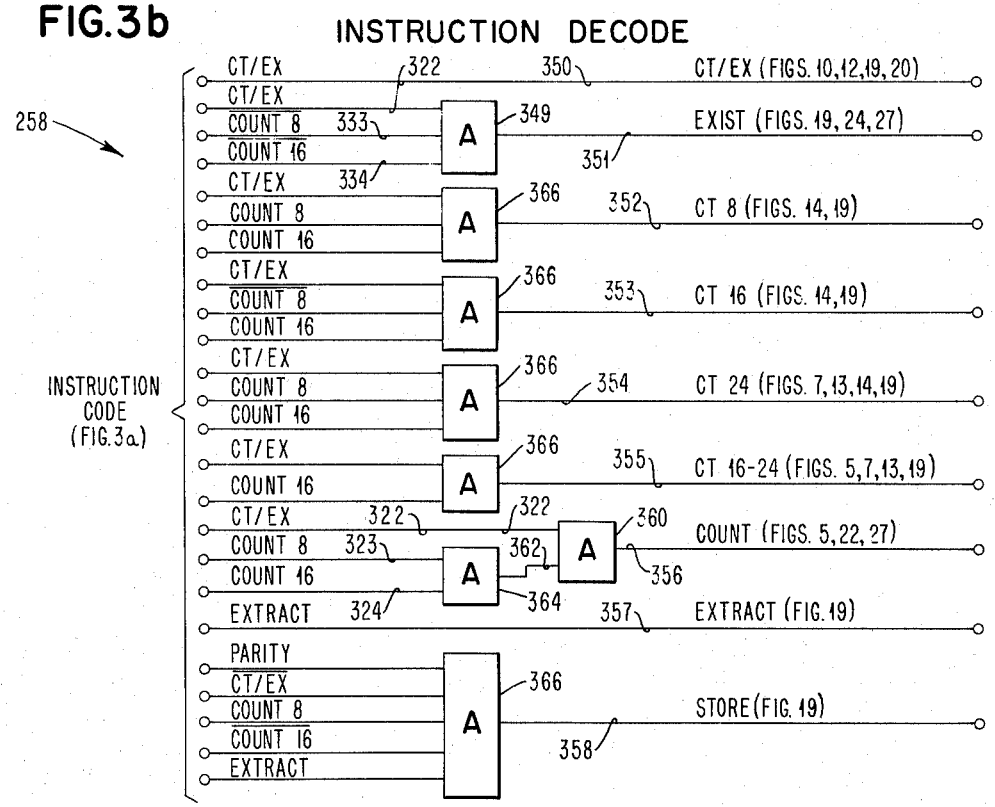
FIG.3b INSTRUCTION DECODE

Dec. 7, 1965  F. E. SAKALAY  3,222,652
SPECIAL-FUNCTION DATA PROCESSING
Filed Aug. 7, 1961  24 Sheets-Sheet 8
FIG. 4  ADDRESS REGISTER
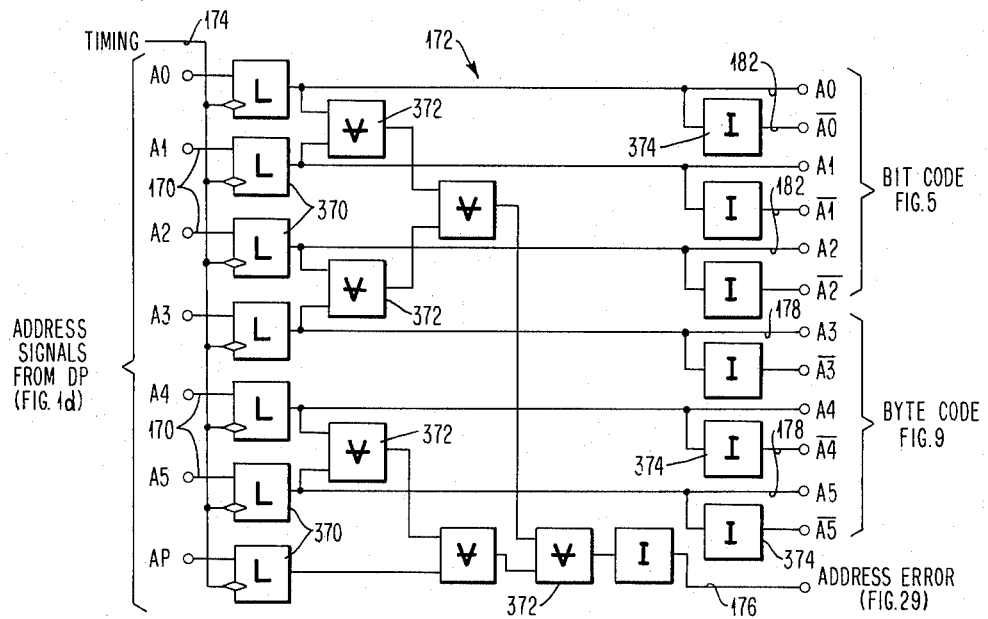
FIG. 5  BIT CODE ADJUST
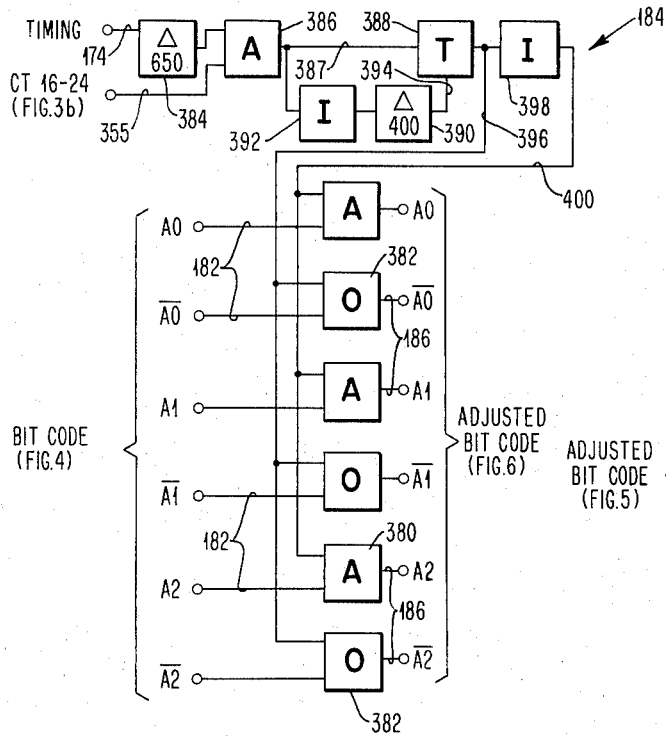
FIG. 6  BIT DECODE
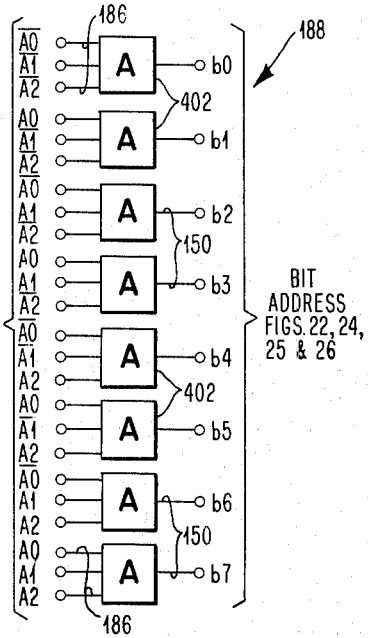

Dec. 7, 1965   F. E. SAKALAY   3,222,652
SPECIAL-FUNCTION DATA PROCESSING
Filed Aug. 7, 1961   24 Sheets-Sheet 9
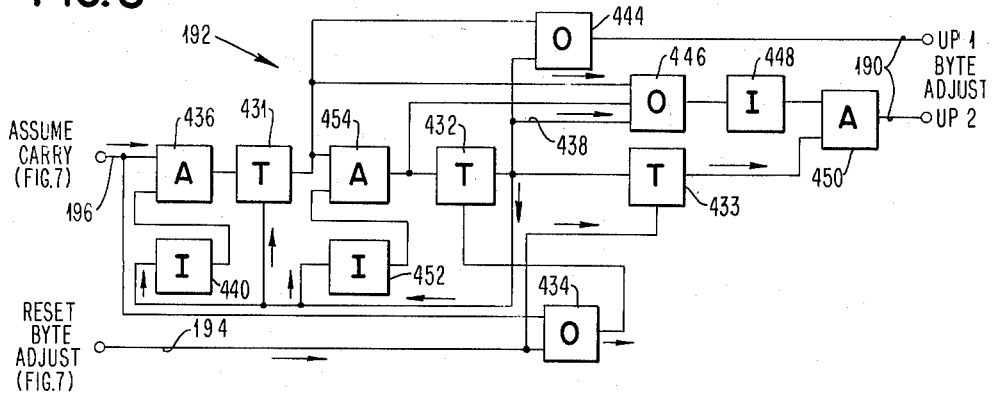
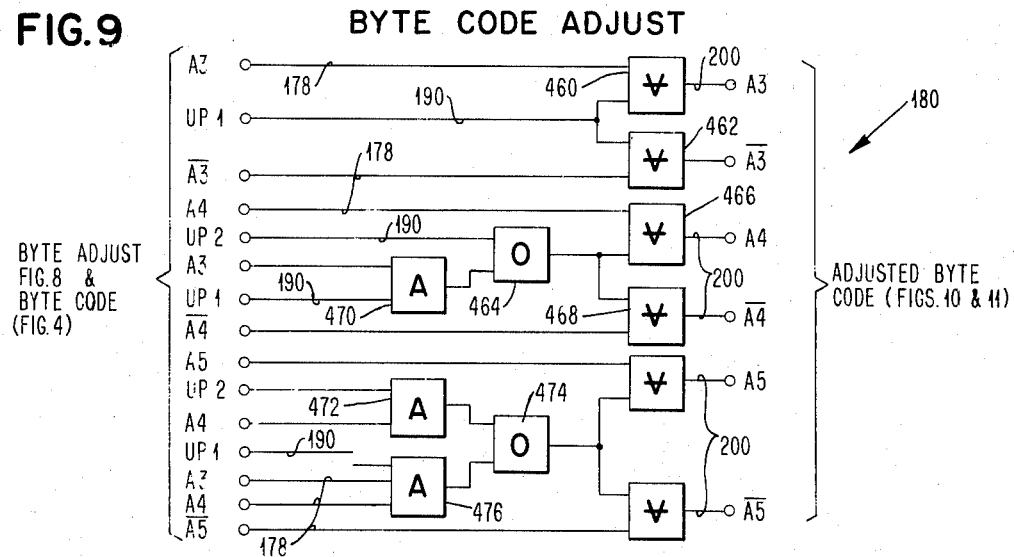
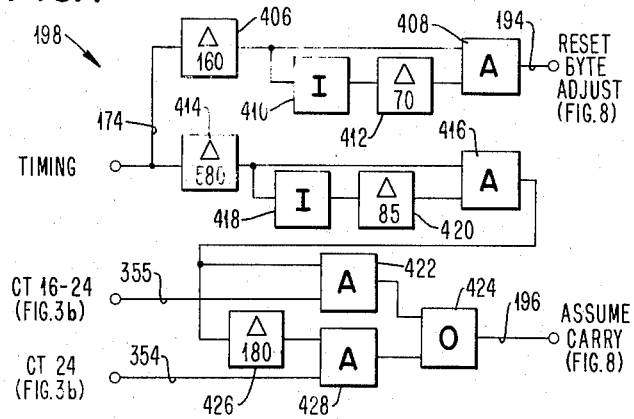

Dec. 7, 1965  F. E. SAKALAY  3,222,652
SPECIAL-FUNCTION DATA PROCESSING
Filed Aug. 7, 1961  24 Sheets-Sheet 10

Dec. 7, 1965  F. E. SAKALAY  3,222,652
SPECIAL-FUNCTION DATA PROCESSING
Filed Aug. 7, 1961  24 Sheets-Sheet 11
FIG. 12 — CARRY-OVERFLOW TIMING GENERATOR
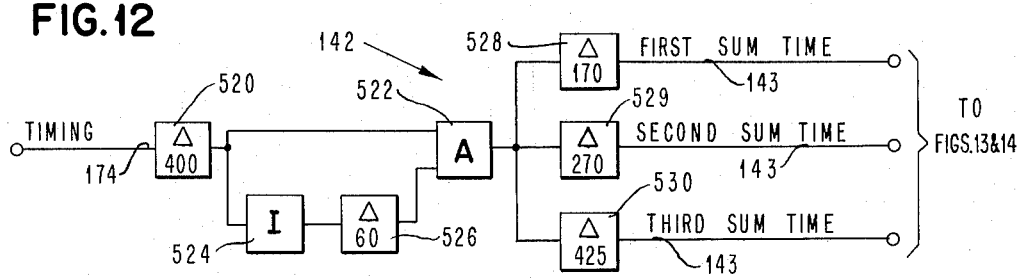
FIG. 13 — CARRY
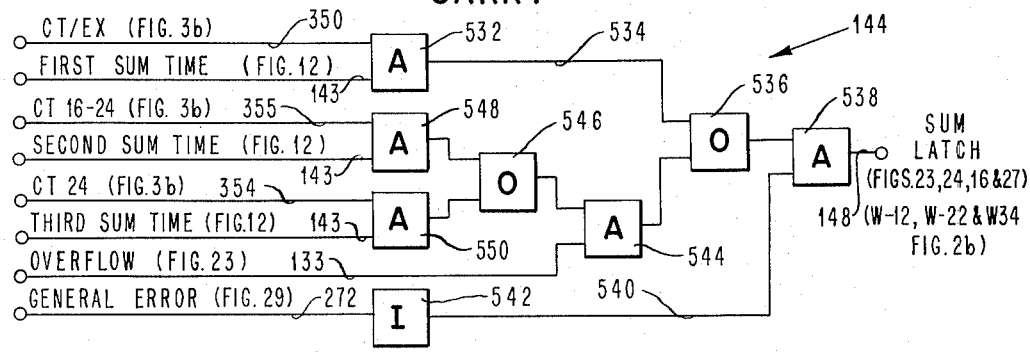
FIG. 14 — COUNT OVERFLOW
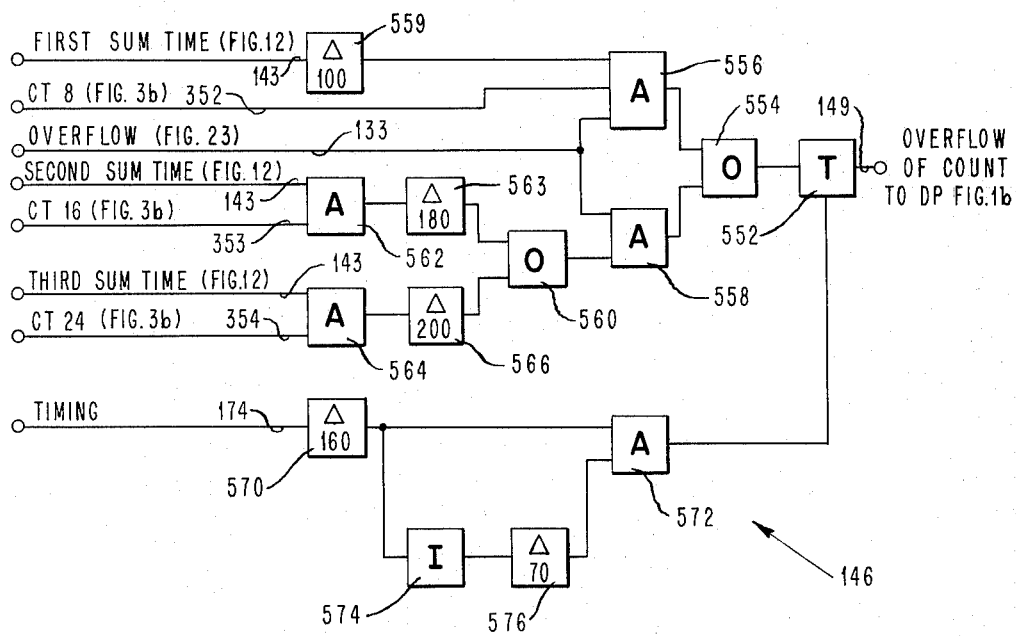

Dec. 7, 1965  F. E. SAKALAY  3,222,652
SPECIAL-FUNCTION DATA PROCESSING
Filed Aug. 7, 1961  24 Sheets-Sheet 12
FIG. 16 — BYTE IN GATE GENERATOR
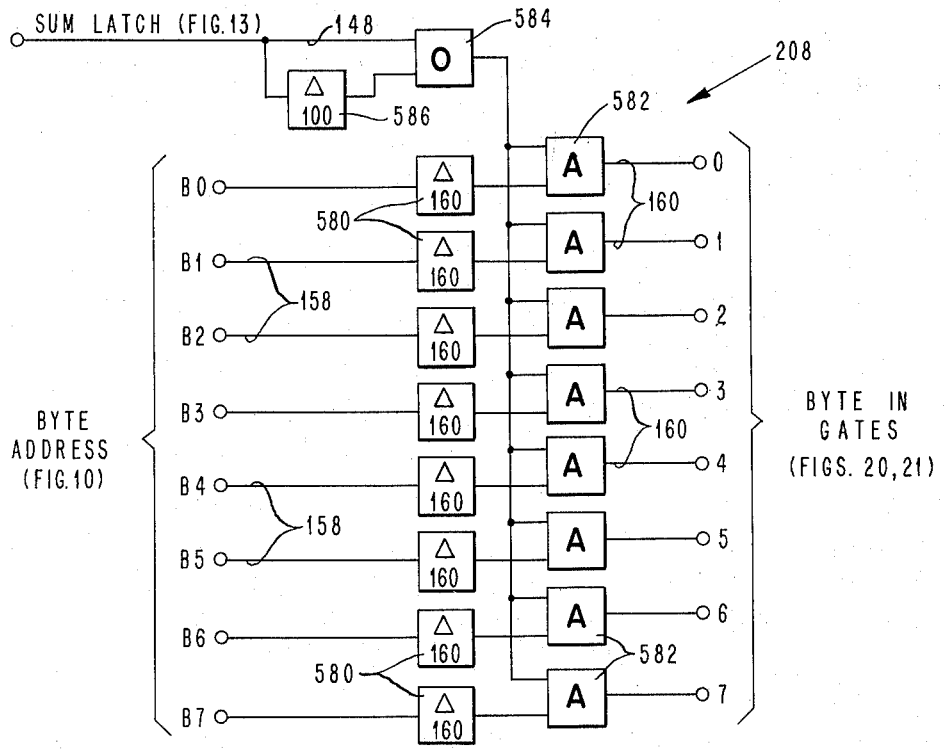
FIG. 15 — BYTE ADJUST TIMING
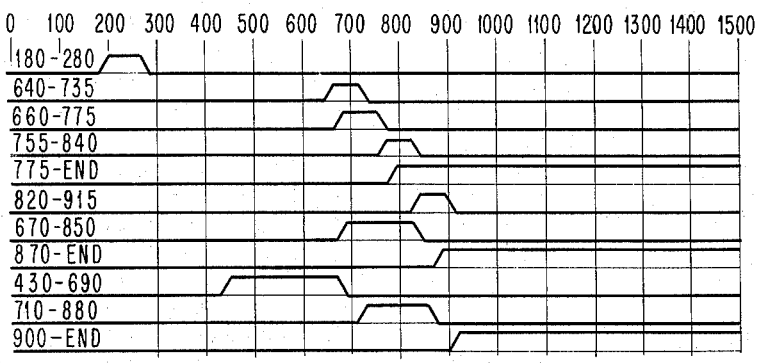
FIG. 18 — BYTE RESET TIMING
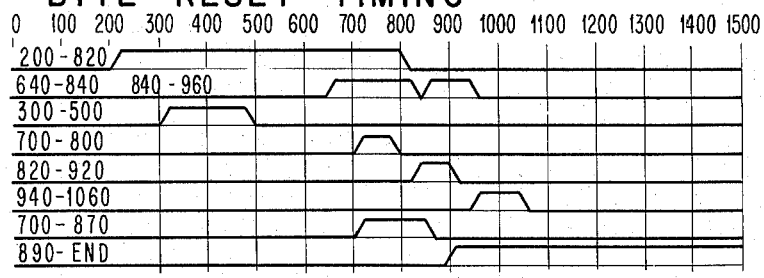

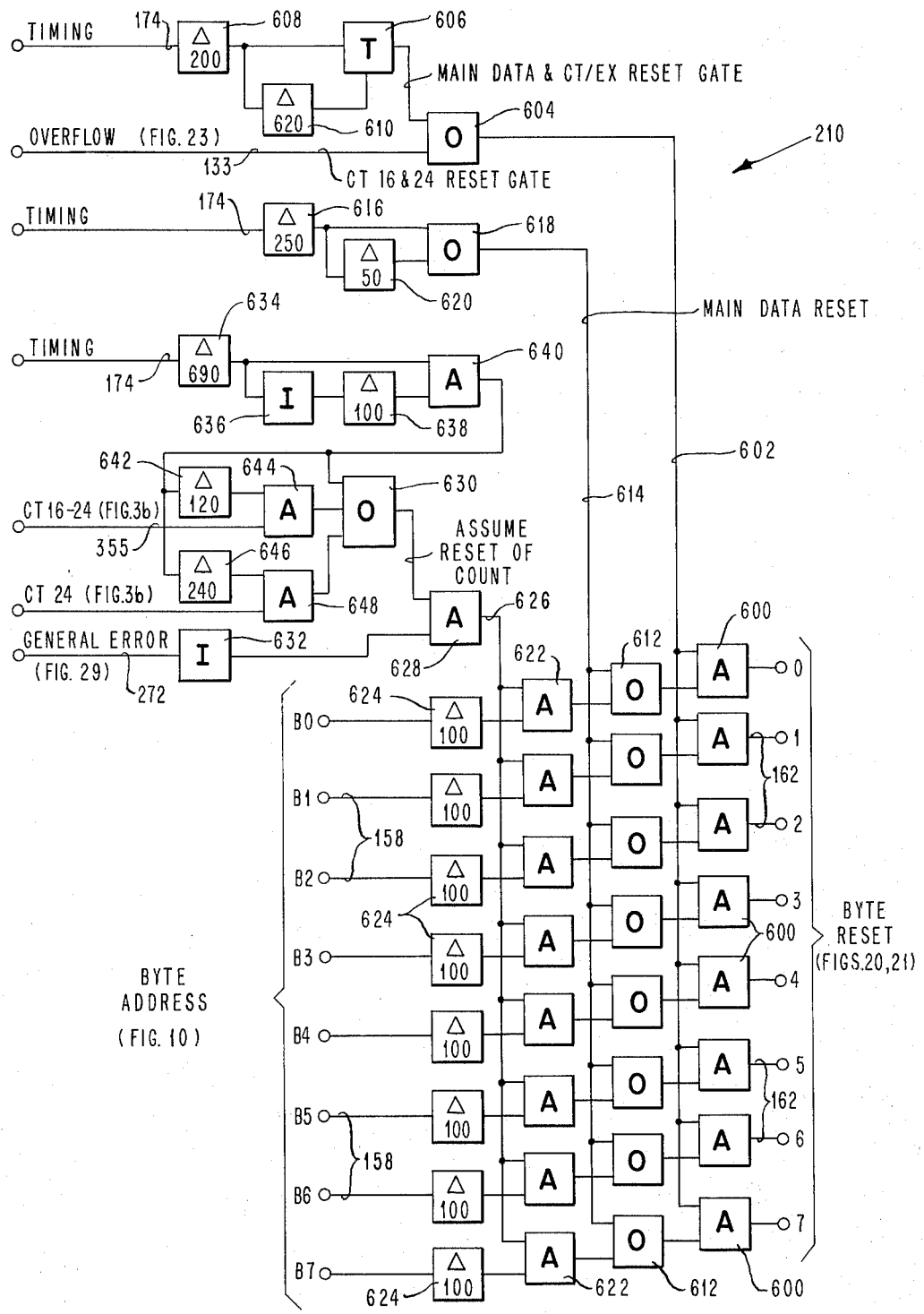
FIG. 17 REGISTER RESET GENERATOR

Dec. 7, 1965   F. E. SAKALAY   3,222,652
SPECIAL-FUNCTION DATA PROCESSING
Filed Aug. 7, 1961   24 Sheets-Sheet 14
FIG.19   DP AND MEM GATES
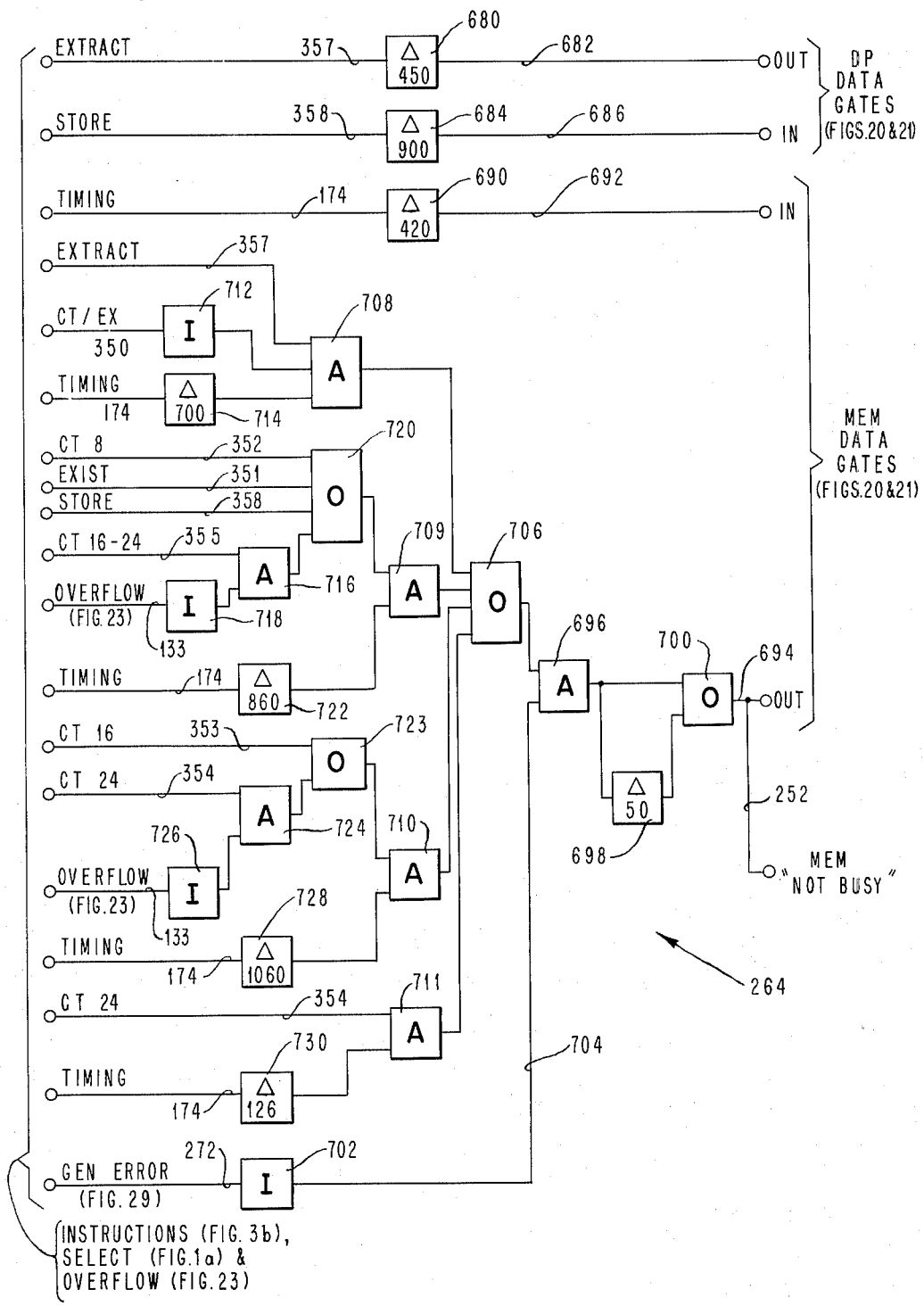

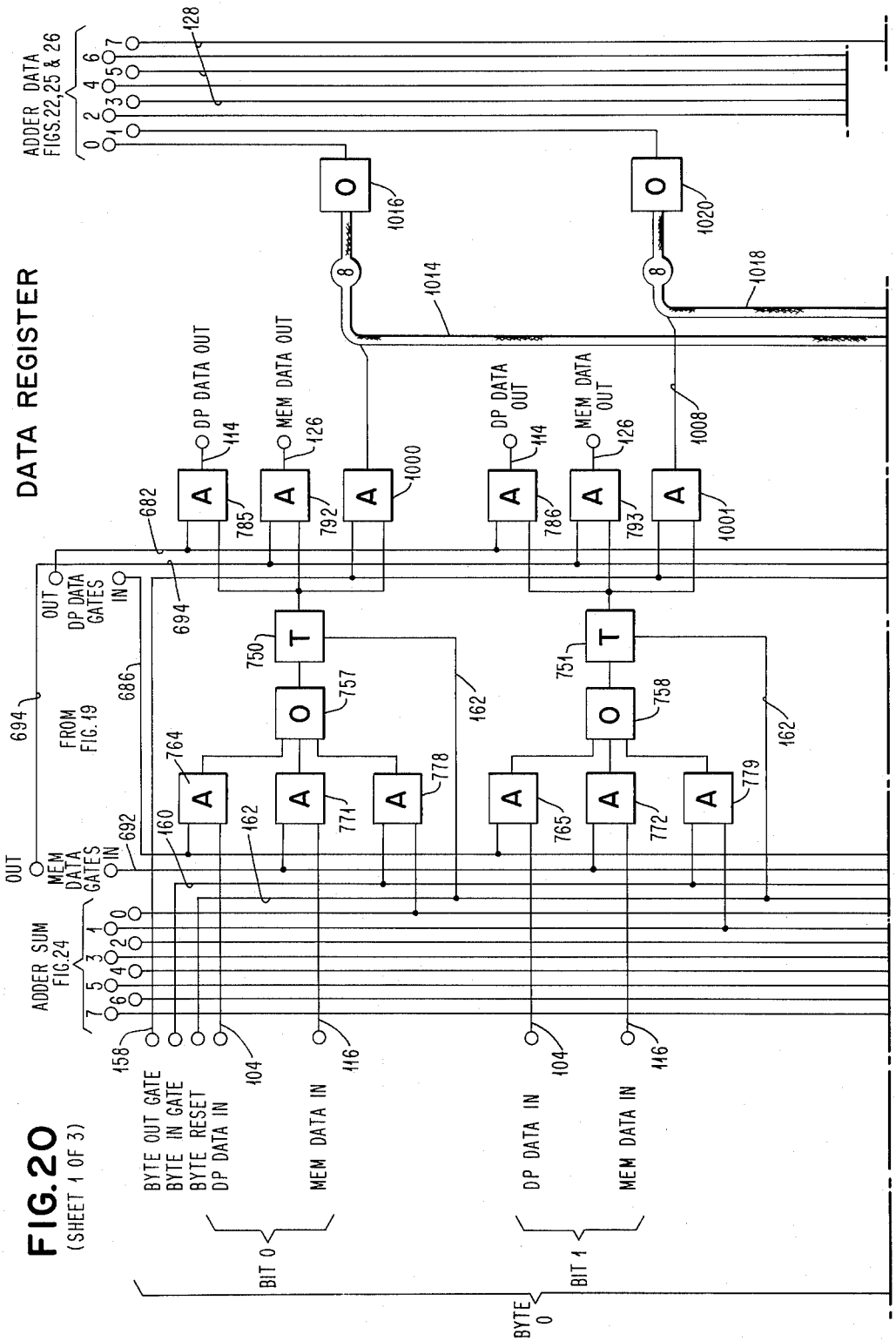

Dec. 7, 1965　　　　　F. E. SAKALAY　　　　　3,222,652
SPECIAL-FUNCTION DATA PROCESSING
Filed Aug. 7, 1961　　　　　　　　　　　　　24 Sheets-Sheet 16

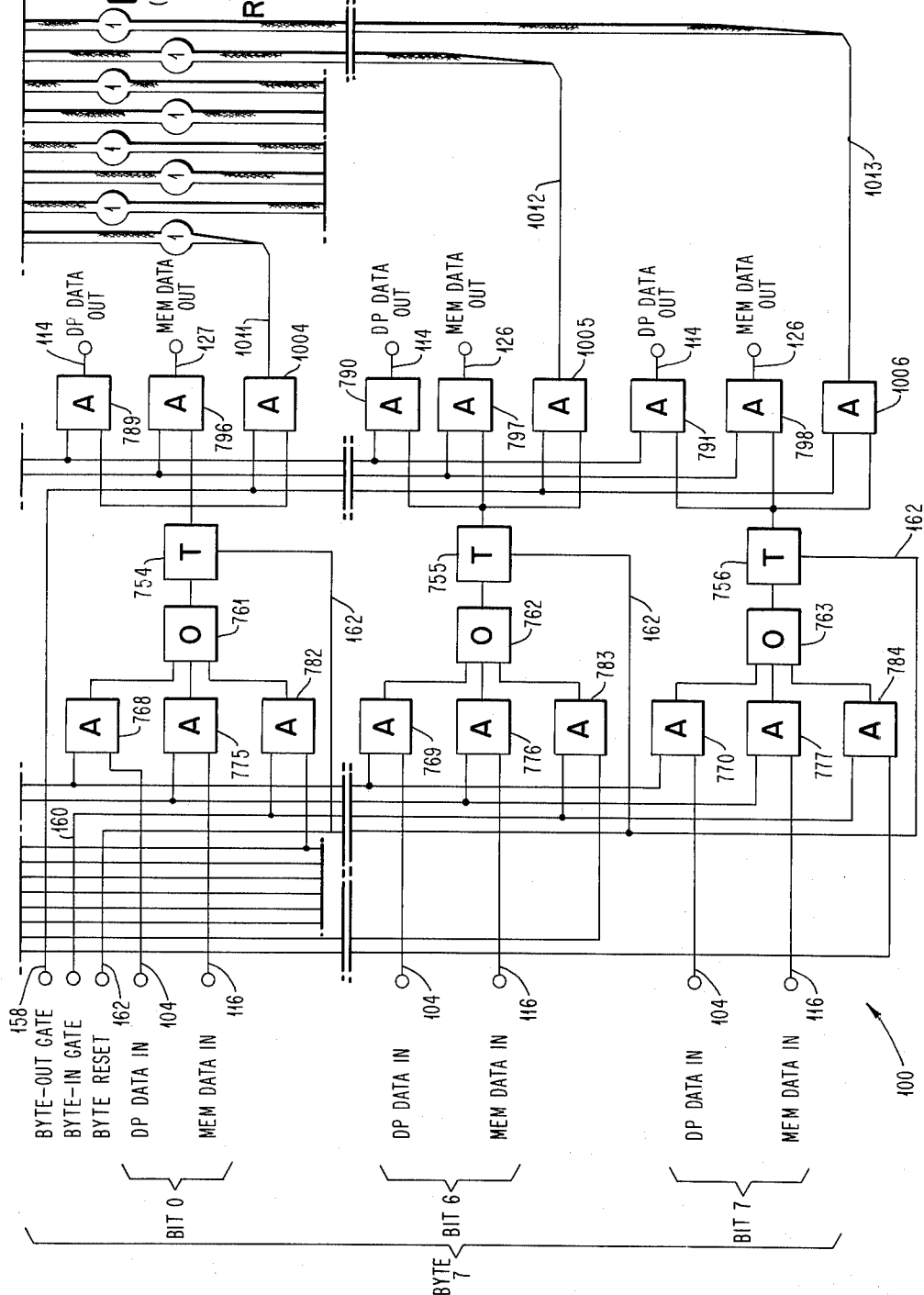

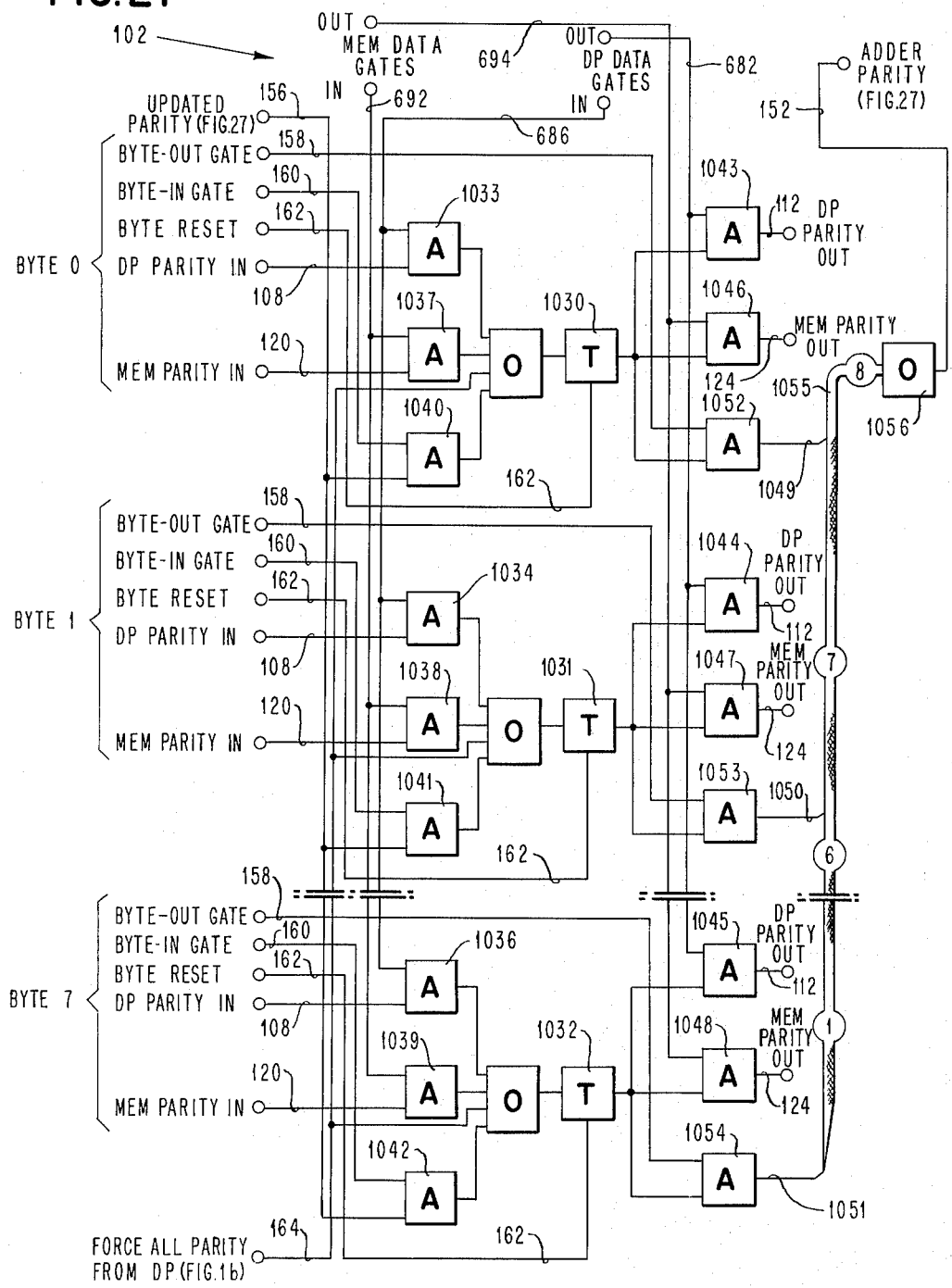

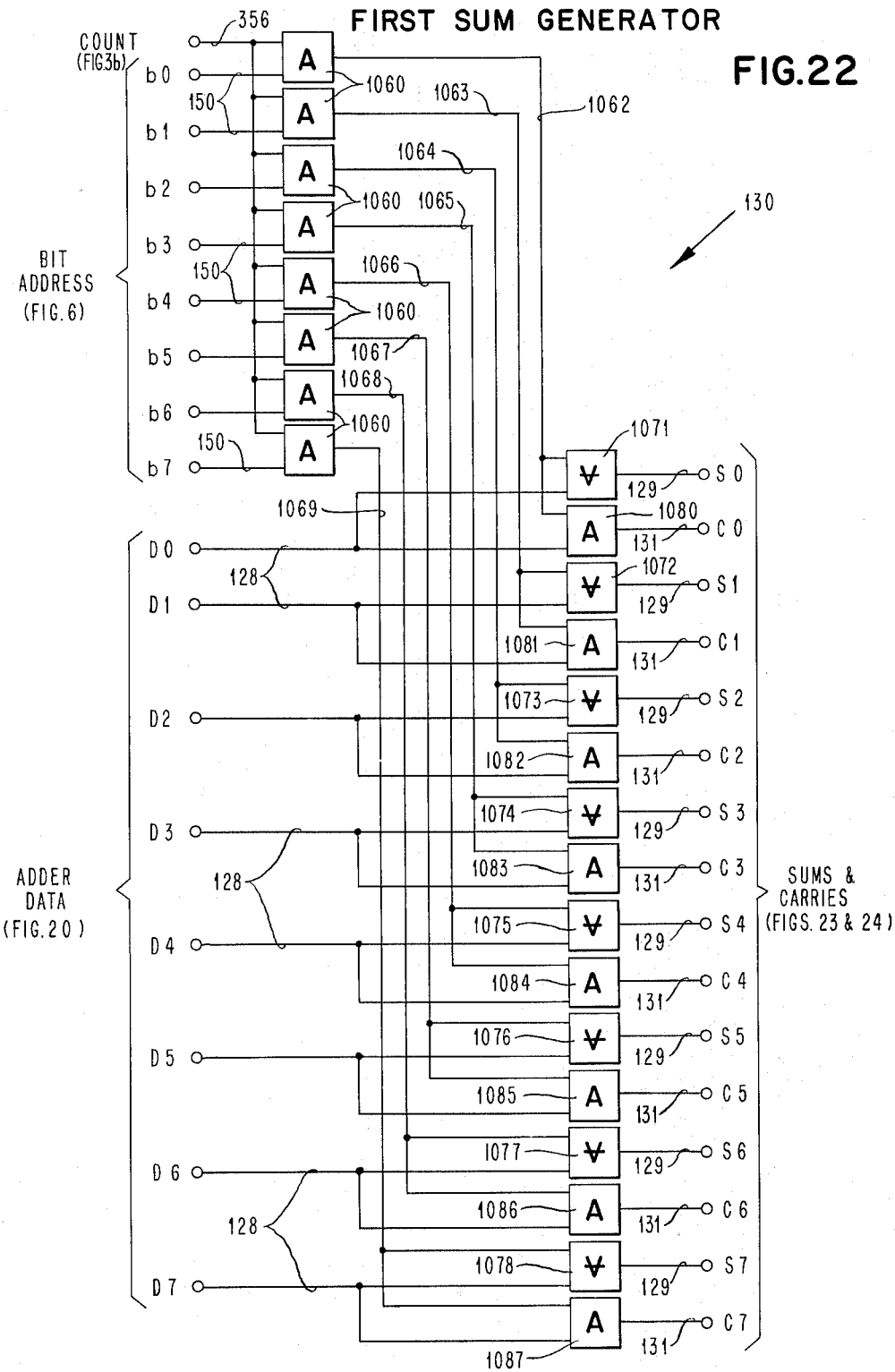

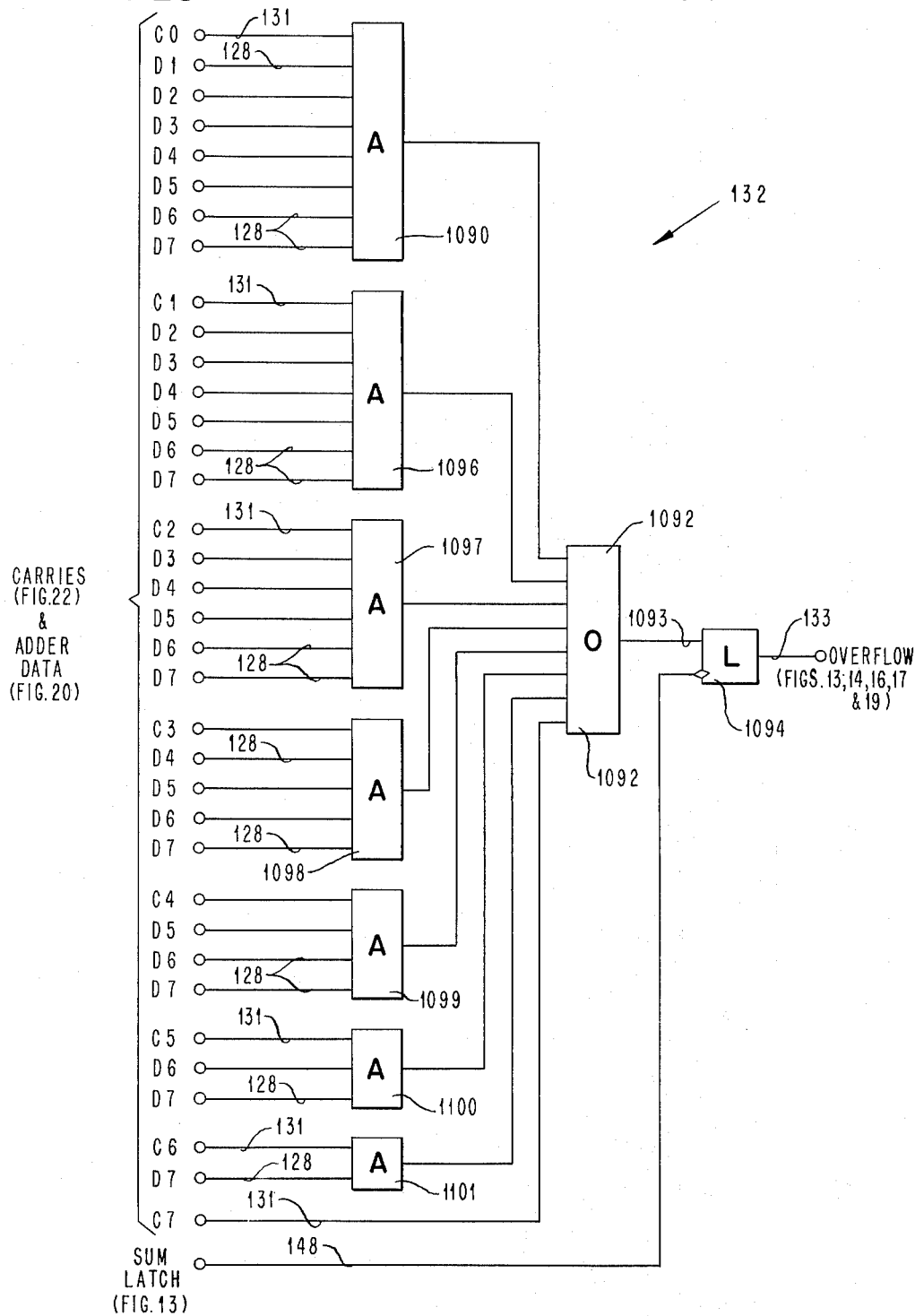
FIG. 23 OVERFLOW GENERATOR

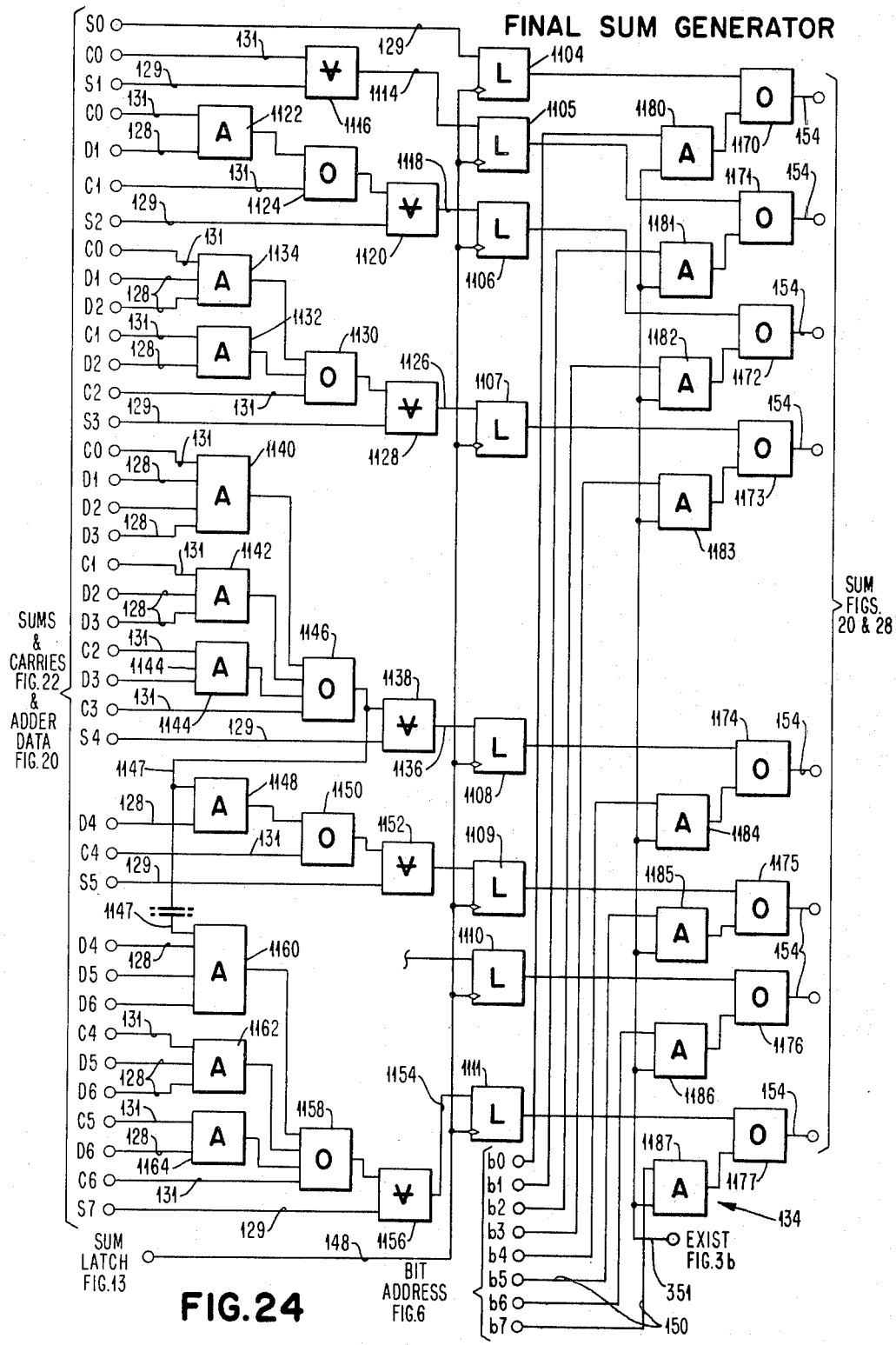
FIG.24 — FINAL SUM GENERATOR

Dec. 7, 1965  F. E. SAKALAY  3,222,652
SPECIAL-FUNCTION DATA PROCESSING
Filed Aug. 7, 1961  24 Sheets-Sheet 22
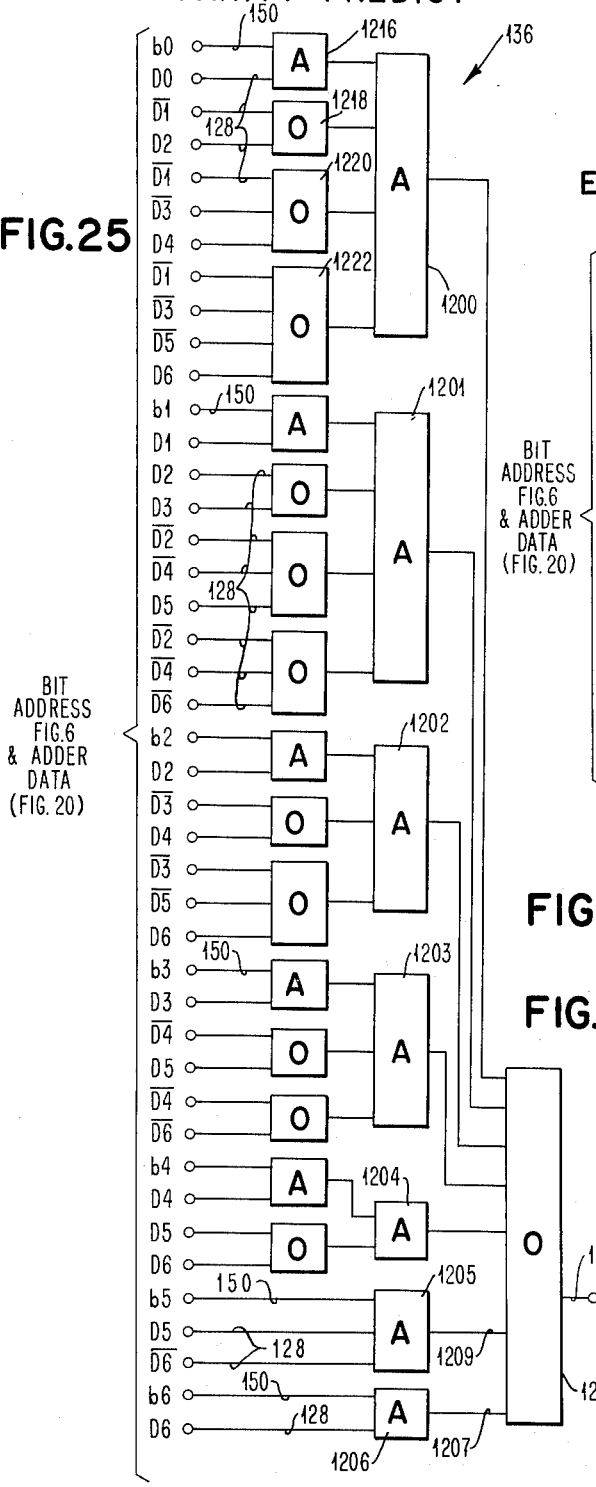
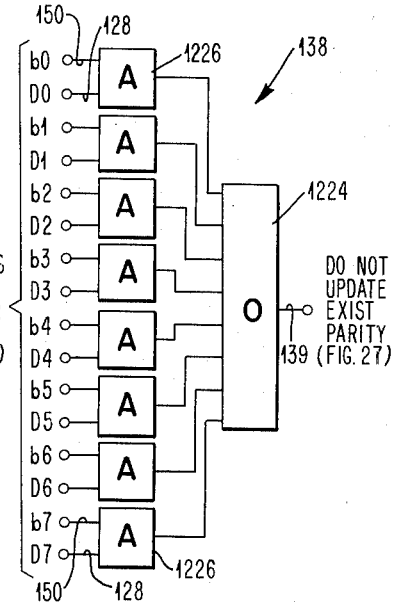

Dec. 7, 1965                F. E. SAKALAY                3,222,652
                    SPECIAL-FUNCTION DATA PROCESSING
Filed Aug. 7, 1961                              24 Sheets-Sheet 23
FIG. 27 — PARITY UPDATE
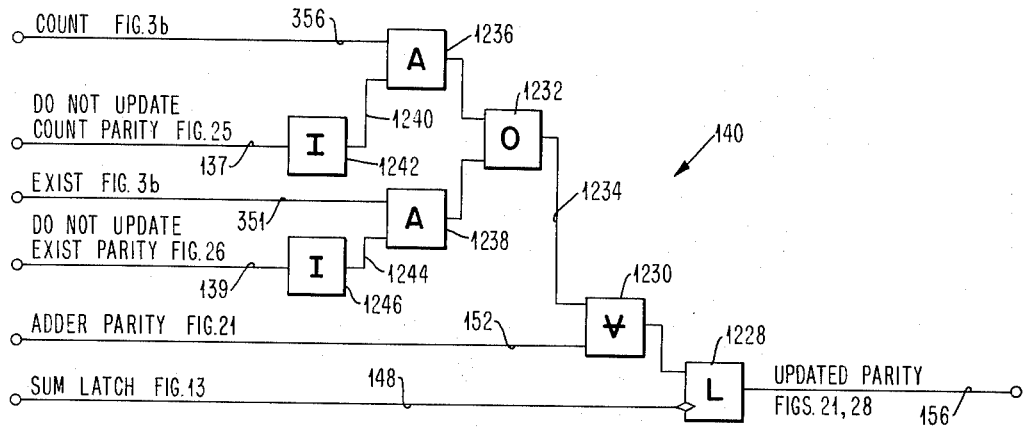
FIG. 28 — ADDER CHECK
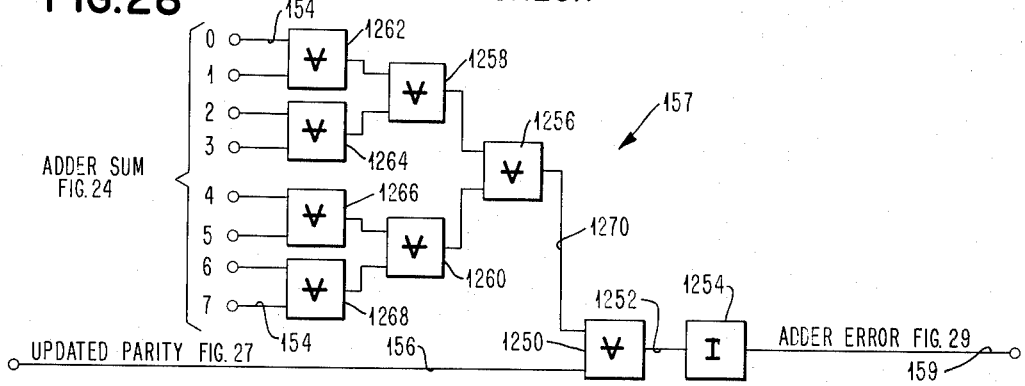
FIG. 29 — GENERAL ERROR
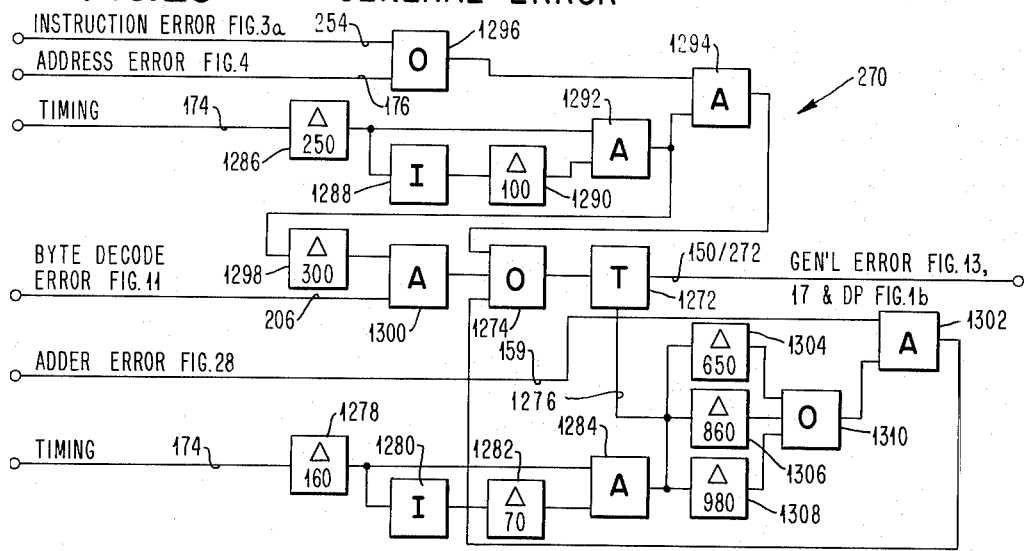

Dec. 7, 1965  F. E. SAKALAY  3,222,652
SPECIAL-FUNCTION DATA PROCESSING
Filed Aug. 7, 1961  24 Sheets-Sheet 24
FIG. 30a
LOGICAL LATCH
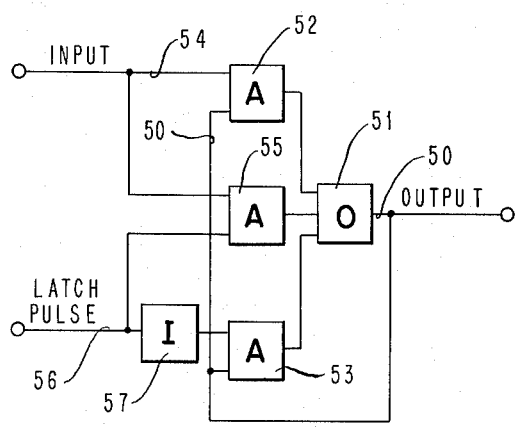
FIG. 30b
TYPICAL LATCH
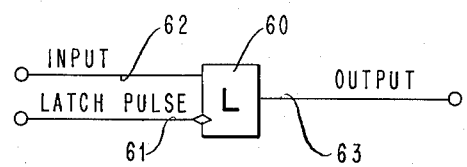
FIG. 31a
LOGICAL TRIGGER
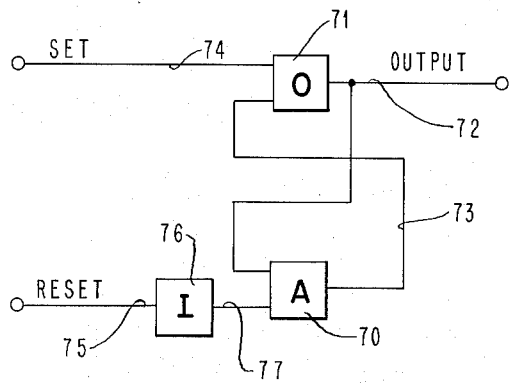
FIG. 31b
TYPICAL TRIGGER
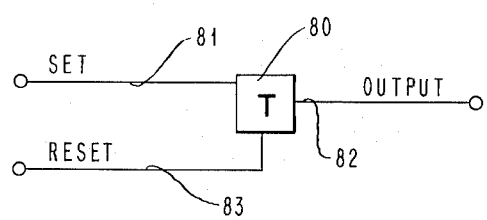
FIG. 32
ARRANGEMENT OF DATA
| PARITY | BYTE 7 | BYTE 2 | BYTE 1 | BYTE 0 |
|---|---|---|---|---|
| 7 6 5 4 3 2 1 0 | 7 6 5 4 3 2 1 0 | 7 6 5 4 3 2 1 0 | 7 6 5 4 3 2 1 0 | 7 6 5 4 3 2 1 0 |
← WORD →

United States Patent Office 3,222,652
Patented Dec. 7, 1965

3,222,652
SPECIAL-FUNCTION DATA PROCESSING
Fred E. Sakalay, Poughkeepsie, N.Y., assignor to International Business Machines Corporation, New York, N.Y., a corporation of New York
Filed Aug. 7, 1961, Ser. No. 129,687
13 Claims. (Cl. 340—172.5)

This invention relates to the performance of special data processing functions, and more particularly to the performance of special functions in high-speed data processing apparatus.

CONTENTS

| | Column |
|---|---|
| Introduction to Description | 8 |
| Arrangement of Data Words (Fig. 32) | 8 |
| Brief Sketch of Operation (Fig. 2a) | 8 |
| Logic Involved | 10 |
| Timing | 11 |
| Novel Latch (Figs. 30a and 30b) | 11 |
| Typical Trigger (Figs. 31a and 31b) | 12 |
| Block Description | 12 |
| Registers (Fig. 1b) | 12 |
| Special Function Circuits (Fig. 1a) | 13 |
| Address and Reset Circuits (Fig. 1c) | 15 |
| DP System and Main Memory (Fig. 1d) | 16 |
| Auxiliary Circuits (Figs. 1e–1g) | 17 |
| Detailed Description of Circuits | 17 |
| Instruction Register (Fig. 3a) | 17 |
| Instruction Decode (Fig. 3b) | 18 |
| Address Register (Fig. 4) | 19 |
| Bit Code Adjust (Fig. 5) | 19 |
| Bit Decode (Fig. 6) | 20 |
| Byte Adjust Timing (Fig. 7) | 20 |
| Byte Adjust Generator (Fig. 8) | 20 |
| Byte Code Adjust (Fig. 9) | 22 |
| Byte Decode (Fig. 10) | 23 |
| Byte Decode Check (Fig. 11) | 24 |
| Carry Overflow Timing Generator (Fig. 12) | 24 |
| Carry Circuit (Fig. 13) | 24 |
| Count Overflow (Fig. 14) | 25 |
| Byte-in Gate Generator (Fig. 16) | 26 |
| Register Reset Generator (Fig. 17) | 26 |
| DP and Memory Gates (Fig. 19) | 27 |
| Data Register (Fig. 20) | 28 |
| Parity Register (Fig. 21) | 29 |
| First Sum Generator (Fig. 22) | 30 |
| Overflow Generator (Fig. 23) | 30 |
| Final Sum Generator (Fig. 24) | 31 |
| Count Parity Predict (Fig. 25) | 34 |
| Exist Parity Predict (Fig. 26) | 36 |
| Parity Update (Fig. 27) | 37 |
| Adder Check (Fig. 28) | 38 |
| General Error (Fig. 29) | 38 |

In data processing, many forms of computer systems are known. In many cases, a computer system comprises a main computing unit, together with input and output units and one or more auxiliary storage unit. It is common to provide for a storage unit which is separate from the computing unit, which, together with distinct input and output devices, provides maximum versatility of the data processing system. The data which is maintained in the storage unit may be called to the main computing unit and be altered or interrogated and then returned to the storage unit. In this manner, the functions which may be performed with or upon the data in storage are limited only by the programming capabilities of the main computing unit. However, in order to perform operations upon data, it is necessary to first retrieve the data from the storage unit and propagate it to the main computing unit, then to utilize the data to perform such functions as are necessary, and thereafter repropagate the data back into the storage unit.

In many storage devices, data read out of the storage device is inherently destroyed by the form of reading operation. Therefore, a usual type of storage device provides for extracting the data from storage, and then regenerating the data by having the original data rewritten into storage. Thus, the data destroyed by being extracted is replaced by a regenerative writing operation. The time required for extracting and regenerating the data is generally additional to such time as the computer requires to perform operations on the data once the data is received in the computing unit. Similarly, once the data has been operated upon, additional time is necessary to send that data back to the storage unit before calling a new set of data from the storage unit for use in the computing unit.

Thus, performing operations on information stored requires three different units of time, i.e., time to extract the data from storage, simultaneously regenerate it and propagate it to the computing unit, time to perform the necessary operations, and time to return the data (either the original data or altered data) to the storage unit.

As the speeds of data processing equipment increase, and the basic unit of machine time becomes less and less, the proportion of machine time which is required to transmit or propagate data between units becomes greater. For instance, in one milli-microsecond, an electric signal will travel along a wire only about one foot. Therefore, a machine which performs operations in tens of milli-microseconds may lose ten to thirty percent of its time waiting for electrical signals to propagate between units, or between units, or between various parts within a single unit of the data processing system.

As the need for faster and faster machines has increased, ways have been sought to provide for increased data processing speeds, including ways of reducing the time lost in propagating data between the storage and computing units. One way in which this time has been reduced is to operate the data processing system in overlap fashion; this means that the computing unit simultaneously sends a first set of data back to the storage unit, operates upon a first subsequent set of data, and calls for a second subsequent set of data. However, this requires programming a whole series of operations well in advance of the actual handling of the data, which prevents alteration of the program as a result of the function performed on a given set of data, and also prevents rapid handling of a single unit of data. Still further, the overlap method renders the times necessary for propagation to and from the computing unit and the time necessary for the computing unit to utilize data, all dependent upon one another. Thus, if a simple operation is being performed by the computer, it may be finished before propagation is completed, and the computer thereby remains idle during valuable machine time.

Therefore, it is an object of this invention to reduce the propagation of information signals within a data processing system.

Other objects of the invention include the following:

Reducing the amount of time required for propagation of information within the data processing system;

Performing varied operations upon different ones of a series of data groups in sequence in a minimum of time;

Provision of a variable length cycle-time in a data processing system.

In many applications of data processing equipment, there are certain common repetitive operations which occur so frequently as to consume a considerable amount of the operating time of the data processing system. This not only takes up main computing unit time for operations which may be trivial, but also requires repetitive propagation of data which costs still more time.

Therefore, other objects include:

Reducing the amount of machine-cycle time necessary to perform special operations upon data in a data processing system;

Reducing the dependence of a data processing system on the computing unit for performing operations in response to or upon data which is retained in a storage unit of the data processing system;

Provision of special-function generating equipment, external of a computing unit of a data processing system, which is capable of performing operations on data contained in a storage unit without recourse to the computing unit;

Provision of a special-function generator which automatically utilizes only the amount of machine time necessary to actually perform the selected function;

Provision of data handling apparatus having a self-timing means for determining the amount of time necessary to perform the operation in advance of the performance thereof;

Performing special functions on data within a length of time allotted by the data processing system wherein the time is reduced if less than the alloted time is sufficient to perform the functions;

Provision of data handling apparatus having a means for predicting the amount of time required to perform an operation, and shortening the time during the performance of a function in response to further prediction.

Data processing systems are frequently used in the analysis of statistics, wherein data is accumulated in various forms and then different significant aspects of the data are recognized and correlated into groups, which may eventually result in lists, tables, or merely in total figures. For instance, a company may keep statistics on its employees and may desire to know how many times each of its employees or families have made a claim under a medical benefits provision during a preceding year. In order to achieve this, a portion of storage could be designated for each employee, and a "1" could be added to the data held in that portion for each claim made. This, of course, requires transferring the data from the storage portion to an adding device (which is typically part of the main computing unit), adding to the data, and returning the data to storage. The operation therefore requires the type of objectionable propagation time described hereinbefore. Thus, a "1" would be entered to the data whenever a claim was made without regard to either how many claims were made, or even whether or not a prior claim was made at all.

Alternatively, it may also be desired to count the number of employee-families which have made claims without regard to the number of claims made by each individual family. For this information, it is not necessary to know how many claims any one family may have made, but just whether or not one or more claims have been made. Therefore, it might be desirable to limit the size of a storage portion to a single bit which would indicate the fact of "one or more" claims having been made. Thereafter, whenever a claim was made by the employee (or his family), it would be necessary to either add a "1" into that particular storage location which designates the particular employee concerned, if the first claim is being made or, contrarywise, to not add into that bit position if a claim had already been made, since adding operation would change the data so stored.

Other objects include:

Provision of a novel means for accumulating data in a data processing system;

Provision of means to quarantee the presence of data without access to knowledge of whether or not said data is or should have been present prior to the time of such guarantee;

Provision of means for adding into a data bit position in dependence upon the bit position being initially set to zero;

Provision of means to selectively either add into or guarantee the existence of a bit in a given data bit position.

Another common statistical problem is that many types of data may have to be computed, analyzed and stored. For instance, data may include some informative content which, in coded form, would require many bit positions of storage, and other data (such as the counting of a relatively few occurrences as in the medical claims referred to hereinbefore) may require relatively few or perhaps even only one storage location. The usual storage apparatus is subdivided into portions which may be called "words." These word portions are related to the physical structure in such a way as to be fixed in size; for instance, the electronic circuits for writing into and reading from the storage apparatus is word-oriented, and energization of specific circuits will cause an entire word to be affected. In the statistical analysis of medical claims (as in the example above), prior statistics may show that less than eight claims would be made by each family and, therefore, three binary bit positions would be sufficient to count all the claims made by any one family. Since it is most advantageous not to utilize any more storage space than necessary, a simple means of limiting the number of positions of storage within which data on each employee-family would be accumulated is desirable. Within the computing unit of a data processing system, the high versatility of advanced programming devices permit random size storage and selectively limited or expanded computing facility size. However, simpler devices, such as a basic adder unit, cannot recognize different word lengths, that is, different-sized groups of data bits, but merely respond to such data bits as are applied to it. In order to minimize the cost of the system, it is advantageous to use as little equipment as possible.

An object of this invention is provision of data handling apparatus capable of easily dividing large groups of data into various-sized subgroups.

Another object is provision of means of performing an alteration operation upon a first one of a series of data groups, and conditionally performing alteration operations on subsequent ones of said series of data groups sequentially in dependence upon the outcome of the alteration performed on said first one.

A further object is to provide an adding apparatus having a definite word-length capacity which can accumulate data in word groups of a greater length than that of said capacity.

In performing special functions on data with simplified equipment so as to avoid the necessity of translating data to and from a computing unit, each of the problems aforementioned is further compounded. For instance, if maximum flexibility were provided in a function-performing means located within the memory unit of a data processing system, it would be so large as to require being actually remote from the memory unit, since only so much apparatus can fit into a given amount of space. Therefore, to achieve the desirability of reducing time in data processing systems by eliminating propagation, it is necessary that any function-performing means be relatively simple and compact so as to facilitate location within a memory unit. Therefore, the need arises for a simple function-performing means, which can utilize a minimum amount of apparatus to satisfy the different word-length requirements in performing routine operations of modern statistical analysis, and each function of which operates in a minimum length of time.

Further objects include:

Providing improved logic circuits for use in high speed data processing apparatus;

Providing a data processing system which performs operations on successive ones of a sequence of data groups without apparatus set-up time interspersed between operations;

Performing an operation on a selected one of a plurality of related data bits, and predicting the effect of such performance upon other ones of said related group in advance of the completion of the performance of said function;

Providing means for predicting the parity which will result from adding into any selected one of a sequence of data positions, without regard to which one is selected;

Providing such a parity predicting device which operates in a minimum of time.

A still further object is to provide an improved registering means which is capable of holding data while simultaneously having different data at the input thereof, and which is capable of responding to the presence or absence of the data without being previously reset so as to change the data designation manifested thereby in accordance with signals at the input thereof, selectively, upon command of a timing signal.

In accordance with the present invention, data stored in the memory unit of a data processing system is altered by high speed special-function performing apparatus, eliminating the necessity of transferring data to the computing unit of the data processing system in order to have alteration operations performed thereon.

The invention permits use of simple equipment, which equipment can be associated directly with the storage unit of a data processing system, thereby eliminating the need for excessive propagation time normally required in sending data to a computing unit system. Further, the special functions which are performed in accordance with the present invention may be performed in little more time than the time normally allocated to retrieving data from storage, and regenerating the data in the storage means.

Specifically, this invention provides means for extracting data from a memory unit without performing any operation on the data in a minimum length of time. It further provides for performing operations on the data with or without simultaneously extracting data as originally written, or as modified, from the storage apparatus. Further, this invention can either add data or not, determined by whether or not data was originally stored in a particular place, or can alternatively add data without regard to whether or not data was present in the first place.

The first main function of the present invention which will hereinafter be referred to as COUNT, is the function of adding a ONE to a particular selected bit of a selected group of bits, which group is hereinafter referred as a "byte." This includes updating the parity of the byte, as required. The COUNT function of the invention includes the capability of adding into any one of a sequence of bits, allowing the adding operation to propagate carries to successive bits. The number of successive bits through which carries will propagate may be selected, thus permitting selection of bit group (or word) size, giving greater flexibility to the word size characteristics of the machine. For instance, in one embodiment of this invention, a byte contains eight bits; a COUNT 8 operation permits carries with the eight bits of a byte; a COUNT 16 permits carries into a subsequent byte; and a COUNT 24 permits carries into two subsequent bytes. In any of these cases, carries may also propagate from the highest ordered byte into the lowest ordered byte, in "end-around" fashion, if desired. Furthermore, the number of bits through which carries may propagate can be foreshortened upon the determination of the fact that no carries are available for propagation into further subsequent bits, thereby giving the machine not only a variable length cycle, but also an automatically varying cycle which operates so as to effectuate adding within a minimum amount of time.

The second main function of the present invention, which will hereinafter be referred to as EXIST, is the function ensuring that a ONE does in fact exist in a particular bit position of a selected byte without regard to whether or not a ONE had previously been stored therein. This permits designating the presence or absence of a fact, repetitively, without in effect "adding" to the bit which would result in propagation of extraneous carries into adjacent subsequent bits thereby destroying information contained therein. This is accomplished by "ORing" the data bit selected with a ONE bit which is provided in response to a bit address, and updating parity if the bit is changed from ZERO to ONE. Thus, if there is a ONE, it remains a ONE, and if there is a ZERO, the ZERO is changed into a ONE. Since this is an "OR" operation, there is no possibility of carrying, and no carries or overflows, from the byte within which the bit is located into subsequent bytes, can possibly occur.

Therefore, this invention encompasses adding into a variable number of bit positions, which adding is hereinafter referred to as the COUNT function of the invention. The invention further encompasses guaranteeing the existence of a bit, which is hereinafter referred to as the EXIST function of the machine.

In further accordance with the present invention, improved logical circuits are provided which simplify function-responsive operation in a manner so as to not only reduce size and thereby improve propagation characteristics, but also perform functions in a minimum of time, thereby further enhancing the purpose of the invention, which is to increase overall data processing system speed. In fact, the speeds within which the logical circuits operate are sufficiently high so as to render the performing of operations within time periods which are just slightly in excess of the time it would take a computing unit to extract information from the storage apparatus.

The improved logical circuits include a logical latch circuit which can simultaneously contain a first designation of data and have a second designation of data applied at the input thereof, said logical latch responding to the input data upon the occurrence of a latching signal. The latch does away with reset time and with the necessity of special gating and other time consuming functions. The improvements of this invention further include circuitry to "predict" results and "assume" responses in order to generate further results and responses without waiting for a preliminary operation to be completed. Among these is an "assume carry" circuit which prepares a second byte of data, propagates a carry through it, and utilizes the result only if, by the time the result is ready, a carry out of a first byte has in fact occurred. There is also provided a high-speed parity predicting circuit which will update parity without waiting for the completion of a COUNT or EXIST operation.

The foregoing and other objects, features and advantages of the invention will be apparent from the following more particular description of a preferred embodiment thereof, as illustrated in the accompanying drawings.

In the drawings:

FIG. 1b is a block diagram of a data register for use with the means of FIG. 1a;

FIG. 1c is a block diagram of control means for the data register and the special function means of FIGS. 1a and 1b;

FIG. 1d is a simplified block diagram of a data processing system and memory unit of the type with which the embodiment shown in FIG. 1a may be adapted for use;

FIGS. 1e–1g are simplified block diagrams of instruction, gate, and error circuitry, respectively, for use with the apparatus of FIGS. 1a–1d;

FIG. 2b is a timing chart illustrating the operation of the device shown in FIGS. 1a–1g;

FIG. 3a is a simplified block diagram of a register for storing instruction signals received from the system of FIG. 1d for controlling the device of FIGS. 1a–1c;

FIG. 3b is a simplified schematic diagram of means for decoding the instructions stored in FIG. 3a;

FIG. 4 is a register for storing addresses received from the data processing system shown in FIG. 1d;

FIG. 5 is a simplified block diagram of a circuit for adjusting a bit portion of an address code stored in the address register shown in FIG. 4;

FIG. 6 is a simplified block diagram of a decoding circuit for decoding the bits adjusted by the circuit shown in FIG. 5;

FIG. 7 is a simplified block diagram of a timing circuit for controlling a byte adjusting circuit shown in FIG. 8;

FIG. 8 is a simplified block diagram of a circuit for generating signals used to adjust the code of the byte portion of the address signal stored in the address register of FIG. 4;

FIG. 9 is a simplified block diagram of a circuit for adjusting the byte code in response to code signals from the address register shown in FIG. 4 and control signals from the byte adjust generator shown in FIG. 8;

FIG. 9a is a code chart showing byte code adjustments;

FIG. 12 is a simplified block diagram of a circuit for generating timing pulses for a carry circuit shown in FIG. 13 and a count overflow circuit shown in FIG. 14;

FIG. 13 is a simplified block diagram of a circuit for generating "sum latch" signals in response to "carry" signals;

FIG. 14 is a simplified block diagram of a circuit for generating signals indicative of an overflow of the count function;

FIG. 15 is a simplified timing chart illustrating the timing of the byte adjusting circuits shown in FIGS. 7, 8 and 9;

FIG. 16 is a simplified block diagram illustrating a circuit for converting the output of the byte decode shown in FIG. 10 into byte gates to be applied to a data register shown in FIG. 20;

FIG. 17 is a simplified block diagram of a circuit for generating data register reset signals in response to timing, instruction and functional signals;

FIG. 18 is a simplified timing chart of the operation of a preferred embodiment of the device insofar as gating information in and out of the data register is concerned;

FIG. 19 is a simplified block diagram of circuits for generating data processing and memory gates;

FIG. 20 is a simplified block diagram of a data register in accordance with one embodiment of the present invention;

FIG. 21 is a simplified block diagram of a parity register for registering parity bits associated with the data stored in the circuit of FIG. 20;

FIG. 22 is a simplified block diagram of a first sum generator which represents the first level of an adder circuit in accordance with one embodiment of the present invention;

FIG. 23 is a simplified block diagram of an overflow generator for indicating a carry out of an adder which includes the circuit of FIG. 22;

FIG. 24 is a simplified block diagram of a final sum generator which represents the second level of circuitry of an adder which includes the circuit of FIG. 22;

FIG. 25 is a simplified block diagram of one embodiment of a circuit for predicting parity, including predicting parity in the COUNT operation of one embodiment of the present invention;

FIG. 26 is a simplified block diagram of a circuit for predicting the parity condition in the EXIST operation of one embodiment of the present invention;

FIG. 27 is a simplified block diagram of a circuit for updating parity in response to the circuits of FIGS. 25 and 26;

FIG. 28 is a simplified block diagram of a circuit for checking the operation of the adder circuit of FIGS. 22–24;

FIG. 29 is a simplified block diagram of a circuit for gating and combining various error indications derived in FIGS. 3a, 4, 11 and 28;

FIGS. 30a and b include a simplified block diagram of an improved logic circuit which responds selectively to the first input signal in dependence upon the presence or absence of a second input signal, and a symbolic block therefore;

FIGS. 31a and b are simplified block diagrams of a trigger symbol, and one form of trigger represented thereby;

FIG. 32 is a chart illustrating the arrangement of data in one embodiment of this invention.

INTRODUCTION TO DESCRIPTION

Arrangement of data words (FIG. 32)

In the preperred embodiment of this invention, the data register is contemplated as storing a WORD of data which comprises sixty-four data bits, the bits being arranged in eight groups of eight bits each. This is illustrated by reference to FIG. 32, which shows a WORD of data (partially broken away) and the nomenclature utilized to divide the data word into groups. Specifically, there are provided eight "bytes" of data (BYTE 0–BYTE 7) each consisting of eight data bits (BIT 0–BIT 7) which together make up the sixty-four bits of information. In this embodiment, "0" denotes lowest order, while "7" denotes highest order. Additionally, another group of information is contained in a parity "byte" which consists of one parity bit for each of the eight bytes of information. Each parity bit shown respectively corresponds to the byte of information bearing the same number. Thus, the left-most parity bit (numbered 7) is associated with the byte 7 group of data bits. The parity bits are so chosen that there is always an odd number of bits in the byte together with the parity bit. If there are an odd number of data bits within the byte itself, then the parity bit will be ZERO; if there is an even number of data bits within the respective byte, then the parity bit will be ONE, bringing the total to an odd number.

Figure 2A:
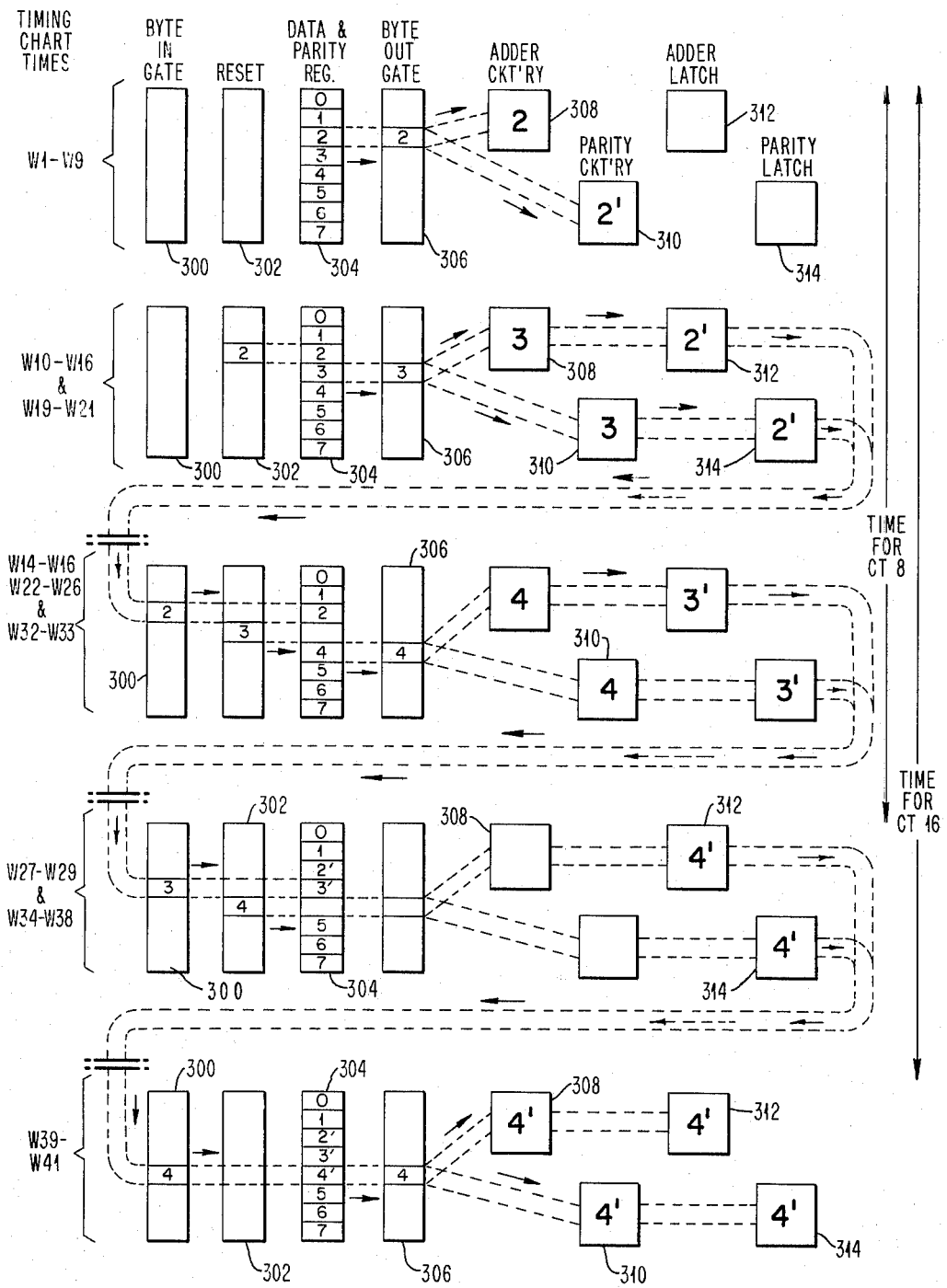
FIG. 2a is a simplified schematic illustration of a COUNT 24 operation in accordance with one embodiment of the invention.

Brief sketch of operation (FIG. 2a)

One embodiment of the invention incorporates a data register and a parity register which together act as main valve unit and control the propagation of data between the memory and the data processing system, and between the special-function performing apparatus, which is the subject of this invention, and all the other parts of the data processing system and memory.

In a preferred embodiment of the invention, a particular word of 72 bits (the number is chosen for illustration only) is extracted from the memory and stored in the data register. As illustrated in FIG. 32 (Sheet 24), eight of the bits comprise parity bits, each corresponding to one byte of the word. Each byte of the word contains eight bits. Once a word is stored in the data register, a particular byte of the word can be selected for transmission to the special-function generating apparatus. In the preferred embodiment of this invention, an adder circuit is provided which has a latched output and, additionally, has a plurality of OR circuits at its output, whereby it can perform both the function of adding, as in a COUNT operation, or "ORing," as in an EXIST operation. A COUNT operation can consist of adding a ONE into any bit position of the selected byte and may further include permitting propagation of carriers into the next subsequent byte, or even into the second subsequent byte. A COUNT operation in which the carries are limited to the byte within which the selected bit is located is called a COUNT EIGHT, hereinafter referred to as CT8; a COUNT operation permitting propagations into the next subsequent bit is a COUNT SIXTEEN, hereinafter referred to as CT16; and a COUNT operation which permits propagation into the next two subsequent bytes is a COUNT TWENTY FOUR, hereinafter referred to as CT24.

FIG. 2a (Sheet 5) illustrates schematically a CT24 operation. A group of structure is shown repetitively to diagrammatically illustrate the operation of the structure during five successive periods of time. To the left of each sketch of structure are references (i.e., W1–W9), which identify waveforms of the timing chart shown in FIG. 2b which in turn illustrates the detailed timing of the exemplary circuits. The structure includes a byte-in gate 300, a reset circuit 302, a data and parity register 304, a byte-out gate 306, adder circuitry 308, parity circuitry 310, an adder latch 312 which latches the result of operations performed by the adder circuitry 308, and a parity latch 314 which latches the result of operations performed by the parity circuitry 310.

In the uppermost sketch of FIG. 2a, a byte of data (eight bits), and the associated parity bit, is shown being gated out of the data and parity register 304 by a BYTE-2 OUT gate for transmission into the adder circuitry 308 and the parity circuitry 310. Only data goes to the adder circuitry 308, while both the data and the parity bit go to the parity circuitry 310. The "2" in the data and parity register 304 designates the actual data in that register position; the "2" in the byte-out gate 306 designates the fact that the byte-out gate generator is generating a BYTE-2 OUT gate which extracts data from the BYTE-2 position of the data and parity register. The "2" in the adder circuitry 308 and the parity circuitry 310 indicates the fact that the data from the BYTE-2 position of the data and parity registers is being operated upon by these circuits.

The second sketch from the top in FIG. 2a illustrates the fact that the data previously in the adder circuitry 308 and the parity bit in the parity circuitry 310 have been transformed and latched in the adder latch 312 and the parity latch 314, respectively, as indicated by the "2'" shown in each of the latches. Furthermore, since the converted data and parity bit are now latched, it is possible to reset the BYTE-2 position of the data and parity registers 304. Therefore, the reset generator generates a BYTE-2 RESET signal which erases the data in the data and parity register 304, which is illustrated by the absence of a numeral in that position. After the altered data is latched, the byte-out gate generator is adjusted to provide a BYTE-3 OUT gate for transmitting the data stored in the BYTE-3 position of the data and parity register into the adder circuitry 308 and parity circuitry 310. At this time, the altered BYTE-2 data begins to propagate back to the data and parity register.

In the third sketch from the top in FIG. 2a, the byte-in gate 300 has generated a BYTE-2 IN gate which is shown propagating the altered data into the BYTE-2 position of the register, which is illustrated by the "2'" in that register position. Thereafter, the altered data from the BYTE-3 position of the data and parity register 304 is latched in the adder latch 312 and the parity latch 314, which is illustrated by the "3'" shown in the latches. Next, the BYTE-3 position of the register is reset by a BYTE-3 RESET signal from the reset generator 302. Then, the byte-out gate generates a BYTE-4 OUT gate which propagates data out of the BYTE-4 position of the data and parity register into the adder circuitry 308 and the parity circuitry 310. At this time, the altered BYTE-3 data is on its way back to the data register, it requiring a small amount of propagation time to reach the register.

In the second sketch from the bottom, a BYTE-3 IN gate is generated which transmits the altered data back into the BYTE-3 position of the data and parity register 304 and then the altered data from the BYTE-4 position of the data and parity register is latched in the adder latch 312 and parity latch 314. Then the BYTE-4 position of the data and parity register 304 is reset by a signal generated by the reset generator 302, making ready for the time when the altered BYTE-4 data will be returned to the data register. In the present embodiment, means are provided for adjusting the byte-out and byte-in gates only twice and, therefore, the byte-out gate 306 still indicates a BYTE-4 OUT gate at this time. However, since the register is reset, no data is indicated as being in the adder and parity circuitry 308, 310 since only ZEROS are propagated to them. At this time, the altered BYTE-4 data is being transmitted back towards the data and parity register 304.

In the bottom sketch, a BYTE-4 IN gate is shown in the generator 300, which directs the altered BYTE-4 data into the BYTE-4 position of the data and parity register 304. As before described, the BYTE-4 OUT gate still exists so that the altered data is actually transmitted into the adder and parity circuitry and the previously latched altered BYTE-4 data still subsists in the adder and parity latches 312, 314. Reference to the arrows in the bottom sketch indicates that the data flows into the data register, through the byte-out gates, and to the adder and parity circuitry. However, the data in the latches is that remaining from having been previously latched and not that currently being generated since no further latching signal is provided.

As just described, FIG. 2a illustrates a CT24 operation. It should be noted that in the illustration given, carries actually propagating into the second and third bytes (BYTE-3 and BYTE-4) were assumed. However, if the data in the first byte (BYTE-2) was such that the carry did not propagate through all the positions of that byte, and if no carry over into the next subsequent byte (BYTE-3) were therefore required, the operation would cease at the end of the third sketch from the top. Similarly, if the carry propagated through the first two bytes, but not into the third byte, the operation would cease with the return of the BYTE-3 data into the data register, as shown in the second sketch from the bottom.

If a CT8 instruct had been given, the propagation of carries into the second and third bytes would not be permitted. Therefore, the operation would end with the third sketch from the bottom.

Similarly, if a CT16 instruction had been given, a propagation of carry out of the first byte and into the second byte woud cause the operation to continue down through the second sketch from the bottom; however, if there were no carry propagated into the second byte, the operation would cease (as for a COUNT 8) with the third sketch from the bottom. No carries into BYTE-4 would be permitted.

In the foregoing examples, a tendency to carry out of the first byte in a CT8, out of the second byte in a CT16, or out of the third byte in a CT24, will result in sending an OVERFLOW signal to the data processing system. What the OVERFLOW signal may indicate or control is not a concern of the present invention.

On an EXIST operation, the data is not altered in the adder and parity circuitry 308, 310, so that unaltered data would be set in the adder latches 312 in the second sketch from the top of FIG. 2a. As the data leaves the latch 312 it passes through "OR" circuits (not shown in FIG. 2a), which perform no function in COUNT operations described hereinbefore, but which causes a selected bit to have a ONE "ORed" therewith in an EXIST operation. Therefore, the data is altered as it leaves the latch 312. The parity is updated, if necessary, and the new parity bit entered in the latch 314. The byte gate generators 300, 306 and the reset generator 302 operate the same in an EXIST operation as they do in a CT8 operation. Since no addition is performed, there are no possible effects on subsequent bytes of data, so the length of an EXIST operation is always the same as is a CT8 operation.

The operation just briefly described are all illustrated in the timing chart of FIG. 2b. However, inasmuch as this describes the time of the operations in greater detail, reference to the timing chart at this point may not prove satisfactory. The detailed operation of the circuits, described with reference to the timing chart of FIG. 2b, is presented hereinafter.

LOGIC INVOLVED

Ancillary to discussion of the detailed circuitry, it should be understood that the invention is disclosed in a simplified, exemplary embodiment wherein the nature of the logical blocks is not indicated beyond the function which the blocks are to perform.

Specifically, six types of logical circuits are used: a trigger circuit, which is a block containing a "T"; an AND circuit, which is a block containing an "A"; an OR circuit, which is shown as a block containing a "0"; an EXCLUSIVE OR circuit which is a block containing a "$\chi$"; a latch circuit which is a block containing an "L"; and an inverter is shown as a block with an "I" in it. All of the blocks are so arranged that inputs are applied either to the left-hand side or the bottom, and outputs leave the blocks from the right-hand side. For the most part, all information propagates from left to right and from top to bottom of each figure. However, there are exceptions to this and the direction of propagation is best understood by reference to which side of a block a line is entering.

TIMING

The type of components used is not critical to the invention, but the invention has been embodied in circuitry utilizing drift transistors operating in the current-switching mode. With this type of circuit, each logical block requires approximately 20 milli-microseconds. The milli-microsecond is hereinafter referred to as a "nanosecond," abbreviated as "ns." Since a trigger circuit may comprise two logical circuits operating together (as shown in FIG. 31b) a trigger circuit would require approximately 40 ns. to turn fully on or fully off. Similarly, a latch (which may comprise the novel logical latch shown in FIG. 30) may variously require 2 or 3 logic-times to operate and, thereof, require 20 or 30 ns. As disclosed, the preferred embodiment tends to take into account the logic times required for the circuits and to provide lumped delays which are indicated as a block containing a "delta" together with a numerical indication of the number of nanoseconds of delay provided. The delay blocks, therefore, generally indicate the amount of delay required between one event and an event being controlled by the delay block, minus the logic time involved. What is not considered is the propagation time of signals, except in a few instances which will be mentioned during the discussion of the circuits involved. This is so because it is very difficult to predict what time is required in a "nanosecond machine." When the invention is utilized in any specific apparatus, the timing of the various circuitry has to be adjusted to take into account the varying environmental conditions surrounding the wires and circuits involved, as well as the length of wiring between circuits and the actual switching time of the various logical circuits employed. Of course, this invention could be incorporated in a much slower machine where logic time and propagation time are unimportant. In that case also, delay units may be chosen to get proper relationships.

Novel latch (FIGS. 30a and 30b)

FIG. 30a (Sheet 24) shows a logical latch, in accordance with the present invention, which is one type of latch suitable for use in the preferred embodiment wherever the latch of the type shown symbolically in FIG. 30b is required. In accordance with one embodiment of this invention, shown in FIG. 30a, an OUTPUT signal on a line 50 from an OR circuit 51 is also supplied to two AND circuits 52, 53. Therefore, whenever there is an OUTPUT signal on the output line 50, the AND circuit 52 will be responsive to an INPUT signal on the line 54 to supply a signal to the OR circuit 51 and thereby perpetuate the OUTPUT signal on line 50. On the other hand, an AND circuit 55 may respond to the INPUT signal on the line 54 if a LATCH PULSE signal is applied on a line 56. If there is no LATCH PULSE signal on a line 56 and there is an OUTPUT signal on the line 50, then there will be an output from an AND circuit 53. The way this operates is as follows: the INPUT signal on line 54 will have no effect on the circuit when it has no OUTPUT signal since there will be no input to the AND circuit 52 on the line 50. Similarly, if there is no LATCH PULSE on line 56, the AND circuit 55 can have no output. However, when the LATCH PULSE on line 56 appears, the AND circuit 55 will gate the INPUT signal from line 54 through the OR circuit 51 to become an OUTPUT signal on line 50. Thereafter, the OUTPUT signal on line 50 will permit the INPUT signal on line 54 to pass through the AND circuit 52 and thereby maintain the OUTPUT signal on line 50. After the LATCH PULSE on line 56 disappears, the output of an inverter 57 will permit the AND circuit 53 to continue to pass the OUTPUT from line 50 to the OR circuit 51 and thereby latch up the circuit where it will remain until another latch pulse appears. Disappearance of the INPUT signal on line 54 will not thereafter effect of the circuit since the OR circuit 51 will continue to respond to the AND circuit 53 to derive the OUTPUT signal on line 50. However, if the LATCH PULSE 56 is later applied and there is no INPUT signal on line 54, then the AND circuit 53 will be turned off because of the output of the inverter 57, and there will be no output from the AND circuit 55 since there is no signal on line 54. The presence of the OUTPUT signal on line 50 will not be gated through the AND circuit 52 without a signal on line 54 and, therefore, there will be no input to the OR circuit 51, so the OUTPUT signal on line 50 will disappear.

This corresponds to the latch box 60 shown in FIG. 30b, wherein the LATCH PULSE is applied to a line 61 and an INPUT signal is applied to a line 62 so as to derive an OUTPUT on a line 63.

Typical trigger (FIGS. 31a and 31b)

FIG. 31a shows a logical trigger which comprises an AND circuit 70 and an OR circuit 71, the output of the OR circuit on a line 72 being fed back to the AND circuit 70, and the output of the AND circuit on a line 73 being fed back as an input to the OR circuit 71. If, initially, a signal is applied on a SET line 74, the OR circuit 71 will pass the signal to an OUTPUT line 72, which will then be gated through the AND circuit 70 (in the absence of a reset signal) and the output of the AND circuit on line 73 will continue to pass through the OR circuit and the trigger becomes latched. However, if a RESET signal is applied on a line 75, it is inverted by an inverter 76 so as to cause a signal on a line 77 to disappear, thereby blocking the AND circuit 70. With the AND circuit 70 momentarily blocked, there is no signal on line 73 and, therefore, no outputs from the OR circuit 71, which causes the line 72 to have no OUTPUT signal thereon. Since the line 72 has no signal thereon, if the reset signal later disappears so that the output at the inverter 76 again supplies a signal on line 77, the AND circuits 70 will remain blocked until another SET signal appears on the line 74. This corresponds to the typical trigger shown in FIG. 31d, which comprises a trigger block 80, responsive to SET signals on a line 81 so as to provide an OUTPUT on a line 82; it is reset by a signal on a RESET line 83.

BLOCK DESCRIPTION

Registers (FIG. 1b)

Figure 1A:
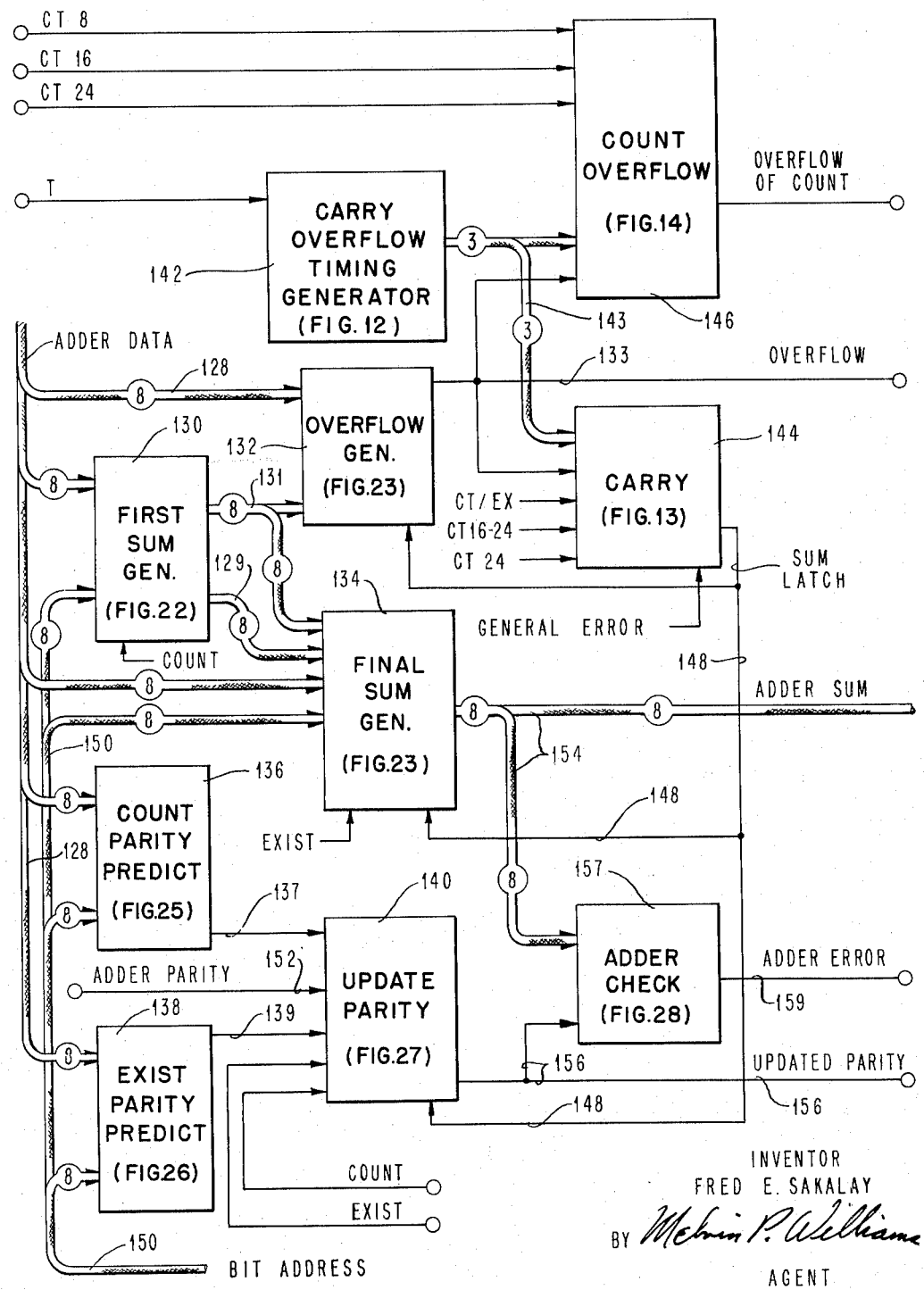
FIG. 1a is a block diagram of means for performing special functions on data in accordance with one embodiment of the invention.

In FIGS 1a–1g a complete simplified block diagram of a preferred embodiment of the invention is shown. In FIG. 1b (Sheet 2), a DATA REGISTER 100 and PARITY REGISTER 102 are shown; these two registers together operate as a main valve of the data processing system, which includes both circuity in accordance with the present invention and other data processing apparatus, such as the main memory or storage device (shown in FIG. 1d), which are not directly concerned with the present invention. The DATA and PARITY registers can receive data and the corresponding parity bits from the data processing system by means of a trunk of seventy-two lines 104, which is divided into a trunk of sixty-four data lines 106 and eight parity lines 108, and can similarly send data over sixty-four data lines 110 and eight parity lines 112 through a trunk of seventy-two lines 114 back to the data processing system. The registers 100, 102 can also receive data over a trunk of seventy-two lines 116 from the main memory unit, which lines comprise sixty-four data lines 118 and eight parity lines 120; the registers also are capable of sending data over sixty-four data lines 122 and eight parity lines 124 through a trunk of seventy-two lines 126 back to the main memory unit. Thus, data which is to be transferred from any part of the data processing system into the memory unit would be transmitted over the lines 104, 106, 108 to the DATA and PARITY registers and then over the lines 122, 123, 126 into the memory unit; similarly, data to be transferred from the memory unit to other parts of the data processing system would be propagated over the lines 116, 118, 120 through the DATA and PARITY registers 100, 102 and thence over the lines 110, 112, 114 to the data processing system. Also, the reading out of the memory unit (which will be described more fully hereinafter) is normally destructive so that, when data is transmitted from the memory over the lines 116, 118, 120, it will be manifested in the DATA and PARITY registers 100, 102, and will then be regeneratively written back into the memory over the lines 122, 124, 126.

*Special function circuits (FIG. 1a)*

In special function operations, the DATA REGISTER 100 stores sixty-four bits of data received over the lines 116 and may be operated (by means to be described hereinafter) to select one bit of eight bits for transmission over a trunk of eight lines 128. The eight bits of data are concurrently sent to various parts of an adder circuit (FIG. 1a, Sheet 1), which comprises a FIRST SUM GENERATOR 130, an OVERFLOW GENERATOR 132, and a FINAL SUM GENERATOR 134. The FIRST SUM GENERATOR 130 contains eight stages which generate "sums" and "carries" in response to a COUNT instruction. A "sum" and a "carry" (if any) will be generated only in the one stage which is selected by a corresponding one of eight BIT ADDRESS lines in a trunk 150. The manner of generating the bit address for application over the bit lines 150 will be described hereinafter. The "sums" are sent over a trunk of eight lines 129 to the FINAL SUM GENERATOR 134. The "carries" are transmitted over trunks of eight lines 131 to the FINAL SUM GENERATOR 134 and to the OVERFLOW GENERATOR 132. Each of the bit positions of the FIRST SUM GENERATOR except the one selected by the BIT ADDRESS on lines 150 will not generate any "carry," and the "sum" from each unselected position will be the same as the data bit on the corresponding one of the lines 128.

Carry circuits associated with the adding circuits include a CARRY-OVERFLOW TIMING GENERATOR 142, a CARRY circuit 144 and a COUNT OVERFLOW circuit 146. The OVERFLOW GENERATOR 132 generates an OVERFLOW signal indicative of a "carry out of the byte" during the same time that the final sum is being calculated. If there is a "carry out of the byte," the OVERFLOW signal is sent on a line 133 to the CARRY circuit 144 and the COUNT OVERFLOW circuit 146. In response to timing signals on a line 143, the CARRY circuit 144 will generate a SUM LATCH signal if an OVERFLOW signal indicates a "carry out of a byte" in a multiple-count operation (e.g., CT16 or CT24) when there is a subsequent byte into which carries may propagate. Similarly, if an OVERFLOW signal appears on line 133 in a CT8 operation, or as a result of operations performed on the second byte of a CT16 or the third byte of a CT24, the COUNT OVERFLOW circuit 146 will generate an OVERFLOW OF COUNT signal on a line 149.

The FINAL SUM GENERATOR responds to ADDER DATA on lines 128, "sums" and "carries" on lines 129 and 131, respectively, and the BIT ADDRESS on lines 150 to generate the final altered data on a trunk of eight lines 154. Also, the FINAL SUM GENERATOR responds to an EXIST instruction to "OR" a ONE to the position selected by the BIT ADDRESS lines 150. Note that COUNT and EXIST instructions are contemplated, in this embodiment, as being mutually exclusive; however, from the detailed description hereinafter, it will be apparent that they need not be.

The eight bits of ADDER DATA from the DATA REGISTER 100 are also sent over the lines 128 to parity adjusting circuitry which includes a COUNT PARITY PREDICT circuit 136, an EXIST PARITY PREDICT circuit 138, and an UPDATE PARITY circuit 140. The COUNT and EXIST PARITY PREDICT circuits each predict whether or not the parity bit would need to be changed if the respecitvely corresponding operation were performed on the eight bits of ADDER DATA received at the position indicated by the BIT ADDRESS. Each therefore sends a corresponding "do not update parity" signal on a line 137 or 139, respectively, to the UPDATE PARITY circuit 140, which selects the correct one in response to COUNT and EXIST instructions, respectively. The original ADDER PARITY bit on a line 152 is thereby changed or not, as necessary, and becomes the UPDATED PARITY bit on a line 156. The results of the FINAL SUM GENERATOR 134 and the UPDATE PARITY circuit 140 are compared in an ADDER CHECK circuit 157, and if any error was made, an ADDER ERROR signal is developed on a line 159.

The final stage in each of the OVERFLOW GENERATOR, the FINAL SUM GENERATOR and UPDATE PARITY circuit are latches within which the results of operations are latched by the SUM LATCH signal on the line 148.

The particular eight bits which are sent over the lines 128 from the registers 100, 102 (FIG. 1a) to the circuits just now described are selected by the BYTE-OUT gate signals applied to these resigters over a trunk of eight lines 158, in a manner to be described hereinafter. Similarly, the eight ADDER SUM bits returned to the register over the lines 154 are gated into the correct position within the word stored in the data register by a plurality of BYTE-IN gate signals applied by a line trunk of eight lines 160, in a manner to be described hereinafter. Resetting of the data register is described hereinafter and is accomplished by BYTE RESET SIGNALS applied over a trunk of eight lines 162.

The parity register 102 is also caused to be responsive to the data processing system to force all of the parity bits to a ONE in response to signals applied over a line 164. This is done upon the occasion of the data processing system setting all of the positions of the DATA REGISTER 100 to represent ZEROS. Other timing and instruction signals are applied to the various circuitry shown in FIGS. 1a and 1b but, inasmuch as these are involved in implementation, rather than actually necessary to a description of the general functional operation of the circuits, the generation, operation, etc., of these signals will be deferred to detailed sections hereinafter.

In summation, the embodiment of the invention shown in FIGS. 1a and 1b selects a byte of eight bits from the DATA REGISTER and either adds a ONE or "OR's" a one to one of the bits in the byte, and simultaneously corrects the parity by responding to the same ADDER DATA bits and BIT ADDRESS signals in the parity circuits as are responded to in the adding and carry circuits. This provides a possibly-altered byte of data (ADDER SUM) together with a possibly-corrected parity bit (UP- DATED PARITY) in accordance with the change (if any) made in the data, the ADDER DATA and the UPDATED PARITY being returned to the DATA REGISTER. If the instruction calls for more than one byte, the DATA REGISTER will have been conditioned to send the next subsequent byte of the stored word out to the adding and parity updating circuits as soon as the FINAL SUM GENERATOR and UPDATE PARITY circuits 134, 140 have latched their final answer in response to the SUM LATCH on line 148.

*Address and reset circuits (FIG. 1c)*

In FIG. 1c (Sheet 3) are shown the circuits which select the particular byte, and the bit within the byte, upon which operations are to be performed, as well as the circuit which generates the reset signals for the DATA REGISTER. The main data processing system (FIG. 1d) delivers coded ADDRESS SIGNALS over a trunk of seven lines 170 to an ADDRESS REGISTER 172. The address register comprises latch circuits which will respond to the inputs only when a timing signal T (from FIG. 1d) is present on a line 174. The parity of the address code is checked within the address register and, if it is incorrect, an ERROR signal is applied on line 176, which is utilized in a manner to be described hereinafter. One-half of the code bits stored in the ADDRESS REGISTER 172 is transmitted over a trunk of six lines 178 to a BYTE CODE ADJUST circuit 180 and the other half of the code bits from the ADDRESS REGISTER 172 are transmitted over a trunk of six lines 182 to a BIT CODE ADJUST circuit 184. The BIT CODE ADJUST circuit 184 automatically provides a BIT–0 address after the first byte of a COUNT operation is performed. If a permissible carry propagates out of the first byte, the BIT–0 address adds a ONE to the lowest order of the next byte of data. The output of the BIT CODE ADJUST circuit 184 is transmitted over a trunk of six lines 186 to a BIT DECODE circuit 188, where the bit portion of the address code, as adjusted by the BIT CODE ADJUST circuit 184, is decoded in such a manner as to energize one of the lines of the trunk of eight lines 150. This single energized line comprises the BIT ADDRESS which is applied to the various function performing circuits in the control portion of FIG. 1a. The BYTE CODE ADJUST circuit 180 receives controlling signals over a pair of lines 190, which are generated by a BYTE ADJUST GENERATOR 192 in response to timing and control signals sent over a pair of lines 194, 196 from a BYTE ADJUST TIMING circuit 198. The BYTE CODE ADJUST circuit advances the byte address to select second and third subsequent bytes, to permit carries in multiple-count operations. The output of the BYTE CODE ADJUST circuit is transmitted over a trunk of six lines 200 to a BYTE DECODE circuit 202 and a BYTE DECODE CHECK circuit 204. The BYTE DECODE circuit 202 provides "byte address" signals and BYTE-OUT GATES on the trunk of eight lines 158, which also feeds the BYTE DECODE check circuit 204, wherein the adjusted byte code on lines 200 is compared with the resulting "byte address" (or BYTE OUT GATES) on lines 158, which result from decoding the adjusted byte code on line 200. If an error occurs in the decoding, an ERROR signal will be supplied to a line 206, the utilization of which is described hereinafter. The "byte address" signal and BYTE OUT GATES on lines 158 are also applied to a BYTE-IN GATE GENERATOR 208 which delays the byte address signals and gates them with the SUM LATCH signal on line 148 so as to provide the BYTE-IN GATES to lines 160, which were described hereinbefore. A REGISTER RESET GENERATOR 210 utilizes the "byte address" signals on lines 158 to generate BYTE RESET signals on the trunk of eight lines 162 depending upon whether or not an "overflow" has occurred on line 133 whenever the device is operating under instructions in which an "overflow" is an indication that the device should continue performing operations on the next subsequent byte of data. The REGISTER RESET GENERATOR 210 also generates main reset signals on the lines 162 in response to the timing signal T at the start of each operation.

In summation of the address and reset circuits, the BYTE DECODE circuit generates a BYTE-OUT GATE which sends a first byte of data to the function performing circuits. After the results are latched, the REGISTER RESET GENERATOR resets the section of the DATA and PARITY registers from which the data was selected. Then the BYTE-IN GATE GENERATOR conducts the altered information back into the same section of the registers. This is all that these circuits need to do in either an EXIST or a CT8 operation. If a CT16 or CT24 operation is being performed, the BIT CODE ADJUST circuit will force the BIT ADDRESS to BIT–0, and the BYTE CODE ADJUST circuit will change the BYTE ADDRESS so as to indicate a byte which is one byte higher than that designated by the code stored in the ADDRESS REGISTER. The above gating and resetting operations would then be repeated for a second byte of data if there were an "overflow" from the first byte. In a CT24 operation, the bit address remains set to BIT–0, and the BYTE CODE ADJUST circuit advances the BYTE ADDRESS one more time. Again, if there is an "overflow" from the second byte, the above gating and resetting operations are then performed for the third byte of data.

*DP System and main memory (FIG. 1d)*

FIG. 1d (Sheet 4) shows a data processing system (DP SYSTEM) 240 with which the apparatus of FIGS. 1a–1c may be utilized. The data processing system 240 is contemplated as comprising all of the elements necessary to perform large scale computations and other data processing functions, except those which are associated with the main memory for such a system, which includes the apparatus shown in FIGS. 1a–1c. The data processing system 240 can be any one of many well-known types or combinations, the only requirements being that it can provide and receive the type of signals about to be described. Specifically, the data processing system 240 provides data over the DP DATA lines 104, which include sixty four data bits and eight parity bits, the data being arranged in eight bytes of eights bits each as described hereinbefore. The DP SYSTEM 240 also supplies ADDRESS SIGNALS over the 7-line trunk 170 and INSTRUCTION signals over a 5-line trunk 242. The INSTRUCTION signals are decoded (by means to be described hereinafter) and are then utilized in the circuitry of FIGS. 1a, 1b, 1c and 1d. The DP SYSTEM provides the timing pulse T on line 174 which is utilized throughout the remainder of the apparatus. Associated with the DP SYSTEM is a MAIN MEMORY (STORAGE UNIT) 244 which receives WORD ADDRESS signals over a trunk of six lines 246 that selects a particular seventy two bit word by designating the position within the MAIN MEMORY 244 wherein that word can be found, or by designating the particular location wherein a word is to be stored. Also associated with the DP SYSTEM is a CLEAR CONTROL circuit 248 which is not essential to the present invention, but which illustrates how storage locations in the main memory can be cleared and the effect of such a clearance upon the circuitry in FIGS. 1a–1c. Specifically, if a storage location in the main memory is cleared, and then that storage location is read out over the trunk of seventy two lines 116 and sent to the DATA REGISTER in FIG. 1a, all of the parity bits associated therewith must be set to ONE so that the total number of bits (zero) in each byte plus the parity bit (one) will be an odd number. Therefore, the CLEAR CONTROL circuit 248 sends the FORCE ALL PARITY signal over line 164 to correct all of the bits in the PARITY REGISTER.

The data processing system 240 may optionally provide for receipt of a GENERAL ERROR signal (to be described hereinafter) over a line 250 and to a MEMORY "NOT BUSY" signal on a line 252. The "NOT BUSY" signal is a common means of informing a data processing system when the memory has received (or otherwise finished handling) data in response to prior instructions, so that the data processing system may continue with further operations.

*Auxiliary circuits (FIGS. 1e, 1f and 1g)*

FIG. 1e shows an INSTRUCTION REGISTER 252 which stores INSTRUCTION signals received from the DP SYSTEM 240 over the trunk of five lines 242. The INSTRUCTION REGISTER also includes parity checking circuitry to be sure that the correct number of instruction bits plus parity bit have been received. If the correct number of bits have not been received, an ERROR signal is supplied to a line 254, the utilization of which is described hereinafter. The output of the INSTRUCTION REGISTER is transmitted over a trunk of eight lines 256 to an INSTRUCTION DECODE circuit 258 which energizes a selected one of nine output lines 260 in dependence upon the particular instruction which the DP SYSTEM is sending. The INSTRUCTIONS on lines 260 are utilized throughout the subject apparatus.

FIG. 1f shows a DP AND MEMORY GATES circuit 264 which receives instructions over a trunk of nine lines 260 from the instruction decode circuit 258; the DP AND MEMORY GATES circuit 264 also receives the timing signal T and the OVERFLOW signal on the line 133. From these, the circuit 264 generates DP "in" and "out," and MEMORY "in" and "out" gates which are transmitted over a plurality of lines 266 to the data register 100 and parity register 102. The DP and MEMORY GATES on lines 266 control the transmission of data to and from the circuits of FIGS. 1a and 1b. One of the gates (the "memroy data out gate," as described hereinafter) also comprises the MEMORY "NOT BUSY" signal on the line 252, either of which may be utilized to control writing of the data into the memory in any well-known manner.

FIG. 1g illustrates a GENERAL ERROR generator 270 which receives all of the errors on lines 159, 176, 206, 254 and selectively recognizes these errors in combination with timing signals generated in response to the timing signal T to generate a GENERAL ERROR signal which is applied over lines 272 to various parts of the circuit of FIGS. 1a-1c and over a line 250 to the DP SYSTEM 240 shown in FIG. 1d.

DETAILED DESCRIPTION OF CIRCUITS

Instruction Register

In FIG. 3a (Sheet 7) is shown the INSTRUCTION REGISTER 259 which receives INSTRUCTIONS (and an associated PARITY bit) from the DP SYSTEM 240 (FIG. 1d) over a plurality of lines 260 along with the main TIMING pulse on the line 174. The main TIMING pulse may be referred to as a "select pulse" since this is the signal from the main data processing system that selects an operation involving the main memory unit. The INSTRUCTIONS may be provided in advance of the timing or they may arrive at a time after the arrival of the TIMING signal, but before the extinguishment thereof. The simultaneous presence of the TIMING and INSTRUCTION signals is required in order for them to be latched into respective latches 320. Referring to waveform W1 in FIG. 2b (Sheet 6), it can be seen that the TIMING signal begins at 0 ns. and ends at 150 ns., taking about 20 ns. to rise and 20 ns. to fall. The outputs of the latches 320 are transmitted over a plurality of lines 322–326. Each of the lines 322–325 is applied to a respectively corresponding inverter 328–331 in order to provide complementary outputs of the instructions at a corresponding plurality of lines 332–335. Thus, line 322 provides a CT/EX which designates either a COUNT or an EXIST function without regard to which of the two functions is to be performed; line 332 when energized designates the lack of a COUNT or EXIST function or a "not CT/EX." Similarly, line 323 designates a "COUNT 8" and line 333 designates a "not COUNT 8," etc. Each of the lines 322–325 is connected to an EXCLUSIVE OR circuit 338, 340. The line 322 is compared with the line 323 in an EXCLUSIVE OR circuit 338; if there is a CT/EX signal and a COUNT 8 signal, there will be no output from the EXCLUSIVE OR circuit 338 on its output line 339. However, if only one of the lines 322, 323 is energized, then there will be a signal on the output line 339. Similarly, line 324 and line 325 each feed an EXCLUSIVE OR circuit 340. Again, if both COUNT 16 and EXTRACT are present, there will be no output on an output line 341, or, if neither of the lines 324 and 325 are energized, there will be no output on the line from the EXCLUSIVE OR circuit 340 on the line 341. However, if only one of the lines 324, 325 is energized, then there will be an output signal on the output line 341. The lines 339 and 341 are, in turn, compared in an EXCLUSIVE OR circuit 342 in the same manner as before: neither or both signals will result in no output circuit signal on a line 343, but the presence of a signal on only one of the lines 339, 341 at any one time will provide an output on the line 343. Therefore, the line 343 designates the presence of an odd number of bits between the lines 332, 325 and, therefore, indicates that odd-parity exists. The present embodiment utilizes odd parity, which means that the total number of data, instruction, or address bits has to be an odd number, or there must be a parity bit accompanying the other bits. Therefore, in order to complete the parity check, the output of the parity latch 320 on line 326 is compared with the signal on line 343 in an EXCLUSIVE OR circuit 344. If both or neither of lines 326 and 343 have signals thereon, there will be no signal on the output line 345. Contrariwise, if only one of the lines 326, 343 has a signal thereon, then there will be an output on the line 345. Since this is the permissible condition (e.g., indicating odd parity), it is necessary to invert the signal on line 345 so as to provide for an output on the line 346 only when there is either the presence of signals on both lines 326, 343, or no signal on either of the lines 326, 343, since each of these conditions designates an even parity condition, which condition is an error in an "odd parity machine," such as the present embodiment. The instruction error on line 346 is utilized together with other errors so as to block the operation of the machine in a manner to be described hereinafter. Note that the INSTRUCTION PARITY bit is not the same as that which accompanies data, and is not updated or otherwise operated upon; its function ceases upon comparing the instruction parity in EXCLUSIVE OR circuit 344.

INSTRUCTION DECODE

FIG. 3b illustrates the INSTRUCTION DECODE circuitry 258 which utilizes the outputs of the INSTRUCTION REGISTER of FIG. 3a so as to energize selected instruction lines in response to the INSTRUCTION CODE received from the DP SYSTEM. For example, the COUNT or EXIST line 322 provides the CT/EX instruction on a line 350 without further alteration. The CT/EX line 322 is combined in an AND circuit 349 with the "not COUNT 8" line 333 and the "not COUNT 16" line 334 so as to provide an EXIST instruction on a line 351. By way of comparison, the CT/EX line 322 is combined in an AND circuit 360 with the output 362 from an OR circuit 364, which responds to either the "COUNT 8" or the "COUNT 16" signals on lines 323 and 324 respectively. Therefore, a CT/EX together with COUNT signals form a COUNT instruction and a CT/

EX with no count signals form an EXIST instruction. The plurality of other AND circuits 366 respond similarly to the various INSTRUCTION CODES from FIG. 3a so as to provide a CT8 instruction on a line 352, a CT16 instruction on a line 353, a CT24 instruction on a line 354, a CT16–24 instruction on a line 355, an EXTRACT instruction on the line 357, and a STORE instruction on a line 358. Next to the instruction appears all of the figures within which the respective instruction is utilized.

ADDRESS REGISTER

FIG. 4 (Sheet 8) shows the ADDRESS REGISTER 172 which receives ADDRESS SIGNALS from the DP SYSTEM over a plurality of lines 170. The address signals are latched by the TIMING pulse on line 174 into a plurality of respectively corresponding latches 370. The output of the latches 370 are applied to a plurality of EXCLUSIVE OR circuits 372 which operate to check the parity of the address signals in the same manner as does the circuitry of FIG. 3a check the parity of the INSTRUCTIONS. In this manner, an error signal is provided on the line 176 if an even-parity condition is exhibited. The outputs of the latches 370 are also applied to a plurality of inverters 374, which provide complementary outputs, as do the inverters 328–331 in FIG. 3a. Thus, there is provided a plurality of address bits A0–A5 and their complements $\overline{A0}$–$\overline{A5}$ have a plurality of outputs address lines 178, 182. The lines 182 comprise a BIT CODE, whereas the lines 178 comprise a BYTE CODE.

BIT CODE ADJUST

FIG. 5 (Sheet 8) shows the BIT CODE ADJUST circuit 184, which responds to a BIT CODE on lines 182 to form an ADJUSTED BIT code on a plurality of lines 186. The purpose of the BIT CODE ADJUST circuit 184 is to change the designation of the bit to be added into at the time that a second byte of data is transferred into adder circuitry as the result of a carry propagating out of the first byte of data. Thus, a bit may be added into the fifth bit position of a first byte (for instance, BYTE–4) and, if the bit carry propagates through the successive bits and the instruction is either a COUNT 16 or COUNT 24 instruction, a ONE will then be added into the lowest bit position (BIT–0) of the next higher byte of data (BYTE–5). Therefore, the BIT CODE ADJUST circuit 184 automatically changes the bit setting so as to indicate the lowest bit position (BIT–0) regardless of the bit designated by the BIT CODE, after the time for adding into the first byte (for instance, the COUNT 8, or COUNT 8 portion of COUNT 16 or COUNT 24) has passed. The way this is achieved is by blocking all of the in-phase lines 182 (A0, A1, A2) by means of a plurality of AND circuits 380, and simultaneously guaranteeing a signal on all of the complementary bit code lines 182 ($\overline{A0}$, $\overline{A1}$, $\overline{A2}$) by means of a plurality of OR circuits 382. A TIMING signal on line 174 is applied to a 650 ns. delay until 384, which together with the normal 20 ns. per logical block delay causes the adjustment of the bit to begin at 690 ns., as indicated by the wave form W–19 on the timing chart of FIG. 2b. The output of the delay unit 384 is gated with a CT16–24 instruction on a line 355 by means of an AND circuit 386. This instruction is provided to guarantee that a bit adjustment will not occur except in an operation which calls for carries into the second and/or third bytes. The output of the AND circuit 386 on a line 387 sets a trigger 388, which is held on until a 400 ns. delay unit 390 applies a signal from the line 387 inverted by an inverter 392 to the reset terminal 394 of the trigger 388. The in-phase output of the trigger 388 is applied by a line 396 to each of the OR circuits 382 so as to cause all of the inverted ADJUSTED BIT CODE lines 186 to have signals thereon. The in-phase signal on line 396 is also applied to an inverter 398 which supplies a signal on a line 400 to each of the AND circuits 380 that blocks all of the in-phase ADJUSTED BIT CODE signals on lines 182 from reaching the output lines 186. With all of the out-of-phase ADJUSTED BIT CODE lines energized and all of the in-phase ADJUSTED BIT CODE lines disenergized, the BIT ADDRESS (as described hereinafter with respect to FIG. 6) will be BIT–0.

BIT DECODE

FIG. 6 (Sheet 8) shows the BIT DECODE circuitry 188 which receives the in-phase and out-of-phase ADJUSTED BIT CODE signals over lines 186, and applies them in all possible combinations to a plurality of AND circuits 402 so as to generate a plurality of BIT ADDRESS signals b0–b7 on lines 150 in accordance with the well-known binary number system equivalence to the decimal number system.

BYTE ADJUST TIMING

FIG. 7 (Sheet 9) shows the BYTE ADJUST TIMING circuitry 198 which has the function of changing the byte address automatically, to permit taking a second byte out of the data register so that the carries propagated out of a first byte may continue propagation into the second byte of data, as before described with respect to FIG. 2a. The TIMING signal on line 174 is fed through a 160 ns. delay unit 406 so as to delay the start of a RESET BYTE ADJUST signal on line 194 until approximately 180 ns. The output of the delay unit 406 is applied directly to an AND circuit 408 and is also applied through an inverter 410 and a 70 ns. delay unit 412 to the AND circuit 408. The AND circuit 408 will pass a signal to its output 194 as soon as the output of the delay unit 406 reaches the AND circuit. However, the inverted output of the delay unit 406 later reaches the other input to the AND circuit 408 and blocks the AND circuit 408; this limits the width of the RESET BYTE ADJUST signal on line 194 to approximately 70 ns. Of course, the width of the reset signals and the extent of their delay should be determined with respect to a particular apparatus so as to be compatible with all of the design criteria involved; this is not critical to the invention. The timing signal 174 is also applied to a 580 ns. delay unit 414, which delays the generation of any ASSUME CARRY pulses on a line 196 until about 620 ns. time, so that the BYTE ADJUST SIGNALS (on lines 190, FIG. 9, described hereinafter) will being at approximately 700 ns. time, as indicated by the wave form W–20 on the timing chart of FIG. 2b. The output of the delay unit 414 is applied directly to an AND circuit 416 and is also applied through an inverter 418 and an 85 ns. delay unit 420 to the same AND circuit 416. This limits the width of the output from the AND circuit 416 to approximately 100 ns. The output of the AND circuit 416 is applied to an AND circuit 422, where it is gated with a CT16–24 instruction signal on a line 355. The output of the AND circuit 422 passes through an OR circuit 424 and comprises a first ASSUME CARRY signal on a line 196. Since the instruction on line 355 is a CT16–24, the AND circuit 422 will supply an output to form the first ASSUME CARRY signal to prepare to handle the second and final byte of a COUNT 16 instruction, or to similarly prepare to handle the second of three bytes in a COUNT 24 instruction. The output of the AND circuit 416 is also applied to a 180 ns. delay 426 and then to another AND circuit 428 for gating by a CT24 instruction on a line 354. This provides for a later ASSUME CARRY signal on a line 196 whenever a COUNT 24 instruction has been given. The utilization of the ASSUME CARRY signals on line 196 is described with respect to FIG. 8.

BYTE ADJUST GENERATOR

FIG. 8 (Sheet 9) shows the BYTE ADJUST GENERATOR 192 which includes three triggers 431–433, which respond to the assume carry signals on lines 196 so as to first provide an UP–1 BYTE ADJUST signal on one of the lines 190 and to thereafter provide an UP–2 BYTE ADJUST signal on the other line 190, the timing of which is illustrated in FIG. 15 (Sheet 12). As described briefly with respect to FIG. 2a, the BYTE ADJUST GENERATOR 192 changes the byte address a first time so as to permit carries to propagate into a first byte subsequent to that into which adding is performed and, additionally, may adjust the byte address so as to designate (and permit carries to propagate into) a second subsequent byte. Following this, the UP–2 BYTE ADJUST line remains energized to the end of the cycle, it being immaterial what the ADJUSTED BYTE CODE is after it has designated the second subsequent byte. However, with reference to FIG. 7, there will be no output from the lowest AND circuit 428 in a CT8 or CT16 operation and, therefore, there will be only a first ASSUME CARRY signal on line 196 as described more fully hereinafter.

At the start of any cycle of operation, the third trigger 433 and maybe the second trigger 432 will be on as a result of having been set in the next preceding operation. In any multiple count operation, the first occurrence in the BYTE ADJUST GENERATOR 192 is the appearance of the RESET BYTE ADJUST signal on line 194, which resets the third trigger 433 and, by application through an OR circuit 434, also resets (if necessary) the second trigger 432. After reset of the triggers 432, 433 an ASSUME CARRY signal on line 196 is applied to an AND circuit 436 for gating with the inverted output of the now-off second trigger 432, which is transmitted over a line 438 through an inverter 440 to the AND circuit 436. This sets the trigger 431, providing a signal on the output lines 442, one of which passes through an OR circuit 444 to provide the initial portion of an UP–1 BYTE ADJUST signal on one of the output lines 190. Simultaneously, a signal on the output line 442 is applied to an OR circuit 446 and inverted by an inverter 448, which is then used to block an AND circuit 450 so as to ensure that there will be no UP–2 BYTE ADJUST signal on the other of the output lines 190 at this time. The ASSUME CARRY signal on the line 196 is also applied to an inverter 452, which blocks an AND circuit 454 so as to render it insensitive to the output of the first trigger 431 on line 442. However, when the ASSUME CARRY signal on line 196 ends, the output of the inverter 452 unblocks the AND circuit 454, permitting the output of trigger 431 on line 442 to set trigger 432 and to simultaneously pass through the OR circuit 446 and the inverter 448 so as to block the UP–2 BYTE ADJUST AND circuit 450. When the second trigger 432 becomes set, it provides an output on a line 438 which resets the first trigger 431. This ends the output signal on lines 442, thereby transferring control over the OR circuit 444 and the OR circuit 446 to the output of the second trigger 432 on lines 438. The output of the second trigger 432 also turns on the third trigger 433; however, since the output of the second trigger 432 is inverted by the inverter 448 and applied to the AND circuit 450, the fact of the third trigger being on is insignificant at this time. Thus, the second trigger maintains the UP–1 BYTE ADJUST signal on one of the lines 190 and also prevents the UP–2 BYTE ADJUST signal on the other of the lines 190 after the first trigger is turned off and the third trigger is turned on. If this were a CT16 instruction, the BYTE ADJUST GENERATOR 192 would remain in this condition with the first trigger 431 off, the second trigger 432 on and the third trigger 433 on, but blocked, resulting in an UP–1 BYTE ADJUST signal and no UP–2 BYTE ADJUST signal on the lines 190. In a CT24 instruction, a second ASSUME CARRY signal is generated (FIG. 7) by the gating of the output of the 180 ns. delay unit 426 through the AND circuit 428. When the second ASSUME CARRY signal appears on line 196, it passes through the OR circuit 434 to reset the second trigger 432. When the second trigger 432 is reset, the signal on line 438 ends, which means that the output on the inverter 448 goes positive and permits the AND circuit 450 to pass the output of the third trigger 433 to the UP–2 BYTE ADJUST line 190. At the same time, since the signal on line 438 has disappeared, there will be no output from the OR circuit 444 and the UP–1 BYTE ADJUST signal will end. In view of the additional logic time (including the OR block 446 and inverter 448) the UP–2 BYTE ADJUST signal will appear just after the UP–1 BYTE ADJUST signal disappears.

BYTE CODE ADJUST

FIG. 9 (Sheet 9) shows the BYTE CODE ADJUST circuit 190 which responds to the BYTE CODE portion of the address signals on lines 178 and the UP–1 and UP–2 BYTE ADJUST lines 190 so as to provide an ADJUSTED BYTE CODE on a plurality of lines 200.

The theory of operation of the byte code adjust circuit 180 is to always leave the address register set as determined by the ADDRESS SIGNALS sent to it from the DP SYSTEM and to adjust the code so as to represent the next higher byte in response to an UP–1 BYTE ADJUST signal, and to adjust the same original code so as to represent a second subsequent byte in response to an UP–2 BYTE ADJUST signal.

The byte code corresponds to the byte address ultimately to be decoded therefrom in such a manner as to provide the decimal equivalent of the binary numbers represented in the code. This is the same situations as that which obtains with respect to the bit code, which was described with reference to FIG. 6. The bytes, and the code bits used to designate the various bytes, are shown in FIG. 9a. It is to be noticed that every other byte, for instance, bytes 1, 3, 5 and 7, each have an A3 bit. Only bytes 2, 3, 6 and 7 have A4 bits, and only bytes 4–7 have an A5 bit. Therefore, it can be seen that, for every UP–1 operation, the A3 bit always must be changed from ONE to ZERO or from ZERO to ONE. The A3 bit is never changed in response to an UP–2 BYTE ADJUST signal. For an UP–1 operation, the A4 bit is changed whenever the A3 bit was previously a ONE; for instance, if a BYTE–1 is changed to BYTE–2, the A4 bit must change from ZERO to ONE and, if a BYTE–3 is changed to a BYTE–4, the A4 bit must be changed from ONE to ZERO; however, if a BYTE–4 is changed to a BYTE–5, the A4 bit remains a ZERO. Also, the A4 bit changes whenever there is an UP–2 signal; specifically, in order to change from a BYTE–2 to a BYTE–4, the A4 bit must be changed from ONE to ZERO, as is true of a change from BYTE–3 to BYTE–5. Similarly, changing from BYTE–0 to BYTE–2, or BYTE–1 to BYTE–3, results in a change of A4 bit from ZERO to ONE. In the same way, the A5 bit is changed from ZERO to ONE only when the A3 and A4 bits are ONE, or, if a BYTE–7 should have to be changed to a BYTE–0 (permitting carry over into a subsequent word, which will be discussed in a later section), the A5 byte is changed from ONE to ZERO when the A3 and A4 bits are both ONE. Thus, the A5 bit is changed whenever there is an UP–1 command and both the A3 and A4 bits are unlike the A5 bit. Similarly, the A5 bit is changed on an UP–2 command whenever the A4 bit is a ONE; thus, a BYTE–2 changed to a BYTE–4 results in changing the A5 bit, as is true when a BYTE–6 is changed to a BYTE–0, or a BYTE–3 is changed to a BYTE–5.

With reference to FIG. 9, consider the adjustment of a code which indicates BYTE–3. A BYTE–3 code has an A1 bit, an A2 bit and no A3 bit. In order to adjust this to BYTE–4, it is necessary to change A1 and A2 from ONES to ZEROS and to change A3 from ZERO to ONE. Therefore, and EXCLUSIVE OR circuit 460 (FIG. 9) will respond to an A3 bit and an UP–1 BYTE ADJUST signal so as to provide no output on the A3 ADJUSTED BYTE CODE line 200; contrariwise, the lack of an A3 bit at the input of an EXCLUSIVE OR circuit 462 will permit the UP-1 BYTE ADJUST LINE 190 to generate a signal on the "not A3" ADJUSTED BYTE CODE line 200.

Since an A4 bit is to be changed any time an UP-2 BYTE ADJUST signal is received, the UP-2 signal on line 190 is applied through an OR circuit 464 to an EXCLUSIVE OR circuit 466, which blocks an A4 bit, and is also passed to an EXCLUSIVE OR circuit 468 so as to generate a "not A4" bit on a line 200 whenever an A4 bit is applied on the input lines 178. Conversely, the UP-2 BYTE ADJUST signal on line 190 passing through the OR circuit 464 would block a "not A4" signal on the input line 178 so the EXCLUSIVE OR circuit 468 will have no "not A4" output on its output line 200, but the output of the OR circuit 464 will pass through the EXCLUSIVE OR circuit 466 so as to generate an A4 output signal on the ADJUSTED BYTE CODE line 200. Since the A4 bit is to be changed on an UP-1 instruction only when there is also an A3 bit, the UP-1 BYTE ADJUST input to the OR circuit 464 is gated with an A3 bit on the line 178 in an AND circuit 470 before passing through the OR circuit 464. Thereafter, the operation of the EXCLUSIVE OR circuits 466 and 468 is as before described. Similarly, an AND circuit 472 ensures that a corresponding OR circuit 474 will respond to an UP-2 signal on the line 190 only when there is also an A4 bit on a line 178 and an AND circuit 476 prevents the UP-1 line 190 from passing through the OR circuit 474 except upon simultaneous presence of A3 and A4 bits on lines 178. In this manner, the UP-1 and UP-2 BYTE ADJUST lines 190 alter the byte portion of the outputs of the address register (FIG. 4) to create the next higher byte than that indicated by the ADDRESS REGISTER in response to an UP-1 signal and to create a byte code designating the second higher byte than that designated by the ADDRESS REGISTER in response to an UP-2 BYTE ADJUST signal.

BYTE DECODE

Figure 10:
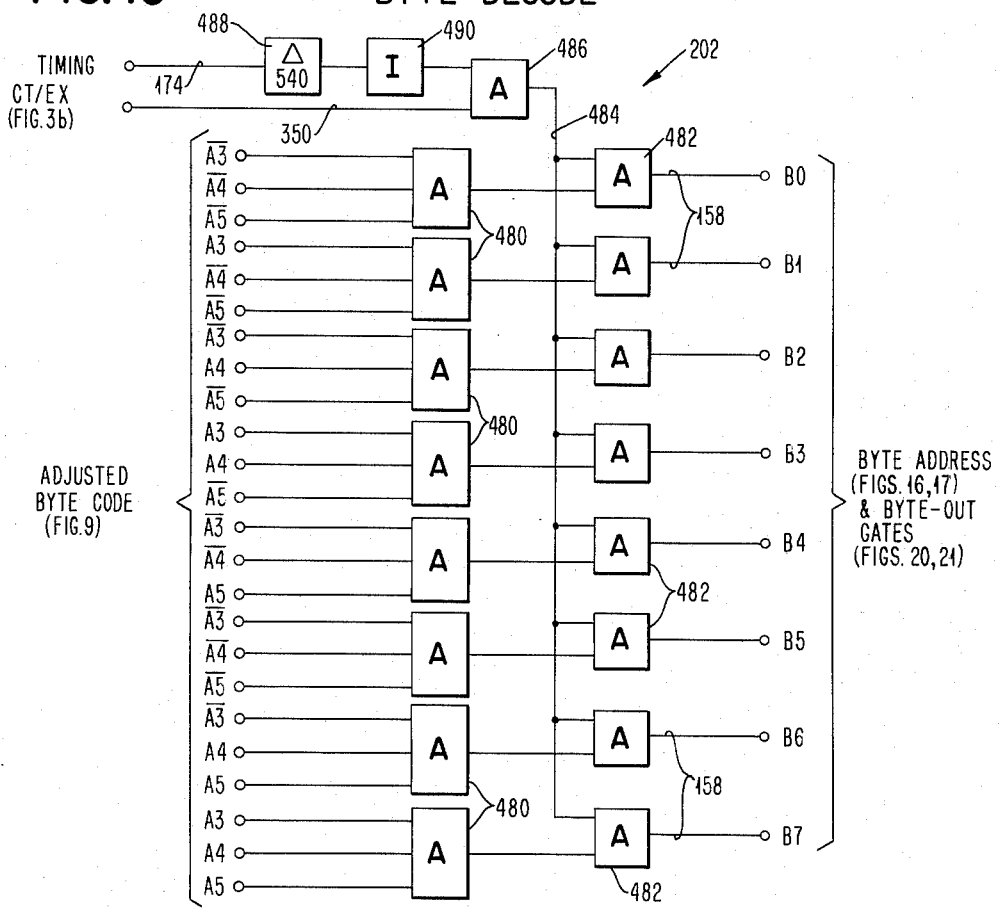
FIG. 10 is a simplified block diagram of a circuit for decoding and gating the byte address codes emanating from the byte code adjust circuit shown in FIG. 9.

FIG. 10 (Sheet 10) shows the BYTE DECODE circuit 202 which utilizes a plurality of AND circuits 480 to combine the true and complement ADJUSTED BYTE CODE bits on lines 200 into a plurality of BYTE ADDRESS SIGNALS and BYTE-OUT GATES on lines 158. This circuit operates the same as the BIT DECODE (FIG. 6) except that the BYTE DECODE circuit 202 has a gated output. The byte decode outputs are gated by a plurality of AND circuits 482 which, in turn, receive the gating input on a line 484 from an AND circuit 486. The AND circuit 486 will have an output only when either a COUNT instruction or an EXIST instruction is designated by the CT/EX signal on line 350. Similarly, the AND circuit will have an output except during a period approximately equal to the TIMING signal on line 174 which is delayed by a 540 ns. delay unit 488 and inverted by an inverter 490. The CT/EX input to the AND circuit 486 ensures that there are no byte gates to read data out of the DATA REGISTER except during either COUNT or EXIST operations. The TIMING input into the AND circuit 486 from the inverter 490 prevents the byte address signals from appearing on lines 158 during a period of time which is between the resets of all of the error circuits, the byte adjust circuit and the overflow circuit (to be described more fully hereinafter), as indicated by the wave-form W-2 in the timing chart of FIG. 2b, and the time when new data is in the DATA REGISTER as indicated by waveform W-6 in FIG. 2b. This prevents data previously stored in the DATA REGISTER from passing into the adder and parity circuits at a time just prior to the time when the desired data is passed into the circuits during a current operation. Therefore, spurious overflow and carry propagations are prevented from occurring, except at a time sufficiently in advance of the time in which the circuits are being used in the current operation so that all of these spurious effects have an opportunity to die out. Therefore, the new data is sent to the adder and parity circuits at a time indicated by waveform W-8 in FIG. 2b, after the BYTE DECODE circuit becomes unblocked, as indicated by the waveform W-5 in FIG. 2b, as a result of the reset of the registers giving way to new data as indicated by waveform W-4 in FIG. 2b.

BYTE DECODE CHECK

Figure 11:
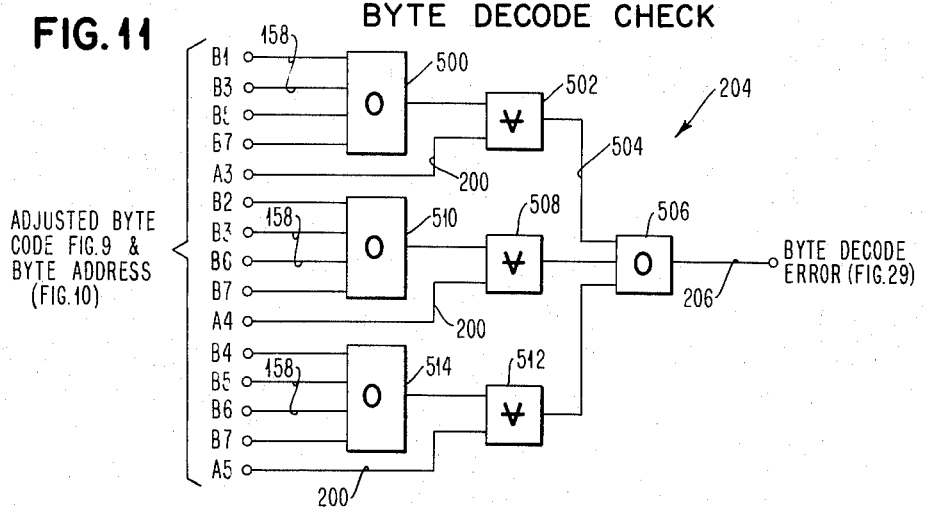
FIG. 11 is a simplified block diagram of a circuit for checking the outputs against the inputs of the byte decode circuit shown in FIG. 10.

FIG. 11 (Sheet 10) shows a BYTE DECODE CHECK circuit 204 which compares the input of the BYTE DECODE CIRCUIT 202 with the output of the BYTE DECODE CIRCUIT. The theory of operation is to take each byte address and compare it to the in-phase adjusted byte code bit used to form that byte address. For instance, the BYTE ADDRESS bits $b1$, $b3$, $b5$, $b7$ are passed through an OR circuit 500 to the input of an EXCLUSIVE OR circuit 502. If an A3 adjusted by code bit is applied over a line 200 simultaneously with an output from the OR circuit 500, the EXCLUSIVE OR circuit 504 will have no signal on its output line 504 and an OR circuit 506 will provide no BYTE DECODE ERROR signal on line 206. However, if the A3 bit is present on line 200, but none of the byte addresses $b1$, $b3$, $b5$ or $b7$ is present, this will indicate a faulty operation of the BYTE DECODE circuit 202 and, since there would be only one input to the EXCLUSIVE OR circuit 502, an output signal on the line 504 will pass through the OR circuit 506 to provide a BYTE DECODE ERROR on line 206. Similarly, the A4 bit is compared in an EXCLUSIVE OR circuit 508 with outputs from an OR circuit 510 and the A5 bit is compared in an EXCLUSIVE OR circuit 512 with the output of an OR circuit 514. The BYTE DECODE CHECK circuit 204 is merely illustrative of the type of checking which may be performed; it is not essential to the present invention. However, the present invention does have means responsive to errors for stopping the operations at pertinent times if errors are indicated in the various circuits which are checked. If desired, no checking at all may be performed, or a far more elaborate checking system could be utilized, depending upon the design and cost criteria of any specific embodiment of the invention.

CARRY-OVERFLOW TIMING GENERATOR

FIG. 12 (Sheet 11) shows a CARRY-OVERFLOW TIMING GENERATOR 142 which converts the TIMING pulse on line 174 into a selected one of a plurality of SUM TIMES on lines 143. The FIRST, SECOND and THIRD SUM TIMES on lines 143 are generated to control the CARRY circuit of FIG. 13 and the COUNT OVERFLOW circuit of FIG. 14, described hereinafter. The TIMING signal 174 is delayed by a 400 ns. delay unit 520 and then applied to the input of an AND circuit 522. This delays the TIMING signal by approximately 400 ns. The output of the delay unit 520 is applied to an inverter 524 and then passed through a 60 ns. delay unit 526 for subsequent application to the other input of the AND circuit 522. The output of the delay unit 526 turns off the AND circuit after approximately 60 ns. so that the two inputs to the AND circuit 522 together provide a shorter delayed derivative of the TIMING signal on line 174. The output of the AND circuit 522 is additionally delayed 170 ns., 270 ns. and 425 ns. by corresponding delay units 528-530.

CARRY CIRCUIT

FIG. 13 (Sheet 11) shows a CARRY circuit 144 which generates SUM LATCH signals on a line 148 in response to the timing signals from FIG. 12 in combination with the instruction signal governing the current operation, depending upon the presence or absence of an OVERFLOW signal on line 133, which designates the propagation of carries past the end of the byte being operated upon. Specifically, the FIRST SUM TIME signal on line 143 is gated by a CT/EX signal on a line 350 within an AND circuit 532 which in turn provides a signal on a line 534. The signal on line 534 passes through an OR circuit 536 and will normally pass through an AND circuit 538 unless an inverted GENERAL ERROR signal appears on a line 540.

The first SUM LATCH signal which may occur is, therefore, generated only in response to timing and instruction signals without regard to any results or functions being performed elsewhere in the apparatus. However, the second and third sum latch signals are generated only if there is an overflow from a first byte into a second byte, within an operation which permits such an overflow (either a COUNT 16 or a COUNT 24). Specifically, an OVERFLOW signal on line 133 is used to selectively gate an AND circuit 544 in response to an OR circuit 546 which, in turn, can pass signals from either of two AND circuits 548, 550. The AND circuit 548 is operative to pass the SECOND SUM TIME signal on line 143 during a CT16–24 instruction, as indicated by a signal on a line 355. Similarly, a THIRD SUM TIME signal on a line 143 may be gated with a CT24 signal on a line 354. Thus, SUM LATCH signals are derived automatically for an EXIST operation and for the first byte of any COUNT operation. SUM LATCH signals are also generated in response to a first OVERFLOW signal for the second byte in a COUNT 16 or a COUNT 24 instruction, and in response to a second OVERFLOW signal for the third byte during a COUNT 24 instruction.

COUNT OVERFLOW

FIG. 14 (Sheet 11) shows the COUNT OVERFLOW circuit 146 which determines when carries are propagated through the first byte in a CT8 instruction, through the second byte in a CT16 instruction, or through the third byte in a CT24 instruction. In other words, the circuit provides an OVERFLOW OF COUNT signal when there is an overflow of a particular count instruction which has been given. Specifically, a trigger 552 is reset (at the time shown by waveform W–2 in FIG. 2b) at the start of each operation. Thereafter, the trigger can be set by outputs from an OR circuit 554 which, in turn, can result from either an AND circuit 556 or an AND circuit 558. The AND circuit 556 responds to the OVERFLOW signal on line 133, the FIRST SUM TIME signal on line 143 delayed by a 100 ns. delay unit 559 and a CT8 instruction on line 352 to provide a signal through the OR circuit 554 to set the trigger 552. Since each of the SUM TIMES occurs before an overflow from the related byte can occur, the SUM TIMES must be delayed to gate the respective OVERFLOWS. This indicates that an OVERFLOW has occurred at a time (delayed FIRST SUM TIME) which is commensurate with the time at which carries would propagate out of the first byte; specifically, an overflow occurring, as shown by the waveform W–10 in FIG. 2b, indicates the carries are propagating through the first byte, which, in a CT8 instruction, means that an overflow of the particular COUNT instruction has occurred. The AND circuit 558 can respond to either of two conditions which may manifest an output from an associated OR circuit 560. The SECOND SUM TIME signal on line 143 will be gated with a CT16 instruction on the line 353 through an AND circuit 562, the output of which is delayed by a 180 ns. delay unit 563 and then pass through the OR circuit 560 to the AND circuit 558. Similarly, the THIRD SUM TIME signal on the line 143 is gated in an AND circuit 564 with a CT24 instruction on the line 354, delayed by a 200 ns. delay unit 566 and then passed through the OR circuit 560 to the AND circuit 558. Therefore, the AND circuit 558 will gate an OVERFLOW signal on line 133 to the trigger 552 if the overflow occurs in the region of the SECOND SUM TIME on a CT16 instruction, or if the OVERFLOW on line 133 occurs in the region of the THIRD SUM TIME in a CT24 operation. A TIMING signal on a line 174 is delayed by a 160 ns. delay unit 570 and applied to an AND circuit 572 together with the output of an inverter 574, which is delayed by a 70 ns. delay unit 576. This supplies a reset signal for the trigger 552 on a line 578. Therefore, the OVERFLOW OF COUNT trigger 552 is reset at the start of each operation automatically and thereafter responds to OVERFLOWS from bytes out of which overflows are not permitted into the next subsequent byte due to the instruction which has been given.

BYTE-IN GATE GENERATOR

FIG. 16 (Sheet 12) shows the BYTE-IN GATE GENERATOR 208 which delays each of the byte address signals B0–B7 on lines 158 by means of a plurality of respectively corresponding 160 ns. delay units 580 and gates the output of the delay units 580 through respective AND circuits 582. The AND circuits respond to a SUM LATCH signal on a line 148 which is extended by being combined in an OR circuit 584 with the output of a 100 ns. delay unit 586 which also responds to the SUM LATCH signal 148. The 100 ns. delay unit 586 widens the SUM LATCH signal so as to provide an ample gate to the AND circuits 582. Thus, BYTE-IN GATES are provided on lines 160 only following the latching of the results of the adder and parity circuitry, as described with reference to FIG. 2a, hereinbefore. This prevents gating into a first register position, a result which is registered in response to data in the next position, in a multicount operation in which a SUM LATCH failed to be generated (for instance, as the result of an error in the next preceding operation, as described more fully hereinafter).

REGISTER RESET GENERATOR

FIG. 17 (Sheet 13) shows the REGISTER RESET GENERATOR 210 which provides various means for resetting either all of the positions of the data register or only those positions within a selected byte. The timing of this circuit is shown in FIG. 18 (Sheet 12). The REGISTER RESET GENERATOR 210 supplies the resetting of individual bytes between latching of the final sum and transmitting the final sum back into the data register, as is described hereinbefore with respect to FIG. 2a. The BYTE RESET signals on lines 162 are gated by a plurality of AND circuits 600 in response to gate signals on a line 602 from an OR circuit 604. The OR circuit can respond either to OVERFLOW signals on a line 133, or to the output of a trigger 606. The trigger 606 is turned on at approximately 200 ns. by a TIMING signal passed through a 200 ns. delay unit 608 and is reset at approximately 820 ns. by the output of a 620 ns. delay unit 610. The trigger 606 is, therefore, on for a time which includes the time at which all of the positions of the register are reset as a matter of course at the beginning of any operation and includes the time in which the selected byte of the register is reset during a CT8 or EXIST operation, or during the first byte portion of CT16 or CT24 operations. After the trigger 606 turns off, additional resets may be provided as necessary, depending upon whether or not there is an overflow from a byte of data so as to require propagation of carries into the next byte of data. The OVERFLOW signal on line 133 permits the resetting of the second or third byte of data in the register as a result of overflow of the first and second bytes of data, respectively.

The input to the BYTE RESET AND circuits 600 is supplied by a plurality of corresponding OR circuits 612, which are adapted to receive the main data reset on a line 614, which is derived from the TIMING signal. The TIMING signal on line 174 is fed to a 250 ns. delay unit 616 and then into an OR circuit 618, which also receives the output from a 50 ns. delay unit 620. The OR circuits 612 may also respond to a plurality of corresponding AND circuits 622 which gate BYTE ADDRESS signals applied on lines 158, after being delayed in a plurality of corresponding 100 ns. delay units 624. A gating signal on a line 626 permits the selected BYTE AD- DRESS signal on one of the lines 158 to pass through the corresponding one of the AND circuits 622. This occurs in response to timing signals supplied to an AND circuit 628 by an OR circuit 630, provided no GENERAL ERROR signal on the line 272 blocks the AND circuit 268 after inversion in an inverter 632. The TIMING signal input to the OR circuit 630 is delayed so as to cause it to correspond with the various times at which the different byte positions of the data register must be reset in order to permit entry of altered data back into the DATA and PARITY REGISTERS at the end of a COUNT or EXIST operation. This is achieved by delaying the TIMING signal on a line 174 in a 690 ns. delay unit 634 and limiting the width of the timing signal to 100 ns. by means of an inverter 636, a 100 ns. delay unit 638 and an AND circuit 640. The output of the AND circuit 640 is applied to a 120 ns. delay unit 642 and then gated with a CT16–24 instruction on the line 355 in an AND circuit 644. The output of the AND circuit 640 is also applied to a 240 ns. delay unit 646, the output of which is gated with a CT24 instruction on the line 354 by an AND circuit 648. This provides a series of three pulses approximately 120 ns. apart, all of which are 100 ns. wide and delayed at least 690 ns. from the start of the TIMING signal.

Referring to the timing diagram of FIG. 15, the various waveform relationships are shown. Specifically, the fact that the byte address is shifted to a second byte designation at 700 ns., which is the time at which the CT8 reset is to take place, requires that the byte address signals on line 158 be delayed by the 100 ns. delay units 624 so that the shift in the byte address as the result of the UP–1 BYTE ADJUST signal will not cause a different selected one of the lines 158 to energize a different corresponding AND circuit 622 until about 800 ns. A similar situation exists with respect to the UP–2 BYTE ADJUST signal.

DP AND MEMORY GATES

FIG. 19 (Sheet 14) shows the DP AND MEMORY GATE circuit 264 which generates the gates controlling the flow of information between the DATA REGISTER, the MEMORY and the DP SYSTEM. An EXTRACT instruction on a line 357 is applied to a 450 ns. delay unit 680 which generates the DP DATA OUT GATE on a line 682. Similarly, a STORE instruction on the line 358 is applied to a 900 ns. delay unit 684, which generates the DP DATA IN GATE on a line 686. A TIMING signal on a line 174 is applied to a 420 ns. delay unit 690 which generates a MEMORY DATA IN GATE on a line 692.

The MEMORY DATA OUT GATE on a line 694 comprises the output of an AND circuit 696, which is extended by a 50 ns. delay unit 698 applied to an OR circuit 600. The AND circuit 696 is a gate which blocks instructions if a general ERROR signal on a line 272 causes the output of an inverter 702 to block the AND circuit by means of a line 704. The AND circuit 696 derives its signals from an OR circuit 706 which generates the different MEMORY DATA OUT GATES.

The AND circuit 708 will provide a MEMORY DATA OUT GATE in response to an EXTRACT instruction on a line 357 provided that the output of an inverter 712 indicates that a COUNT or EXIST operation is not simultaneously being performed, as indicated by a CT/EX signal on a line 350. This will occur approximately 700 ns. after the start of the operation is indicated by a TIMING signal on the line 174, as determined by a 700 ns. delay unit 714.

The AND circuit 709 will generate a MEMORY DATA OUT GATE as the result of a CT8 instruction on the line 352, an EXIST instruction on a line 351, or a STORE instruction on a line 353. Also, if there is no carry from a first byte in a multiple count operation, the AND circuit 709 could be gated by a CT16–24 instruction on the line 355 passing through an AND circuit 716 whenever there is an output from an inverter 718, thereby indicating that there is no OVERFLOW signal on line 133. Therefore, an OR circuit 720 will gate the AND circuit 709 so as to pass the output of an 860 ns. delay unit 722 in response to a TIMING signal during any single-byte COUNT or instruction, or a STORE or EXIST instruction.

The AND circuit 710 is gated by the output of an OR circuit 723 which, in turn, may respond to a CT16 instruction on a line 353, or to the output of an AND circuit 724. The OVERFLOW line 133 passes through inverter 726, so as to pass a CT24 instruction on a line 354 whenever there is no OVERFLOW from the second to the third byte. Therefore, the AND circuit 710 can be gated in response to any two-byte operation, whether this be in a CT16 operation or in a CT24 operation in which there is no carry from the second into the third byte. The AND circuit 710 responds to a TIMING signal output from a 1060 ns. delay unit 728.

The AND circuit 711 responds to a CT24 instruction on a line 354 and the output of 1260 ns. delay unit 730, which indicates the end of a three-byte operation.

In summation, the DP AND MEMORY GATE circuit 264 generates DP DATA IN and OUT GATES automatically. The DP DATA OUT GATE sends data to the DP SYSTEM in response to an EXTRACT instruction; this may or may not be accompanied by a special function instruction (such as CT16 or EXIST). The data is gated to the DP SYSTEM early in the machine cycle whether or not it is to be altered by a special function operation. However, if no special function is to be performed, the data will be regenerated by being sent back into the MEMORY (as a result of an output from the AND circuit 708) much earlier than altered data will be returned to the MEMORY (as a result of a COUNT or EXIST operation causing an output from one of the AND circuits 709–711).

The DP DATA IN GATE is generated only in response to a STORE instruction, which identifies the fact of putting new data, theretofore not available, into the MEMORY. The MEMORY DATA IN GATE causes the data to be received in the DATA and PARITY REGISTERS at just the same time as the MEMORY DATA OUT GATE apears as a result of the STORE instruction gating the AND circuit 709; the data therefore flows directly from the DP SYSTEM, through the registers and into the MEMORY.

The MEMORY DATA OUT GATE on line 694 is the same as the MEMORY "NOT BUSY" signal on line 252, either of which may be utilized to control writing data back into the memory. Referring to the bottom of FIG. 2b, a CT8 instruction will cause a MEMORY DATA OUT GATE, and therefore also cause a MEMORY "NOT BUSY" signal at about 700 ns. A CT16 instruction will cause a "NOT BUSY" signal at no later than about 900 ns. time, and a CT24 instruction will cause a "NOT BUSY" signal at not later than approximately 1300 ns. time. Therefore, the special functions require no more time than that necessary to perform the operation selected. Further, since the AND circuit 709 can respond to a CT16 or a CT24 if there is no first OVERFLOW, and the AND circuit 710 can similarly respond to a CT24 with no second OVERFLOW, the cycle-time is automatically kept at the minimum required to perform the selected operation on the particular data involved.

DATA REGISTER

FIG. 20 (Sheets 16–17) shows the DATA REGISTER 100 (partially broke away) which comprises a plurality of gated triggers 750–756, each of which is set by the output of a respectively corresponding OR circuit 757–763. Each of the OR circuits 757–763 responds to the output of a respectively corresponding AND circuit 764–770 to pass bits from the DP SYSTEM on lines 104 to set the triggers 750–756. Similarly, a plurality of AND circuits 771–777 gates data from the MEMORY on corresponding lines 116 to the triggers 750–756. Further, a plurality of AND circuits 778–784 selectively gate corresponding ADDER SUM bits on lines 154 into the triggers 750, 756. Only those AND circuits 778–784 corresponding to ones of the triggers 750–756 which relate to a byte of data indicated by the BYTE-IN GATE signals on line 160 will pass ADDER SUM bits through to the respective triggers. Each of the triggers 750–756 is reset by signals on a corresponding BYTE RESET line 162 (from FIG. 7). The outputs of the triggers 750-756 are each connected to a group of respectively corresponding AND circuits, including AND circuits 785–791 which gate data from the triggers 750–756 to the DP DATA OUT lines 114 for transmission to the DP system of FIG. 1d. Similarly, AND circuits 792–798 gate data from the triggers 750–756 to the MEMORY DATA OUT lines 126 for transmission to the MEMORY shown in FIG. 1b. Further, each of the AND circuits 1000–1006 gates the output of a respectively corresponding trigger 750–756 to a corresponding ADDER DATA bit line 1007–1013.

The triggers 750–752 represent BYTE–0 of the DATA REGISTER and each of the triggers respectively corresponds to one of the bits (BIT–0 through BIT–7) within BYTE–0. Similarly, the trigger 753 represents BIT–0 of BYTE–1. Triggers 754–756 represent BIT–0, BIT–6 and BIT–7 of BYTE–7, respectively. The bit output lines 1007, 1010 and 1011 are each joined (together with other BIT–0 lines not shown) in a trunk of eight bit lines 1014 which feeds an OR circuit 1016. Therefore, the output of the OR circuit 1016 on the BIT–0 ADDER DATA line 128 may be derived from any of the BIT–0 triggers 750, 753 or 754 (or other BIT–0 triggers not shown). Similarly, the BIT–1 line 1008, and other BIT–1 lines (not shown), are connected by a trunk of eight lines 1018 to an OR circuit 1020 for providing the BIT–1 ADDER DATA on one of the lines 128. Also, the BIT–7 lines 1009 and 1013 (together with other BIT–7 lines not shown) are connected by a trunk of eight lines 1022 to an OR circuit 1024 for providing the BIT–7 ADDER DATA output on one of the lines 128. The triggers are reset by associated BYTE RESET signals on lines 162. Triggers 750, 751 and 752 are reset by the BYTE–0 BYTE RESET; trigger 753 is reset by the BYTE–1 BYTE RESET; and triggers 754, 755 and 756 are reset by the BYTE–7 BYTE RESET.

PARITY REGISTER

FIG. 21 (Sheet 18) shows the PARITY REGISTER 102 which is very similar in structure to the DATA REGISTER 100 shown in FIG. 20. Specifically, a gated trigger 1030–1032 is provided for each byte position of the DATA REGISTER 100. The trigger 1030 stores the parity bit designation for BYTE–0 and the trigger 1032 stores the parity bit for BYTE–7. Parity bits from the DP SYSTEM on lines 108 are gated into the triggers by respectively corresponding AND circuits 1033–1036; the parity bits from the MEMORY on lines 120 are gated into the triggers 1030–1032 by means of respectively corresponding AND circuits 1037–1039, and the UPDATED PARITY bit on line 156 is gated to the proper one of the triggers 1030–1032 by respectively corresponding AND circuits 1040–1042. Similarly, the parity bits stored in the triggers 1030–1032 are selectively gated back to the DP SYSTEM by respectively corresponding AND circuits 1043–1045, or to the MEMORY by respectively corresponding AND circuits 1046–1048. Further, the parity bit of the selected byte is gated to a respectively corresponding parity bit line 1049–1051 by related AND circuits 1052–1054. The parity bit lines 1049–1051 are joined in a trunk of eight lines 1055 which feeds an OR circuit 1056, the output of which comprises the ADDER PARITY on line 152. Thus, adder parity can be derived from any of the triggers 1030–1032 which, in turn, could have derived the parity either from the UPDATED PARITY line 156 or from the DP SYSTEM or the MEMORY. Also, all of the triggers may be simultaneously set by the FORCE ALL PARITY line 164, which is energized whenever a cleared storage location is read into the register.

FIRST SUM GENERATOR

FIG. 22 (Sheet 19) shows the FIRST SUM GENERATOR 130 which combines a bit address (the addend) on a selected one of the BIT ADDRESS lines 150 with a corresponding one of the ADDER DATA bits (the augend) on the lines 128 so as to provide "sums" S0–S7 on lines 129 and "carries" C0–C7 on lines 131 for use in the OVERFLOW GENERATOR 132 (FIG. 23) and the FINAL SUM GENERATOR 134 (FIG. 24). The BIT ADDRESS lines 150 are all gated through corresponding AND circuits 1060 by the COUNT instruction signal on line 356. This ensures that the BIT ADDRESS will not combine with ADDER DATA so as to generate "sums" and "carries" except during a COUNT operation, which is essentially an adding operation. Each of the AND circuits will provide a signal on a corresponding output line 1062–1069 in dependence upon the corresponding one of the BIT ADDRESS lines 150 applying an address to that particular AND circuit. None of the output lines 1062–1069 will have a signal thereon unless the COUNT line 356 has a signal indicating a COUNT instruction. Further, any one of these output lines will have a signal thereon only if the corresponding BIT ADDRESS line 150 is energized; for instance, the output line 1065 will have an output thereon only if the BIT ADDRESS $b3$ is present on line 150.

A plurality of EXCLUSIVE OR circuits 1071–1078 are provided to generate "sums" on respectively corresponding ones of a plurality of sum lines 129. Each EXCLUSIVE OR circuit responds to a corresponding ADDER DATA bit D0–D7 on a line 128 and to signals on a respectively corresponding one of the output lines 1062–1069. The EXCLUSIVE OR circuits 1071–1078 will provide no output if neither input signal is present, or if both input signals are present; contrariwise, each EXCLUSIVE OR circuit 1071–1078 will generate an output signal on the respectively corresponding one of the "sum" lines 129 if either the related adder data bit or the related gated bit address on one of the lines 1062–1069 is present at the input thereof, provided both are not present. A plurality of AND circuits 1080–1087 similarly respond to the same inputs as do the EXCLUSIVE OR circuits 1071–1078 corresponding therewith. As an example, if a bit address $b4$ is present on a line 150 and a COUNT instruction is present on line 356, only the line 1066 will be energized as an output from the AND circuits 1060. This means that, of all the AND circuits, only the AND circuit 1084 could possibly have an output (a "carry") therefrom since the remainder of the lines 1062–1065 and 1067–1069 are not energized. Furthermore, only the EXCLUSIVE OR circuit 1075 could possibly have a novel sum generated on its output line since all the other EXCLUSIVE OR circuits 1071–1074 and 1076–1078 will be responding only to the ADDER DATA lines 128. In other words, the output from the EXCLUSIVE OR circuit 1075 will be a ZERO only if there is a D4 ADDER DATA bit, and all the other EXCLUSIVE OR circuits will provide signals on their output lines 129 in dependence only upon whether or not there is a related ADDER DATA BIT D0–D3 and D5–D7 on the corresponding lines 128.

OVERFLOW GENERATOR

FIG. 23 (Sheet 20) shows the OVERFLOW GENERATOR 132 which responds to the original ADDER DATA and to the "carries" generated in the FIRST SUM GENERATOR (FIG. 22) so as to determine whether or not a "carry" will propagate to the end of the byte and indicate an "overflow" from that byte into the next byte. Specifically, the OVERFLOW GENERATOR recognizes a "carry" from any one of the AND circuits 1080–1087 (FIG. 22) and compares the "carry" out of that bit with the presence or absence of data bits in all subsequent bit positions to determine whether or not a carry out of that bit would ripple through successive bits and indicate a carry out of the particular byte which is being altered. For instance, a carry out of the AND circuit 1080 (FIG. 22) will combine with the presence of ADDER DATA bits D1–D7 (bits indicating the binary ONE) so as to provide an output from an AND circuit 1090 to an OR circuit 1092, the OR circuit thereby presenting an input to an OVERFLOW latch 1094 which may be selectively gated by the SUM LATCH signal on line 148 to cause the fact of an overflow to be latched therein. The OVERFLOW latch may be of the same type as that indicated in FIG. 30, which was described hereinbefore to respond to a signal input (for instance, on line 1093 in FIG. 23) in dependence upon whether or not a bit was present on the line 1093 only when gated by a latching signal (for instance, the SUM LATCH signal on line 148 in FIG. 23). Similarly, a "carry" output from AND circuit 1081 (FIG. 22) is combined in an AND circuit 1096 with each of the subsequent ADDER DATA bits D2–D7 on lines 128 so as to designate a "carry" out of the byte being operated upon in response to a "carry" generated in BIT–1 together with there being one bit in each subsequent bit position in the byte. In a like manner, carries out of each of the AND circuits 1082–1086 are gated through respectively corresponding AND circuits 1097–1101 with subsequent ADDER DATA bits. The carry out of the AND circuit 1087 (FIG. 22) is not gated with anything since a "carry" out of the highest order bit position axiomatically is a "carry" out of the byte.

FINAL SUM GENERATOR

FIG. 24 (Sheet 21) shows the FINAL SUM GENERATOR 134 which combines "sums" and "carries" from FIG. 22 and ADDER DATA from FIG. 20 so as to generate the final sum in each bit position, taking into account "carries" from antecedent bit positions. The theory of operation of the FINAL SUM GENERATOR will be developed along with the explanation of the structure of which it is comprised. Specifically, each bit position has a latch 1104–1111 which responds to a logical combination of: the sum for that bit position on a line 129; carries from antecedent positions; and data from positions between the carry position and the instant bit position. The sum latch 1104 responds only to a sum signal S0 for the lowest order bit on the line 129. This is necessarily so since there are no bit positions antecedent to the BIT–0 position. The sum latch 1105 is connected by a line 1114 to the output of an EXCLUSIVE OR circuit 1116. Since the final sum of the BIT–1 position may change if there is a carry out of the BIT–0 position, the "sum" for the BIT–1 position on a line 129 and the "carry" from the BIT–0 position C0 on the line 131 are applied to the input of the EXCLUSIVE OR circuit 1116. Thus, if there is no "sum" in the BIT–1 position, there will be no signal on line 129 so that, if there is a carry out of the BIT–0 position on the line 131, there will be an output on the line 1114 to the latch 1105. On the other hand, if there were a signal on the line 129 and, if there were also a carry signal C0 on line 131, the EXCLUSIVE OR circuit 1116 would provide no output on the line 1114 to the latch 1105. Furthermore, if there were no "carry" from the BIT–0 position, there would be no carry signal C0 on line 131 so that the "sum" for the BIT–1 position S1 on line 129 could pass through the EXCLUSIVE OR circuit; however, if there also were no S1 signal on line 129, there would be no output on line 1114. The latch 1106 receives the "sum" for the BIT–2 position over a line 1118 from an EXCLUSIVE OR circuit 1120. In the BIT–2 position, in order to determine whether or not the "sum" bit S2 on line 129 should be changed in the EXCLUSIVE OR circuit 1120, it is necessary to take into account not only a carry directly over from the BIT–1 position, as indicated by a carry signal C1 on line 131, but also to take into account the possibility of a carry out of the BIT–0 position and the presence of a data bit in the BIT–1 position, which are indicated by a signal on the carry line C0 131 and a signal on the ADDER DATA line D1 128, both of which feed an AND circuit 1122. If there is a "carry" out of the BIT–0 position, this means that a ONE had to be added into the BIT–0 position and, since the device can only add ONE into a single position at a time (that position indicated by the BIT ADDRESS), there could be no "carry" out of the BIT–1 position (or any other position) simultaneously with a "carry" out of a BIT–0 position. This being so, it is unnecessary to take into account the first "sum" in the BIT–1 position when determining whether or not the "carry" out of the BIT–0 position will ripple through to the BIT–2 position. Therefore, the presence of a "carry" signal C0 together with an ADDER DATA bit D1 indicates that a "carry" has rippled to the BIT–2 position and the output of the AND circuit 1122 will pass through an OR circuit 1124 to the EXCLUSIVE OR circuit 1120. Of course, a "carry" C1 will pass directly through the OR circuit 1124.

Similarly, the latch 1107 registers the BIT–3 "sum" which is passed over a line 1126 from an EXCLUSIVE OR circuit 1128. In generating the BIT–3 final sum, the EXCLUSIVE OR circuit 1128 takes into account a "carry" signal C2 from the BIT–2 position on line 131, which is passed through an OR circuit 1130 to the EXCLUSIVE OR circuit 1128. The OR circuit 1130 can also respond to an AND circuit 1132 which is responsive to a carry signal C1 on a line 131 from the BIT–1 position, together with an ADDER DATA bit D2 on a line 128. The OR circuit 1130 is also responsive to a carry out of the BIT–0 position as indicated by a carry signal C0 on line 131, together with ADDER DATA in the BIT–1 position, as indicated by an ADDER DATA signal D1 on a line 128, and an ADDER DATA signal from the BIT–2 position D2 on a line 128, all of which must satisfy the input requirements of an AND circuit 1134 in order to pass through the OR circuit 1130 to the EXCLUSIVE OR circuit 1128. Thus, if there is a "carry" out of the BIT–0 position, and data bits in the BIT–1 and BIT–2 positions of the ADDER DATA (as it reached the FINAL SUM GENERATOR), then the final sum of the BIT–3 position has to be changed to indicate the fact of that carry since it ripples through the BIT–1 and BIT–2 data bit positions to the BIT–3 position. Similarly, a "carry" out of the BIT–1 position will ripple to the BIT–3 position if there is a data bit in the BIT–2 position, which would be indicated by the AND circuit 1132.

The latch 1108 responds to a signal on a line 1136 from an EXCLUSIVE OR circuit 1138. The theory of operation in generating a final sum for the fourth bit position in the latch 1108 is the same as that for the anteceding bit positions. That is, an AND circuit 1140 responds to a "carry" C0 out of the BIT–0 position, together with data bits D1, D2 and D3 in the BIT–1, BIT–2, and BIT–3 positions. Another AND circuit 1142 responds to a "carry" bit C1 out of the BIT–1 position and data bits D2 and D3 out of the BIT–2 and BIT–3 positions. Similarly, an AND circuit 1144 responds to a "carry" bit C2 out of the BIT–2 position and a data bit D3 in the BIT–3 position. An OR circuit 1146 can respond to the outputs of any of the AND circuits 1140–1144, or to a "carry" bit C3 out of the BIT–3 position to supply one of the inputs into the EXCLUSIVE OR circuit 1138, thus generating the FINAL SUM for the BIT–4 position.

The OR circuit 1146 is also connected to a line 1147 which actually designates a "carry" from the lowest four bit positions into the highest four bit positions, and renders it unnecessary to continue generating individual "carries" at each bit position. In other words, the "carry" out of the BIT-3 position, which is the output signal on the line 1147, designates that some one of the AND circuits 1140–1144 has had an output, or that there has been a "carry" bit out of the BIT-3 position. Therefore, it is unnecessary to generate these signals repetitively. The "carry" out of the low "half" of the FINAL SUM GENERATOR on line 1147 is combined in the AND circuit 1148 with a data bit D4 on the line 128 to provide one of the inputs to an OR circuit 1150. The other input to the OR circuit 1150 is a "carry" bit out of the BIT-4 position. The OR circuit 1150 feeds an EXCLUSIVE OR circuit 1152 so as to combine with the "sum" from the BIT-5 position S5 on line 129 and thereby generate a FINAL SUM in the latch 1109.

The circuitry utilized to generate a FINAL SUM for the BIT-6 position, which circuitry would supply signals to the latch 1110 has been eliminated for simplicity. This circuitry would be substantially identical to that shown for the BIT-3 position which supplies the input to the latch 1107.

The latch 1111 receives a signal over a line 1154 from an EXCLUSIVE OR circuit 1156. The EXCLUSIVE OR circuit 1156 responds to a "sum" signal for the BIT-7 position S7 on a line 129 and to the output of an OR circuit 1158. The OR circuit 1158 is responsive to each of three AND circuits 1160, 1162, 1164 and to a "carry" from the BIT-6 position C6 on line 131. The AND circuit 1160 combines the carry out of the first half of the FINAL SUM GENERATOR on a line 1147 with data bits D4–D6 on lines 128; the AND circuit 1162 combines a carry signal out of the BIT-4 position C4 on the line 131 with data bits D5 and D6 on lines 128; and the AND circuit 1164 combines a carry signal C5 from the BIT-5 position on a line 131 with a D6 data bit on a line 128.

All of the latch circuits 1104–1111 are rendered responsive to the final sum inputs thereto by a SUM LATCH signal on line 148. For instance, the output of the EXCLUSIVE OR circuit 1128, which generates the final sum for the BIT-3 position on line 1126, will not be set into the latch 1107 unless gated by the SUM LATCH on line 148. After sufficient time has passed for all of the logical circuits to present final sums to the input of the respectively corresponding latch 1104–1111, the SUM LATCH signal selectively gates the final sums into the respective latches. Prior to the time that the SUM LATCH signal on line 148 appears, each latch may contain either a ONE or a ZERO irrespective of whether or not a ONE or a ZERO (or vice versa) is present on the final sum input line thereto. In other words, the latch 1107 may have a ONE stored therein and a ZERO may be present on the line 1126 (that is, there may be no output signal from the EXCLUSIVE OR circuit 1128). When the SUM LATCH signal appears on line 148, the latch would respond to the lack of a signal (i.e., a ZERO) on line 1126 and, although there was a ONE stored therein, now there will be a ZERO stored therein until some subsequent time when a SUM LATCH signal may again appear on line 148. Stated alternatively, each latch 1104–1111 will follow the input thereto whenever the SUM LATCH signal is applied, and will maintain that input until the next time that the SUM LATCH signal is applied. The output of each of the sum latches 1104–1111 is passed through a respectively corresponding OR circuit 1170–1177 together with the output of a respectively corresponding one of a plurality of AND circuits 1180–1187. The OR circuits 1170–1177 actually provide the EXIST function by either passing a final sum from the latches 1104–1111 or the output of the AND circuit 1180–1187 to the ADDER SUM lines 154. The AND circuits 1180–1187 each gate a respectively corresponding one of the BIT ADDRESS signals b0–b7 on lines 150 with an EXIST instruction on a line 351. Thus, in an EXIST operation, a particular one of the BIT ADDRESS signals b0–b7 will become an "EXIST-generating" bit by selectively passing through one of the OR circuits 1170–1177 and thereby creating a signal at the respectively corresponding one of the ADDER SUM lines 154 without regard to whether or not there is a signal input to the OR circuit from the respectively corresponding one of the latches 1104–1111. Thus, in a sense, the final sum generator is also the "EXIST-generator." Note that the latches 1104–1111 will be storing merely ADDER DATA in an exist operation, since no bit address signal would have been gated into the FIRST SUM GENERATOR because the EXIST and COUNT instructions are mutually exclusive.

COUNT PARITY PREDICT

FIG. 25 (Sheet 22) shows the COUNT PARITY PREDICT circuit 136, which compares the original ADDER DATA from FIG. 20 (the augend) with the BIT ADDRESS which identifies the particular bit into which a ONE is added (the addend) so as to determine not what the answer will be, but whether or not any answer will occur which will require updating of parity. In fact, the logic involved in the circuit is such as to supply a DO NOT UPDATE COUNT PARITY signal on the line 137 whenever parity can remain the same as it was when the ADDER DATA came from the DATA REGISTER. Alternatively, if no signal appears on the line 137, the parity will be updated.

Referring to FIG. 25a, an augend with five ONES and three ZEROS therein is shown having a ONE added into the third-from-lowest order bit position (which corresponds to BIT-2 in the subject embodiment). The augend 10011101 has five ONES in it and, therefore, is odd. The sum 1100001 has 3 bits in it and is therefore also odd. The ONE (addend) was added into a bit position (BIT-2 position) which had an even number of ONES in subsequent higher order bit positions (BIT-3, BIT-4) followed by a ZERO in the third higher order bit positino (BIT-5). Therefore, a ONE added into a bit position of the augend, which bit position together with consecutive ONES in subsequent higher order bit positions totals an odd number, will retain the same parity that it had prior to adding the ONE therein.

FIG. 25b illustrates adding into a bit position (in this case, the BIT-1 position) of an augend 10011111. The bit position into which the ONE is added in this case has three additional subsequent higher ordered bit positions (BIT-2, BIT-3, BIT-4) with ONE therein, meaning that the addend bit position together with subsequent higher order bit positions having ONES total an even number. The augend 10011111 has six ONES, an even number, whereas the sum 10100001 has three ONES, an odd number. Therefore, when a ONE is added into the lowest of an even-numbered string of ONES, the parity must be changed.

FIG. 25c illustrates the effect on parity whenever a ONE is added into a bit position of the augend which is a ZERO. Since ONE and ZERO equal ONE without a carry, there is invariably an additional ONE in the sum than there was in the augend and, therefore, the parity bit always has to be changed.

Since it is easier to take into account only the situation in FIG. 25a (that is, adding into the lowest of an odd number of ONES in the augend) than it is to account for both the situations in FIG. 25b (adding into the lowest bit position in the augend which comprises a series of even number of ONES) and in FIG. 25c (which comprises adding a bit position of the augend which has a ZERO therein), the circuit of FIG. 25 recognizes those conditions designated in FIG. 25a (where parity is not affected) and thereby generates a signal which says DO NOT UPDATE COUNT PARITY on the line 137.

A plurality of AND circuits 1200–1206 each corresponds to the fact of adding into one of the six lowest ordered bit positions BIT-0, BIT-6. The basic logic can be derived with reference to FIG. 25a. No and circuit corresponding to AND circuits 1200–1206 is provided and, therefore, no input to OR circuit 1208 is provided to account for addition into the BIT-7 position since any addition into the BIT-7 position will automatically require an updating of parity. For instance, if there were a ZERO in the BIT-7 position of the augend and a ONE were added into it, then there would be a ONE in the sum which would not otherwise appear. Similarly, if there were a ONE in the BIT-7 position of the augend, and a ONE were added to it, this would change the BIT-7 position of the sum to a ZERO, the resulting "carry" would propagate into the next byte, as an "overflow" and thereby not effect the sum in the present byte. Adding into the BIT-6 position will not change parity if there were a ONE in the BIT-6 position since this will cause a "carry" into the BIT-7 position and a carry into the BIT-7 position will either change a ONE to a ZERO or a ZERO to a ONE, which will counterbalance the corresponding change in the BIT-6 position. If there were a "carry" from the BIT-7 position as a result of the "carry" out of the BIT-6 position, this "carry" will not affect the parity of the existing byte (the augend) since this will be "carried" over into the next byte or carried off as an OVERFLOW OF COUNT. Therefore, the AND circuit 1206 responds to a BIT ADDRESS $b6$ on line 150 (indicating the addend) and an ADDER DATA bit D6 on a line 128 (indicating the BIT-6 position of the augend) to generate a signal passing over a line 1207, through the OR circuit 1208, to the line 137, to indicate that the count parity should not be updated. Note that there can be no output from any other ones of the AND circuits 1200–1205 if there is an output from the AND circuit 1206 since each of these AND circuits responds (as described more fully hereinafter) only if an associated AND circuit (yet to be introduced) has a BIT ADDRESS input on a line 150. Since there is only one BIT ADDRESS made available to any of these circuits at one time, it is therefore impossible for more than one of the AND circuits 1200–1206 to have an output at a single time. This follows, since the FIRST SUM and FINAL SUM GENERATORS operate by way of adding only a single-bit addend into an eight-bit augend. The AND circuit 1205 corresponds to the BIT-5 position of the augend and responds to a BIT ADDRESS signal $b5$ on a line 150 together with an ADDER DATA signal D5 on one of the lines 128 and the lack of ADDER DATA in the BIT-6 position, which is indicated by a "not D6" signal on another of the lines 128, to supply an output on a line 1209 to the OR circuit 1208. In terms of logic, this means the AND circuit 1205 will generate a signal indicating that parity should not be updated if the addend adds a ONE into the BIT-5 position of the augend, when the augend has a ONE therein, and the BIT-6 position of the augend has a ZERO. This follows from FIG. 25a since adding into a bit position of the augend for which the next subsequent higher ordered bit position has a ZERO therein, is adding into a bit position of the augend which, together with the subsequent higher ordered bit positions which contain a ONE, comprises an odd number. (In this case, there are no higher ordered bit positions with a ONE and, therefore, the bit position of the augend into which the ONE is added equals an odd number by itself.) The logical circuits which provide outputs from the remainder of the AND circuits 1200–1203 operate similarly, except the expressions become more and more complicated as a result of the fact that, adding into a much lower ordered bit position requires taking cognizance of more subsequent higher-ordered bit positions in order to determine whether or not there is an odd number of subsequent higher-ordered bit positions with a ONE contained in them. By way of example, the input to the AND circuit 1200, which is the most complicated, will be examined in greater detail. The expression for the circuit of FIG. 25a when the addend is a ONE in the BIT-0 position is as follows:

$(b0D0)(\overline{D1}+D1D2\overline{D3}+D1D2D3D4\overline{D5}$
$+D1D2D3D4D5D6)$

Using the Boolean algebra axioms:
$(A+\overline{A}B)=(A+B)$, and $(A+BC)=(A+B)(A+C)$,
and by factoring, this equation is reduced as follows:

$(b0D0)(\overline{D1}+D2\overline{D3}+D2D3D4\overline{D5}+D2D3D4D5D6)$
$(b0D0)(\overline{D1}+D2(\overline{D3}+D3D4\overline{D5}+D3D4D5D6))$
$(b0D0)(\overline{D1}+D2(\overline{D3}+D4(\overline{D5}+D5D6)))$
$(b0D0)(\overline{D1}+D2(\overline{D3}+D4(\overline{D5}+D6)))$
$(b0D4)(\overline{D1}+D2((\overline{D3}+D4)(D3+\overline{D5}+D6)))$
$(b0D0)(\overline{D1}+D2)(\overline{D1}+\overline{D3}+D4)(\overline{D1}+\overline{D3}+\overline{D5}+D6)$ Thus, it is seen that the expression on the first line has two functions added together, one of which requires a plurality of OR circuits, and three of the four inputs to the one of the OR circuits would be outputs from AND circuits. This means that it would require three levels of logic in order to generate the function in the first line. The function in the last line can be generated with two levels of logic and with fewer input connections. Inasmuch as one of the objectives of the present embodiment is to perform special functions within as little time as possible (significantly less time than that required to send data to a computing unit to perform the functions thereon, and, further, equal to or very little more than the time required to merely extract the information and send it on its way towards the computing unit), the elimination of one level of logic in this particular circuit is a great advantage. Furthermore, since the objective (of eliminating the time necessary to propagate information from the storage unit to the computing unit) requires that circuitry be located as close as possible to the MEMORY unit, the simplification resulting in elimination of circuitry is also significant. The AND circuit 1200 in FIG. 25 responds to the last line of Boolean algebra (supra) as follows: The $(b0D0)$ function is performed in an AND circuit 1216; the $(\overline{D1}+D2)$ function is performed in an OR circuit 1218; the $(\overline{D1}+\overline{D3}+D4)$ function is performed in an OR circuit 1220, and the $$(\overline{D1}+\overline{D3}+\overline{D5}+D6)$$

function is performed in an OR circuit 1222. The logic for the AND's and OR's which feed the other AND circuits 1201–1204 can be similarly developed, each of the functions being simpler and requiring less equipment, as shown.

EXIST PARITY PREDICT

FIG. 26 (Sheet 22) shows the EXIST PARITY PREDICT circuit 128 which generates a signal on a line 139 in response to EXIST operations which do not require an updating of parity. An OR circuit 1224 responds to a plurality of AND circuits 1226, each of which responds to respectively corresponding BIT ADDRESS and ADDER DATA signals on lines 150 and 128, respectively. Thus, in an EXIST operation, if there is a bit "existing" in a particular bit position of a byte of data, and the BIT ADDRESS causes a bit to be ORed into that particular bit position, the bit position will remain the same and, therefore, parity need not be updated. On the other hand, if, for instance, the BIT-2 position has no data stored therein, there will be no $b2$ signal on a line 150 so that the corresponding AND circuit 1226 will be blocked and there will be no output as a result thereof from the OR circuit 1224. Since there cannot possibly be a BIT ADDRESS applied to any other AND circuit (the BIT ADDRESS selects only one particular bit position to perform the EXIST operation) there will be no other inputs to the OR circuits 1224 and, therefore, no DO NOT UPDATE EXIST PARITY signal will appear on line 139.

PARITY UPDATE

FIG. 27 (Sheet 23) shows the PARITY UPDATE circuit 140 which responds to the "DO NOT UPDATE . . . PARITY" signals from FIGS. 25 and 26 so as to either update parity or not update parity as required. A latch 1228 (which corresponds to the FINAL SUM latches 1104–1111 in the FINAL SUM GENERATOR, in FIG. 24, and to the OVERFLOW latch 1094, in FIG. 23) registers the finalized parity in response to a SUM LATCH signal on the line 148, and generates an UPDATED PARITY signal on a line 156. Although the output on line 156 is called "UPDATED PARITY," it may or may not be the same as the ADDER PARITY bit supplied from the PARITY REGISTER (FIG. 21) over the line 152. The input to the latch 1228 is derived from an EXCLUSIVE OR circuit 1230 which, in turn, receives an ADDER PARITY signal on a line 152 and the output of an OR circuit 1232 over a line 1234. The ADDER PARITY on line 152 is the same parity which accompanied the particular byte of data into the DATA REGISTER. The OR circuit 1232 is responsive to either of two AND circuits 1236 or 1238. The AND circuit 1236 is responsive to a COUNT instruction on a line 356 and to a signal on the line 1240 which comprises the output from an inverter 1242. The inverter 1242 inverts a DO NOT UPDATE COUNT PARITY signal (from FIG. 25) on line 135. Therefore, if there is a DO NOT UPDATE COUNT PARITY signal on line 135, there will be no signal on line 1240 and the AND circuit 1236 will have no output therefrom. Similarly, AND circuit 1238 responds to a signal on line 1244 which is the output of an inverter 1246. The inverter 1246 inverts a DO NOT UPDATE EXIST PARITY signal on line 139 (from FIG. 26). Thus, if there is a DO NOT UPDATE EXIST PARITY signal, there will be no signal on line 1244 and, therefore, no output from the AND circuit 1238. The AND circuit 1236 will pass a signal from the line 1240 only if a count instruction is present on line 356. Therefore, although the COUNT PARITY PREDICT circuit of FIG. 25 may generate an output signal on line 137, this signal will not be recognized unless a COUNT operation is being performed. Similarly, the EXIST PARITY PREDICT circuitry of FIG. 26 may also perform a parity predicting operation and derive a signal on line 139 but this signal will not be recognized except during an EXIST operation. It follows that, in order to get a signal on line 1234, there must be either a COUNT or EXIST operation being performed and, if a COUNT operation is being performed, there must be no DO NOT UPDATE COUNT PARITY signal on line 137. Similarly, in order to get a signal on line 1234 during an EXIST operation, there must be no DO NOT UPDATE EXIST PARITY signal on line 139. The signal on line 1234 will change the ADDER PARITY signal on line 152 from a ZERO to a ONE or from a ONE to a ZERO by means of the EXCLUSIVE OR circuit 1230. Therefore, if parity is to be updated and no ADDER PARITY signal appears on line 152, the EXCLUSIVE OR circuit 1230 will send a signal to the latch 1228; conversely, if there is an ADDER PARITY signal on line 152, the EXCLUSIVE OR circuit 1230 will not send a signal to latch 1228. If no signal appears on the line 1234, which designates the fact that ADDER PARITY is not to be updated, the EXCLUSIVE OR circuit will pass either a ZERO or a ONE on the line 152 to the latch 1228 so that the output of the latch on line 156 will be the same as the input to the EXCLUSIVE OR circuit 1230 on the line 152. Therefore, although the output of the latch 1228 on line 156 is called "UPDATED PARITY," it may in fact be a "non-updated" parity bit in the case when parity is not to be updated, or a changed parity bit in a case where parity is to be updated.

ADDER CHECK

FIG. 28 (Sheet 23) shows the ADDER CHECK circuitry 157, which operates in a manner similar to the address parity check circuitry of FIG. 4 and the BYTE DECODE CHECK circuit of FIG. 11. Specifically, the UPDATED PARITY signal on line 156 (from FIG. 27) is compared with the ADDER SUM (from FIG. 24) to determine whether or not an error occurred either in deriving the ADDER SUM in FIGS. 22 and 24 or in deriving the UPDATED PARITY in FIGS. 25–27: the ADDER CHECK circuitry 157 cannot distinguish between them. If there is an error, an EXCLUSIVE OR circuit 1250 will be blocked, giving no signal on a line 1252, so that the output of an inverter 1254 will provide an ADDER ERROR signal on the line 159. The EXCLUSIVE OR circuit 1250 responds to the UPDATED PARITY and the output of an EXCLUSIVE OR tree which compares the ADDER SUM bits. Specifically, an EXCLUSIVE OR circuit 1256 receives signals from two EXCLUSIVE OR circuits 1258 and 1260. The EXCLUSIVE OR circuit 1258 derives its inputs from two EXCLUSIVE OR circuits 1262 and 1264. The EXCLUSIVE OR circuit 1262 will have no output therefrom if both the BIT–0 and BIT–1 of the ADDER SUM on lines 154 are ONES, or if both of them are ZEROES. However, if only one of these bits is a ONE, then there will be an output from the EXCLUSIVE OR circuit 1262. Therefore, an output from the EXCLUSIVE OR circuit designates an odd number of bits. Similarly, the EXCLUSIVE OR circuit 1264 will have an output therefrom if the total of BIT–2 and BIT–3 is an odd number, the EXCLUSIVE OR circuit 1266 will have an output therefrom if the total of BIT–4 and BIT–5 is an odd number, and the EXCLUSIVE OR circuit 1268 will have an output therefrom if the total of BIT–6 and BIT–7 is an odd number. The EXCLUSIVE OR circuit 1258 will have no output if both EXCLUSIVE OR circuits 1262 and 1264 supply inputs thereto, or if neither of them do. Therefore, EXCLUSIVE OR circuit 1258 will have a signal only if the sum total of BIT–0, BIT–1, BIT–2 and BIT–3 is an odd number. Similarly, EXCLUSIVE OR circuit 1260 will have an output therefrom only if the sum total of BIT–4, BIT–5, BIT–6 and BIT–7 is an odd number. It follows that there will be a signal on a line 1270 only if there is an odd number of bits in the ADDER SUM on lines 154. If there is an odd number of bits, this means that parity is correct without a parity signal and, therefore, there should be no UPDATED PARITY bit on the line 156. If, in fact, there is no signal on line 156, there will an output from the EXCLUSIVE OR circuit on line 1252 so that there will be no output from the inverter 1254 on line 159. On the other hand, if an erroneous UPDATED PARITY bit does appear on line 156, the EXCLUSIVE OR circuit 1250 will blocked because of having both inputs thereto and, there being no signal on line 1252, the inverter 1254 will supply an ADDER ERROR SIGNAL on line 159. Similar operation obtains when there is no signal on line 1270, indicating an even number of bits.

GENERAL ERROR

FIG. 29 shows the GENERAL ERROR circuitry 270, which gates the errors derived from the INSTRUCTION REGISTER parity check in FIG. 3a, the ADDRESS REGISTER parity check of FIG. 4, the BYTE DECODE check in FIG. 11 and the ADDER CHECK of FIG. 28. A GENERAL ERROR signal on line 150/272 represents the output of a trigger 1272, the trigger being set in response to the output of an OR circuit 1274 which, in turn, can pass any of the aforementioned errors. The trigger 1272 guarantees that, once an error has been detected, the error will continue to be indicated until steps are taken in the DP SYSTEM to either re-perform an operation or determine the malfunction. It should be remembered that the checking circuits of FIGS. 3a, 4, 11 and 28 are only representative of the type of checks which may be performed, the actual checks to be installed in any given embodiment being immaterial to this operation. The checking circuits are shown to illustrate the type of error checks which may be utilized in conjunction with the special function generation which is the concern of this invention.

Referring to the TIMING CHART in FIG. 2b, it can be seen with reference to waveform W-2 that the error trigger is reset before any other function is performed. This is accomplished by a signal on a line 1276 (FIG. 29) which comprises a TIMING signal on line 124, delayed by a 160 ns. delay unit 1278, and limited in width by an inverter 1280, a 70 ns. delay unit 1282 and an AND circuit 1284, as described hereinbefore. Referring again to FIG. 2b, the waveform W-3 indicates that the second occurrence in a sequence of operations is the gating of the instruction and address errors. This is accomplished by a TIMING signal on line 174, which is delayed by a 250 ns. delay unit 1286 and limited in width by an inverter 1288, a 100 ns. delay unit 1290 and an AND circuit 1292. The output of the AND circuit 1292 feeds an AND circuit 1294 which can pass either an INSTRUCTION ERROR on the line 254 or an ADDRESS ERROR on the line 176, each of which is transmitted to the AND circuit 1294 through an OR circuit 1296. The BYTE DECODE ERROR is gated somewhat later, as shown by the waveform W-7 in FIG. 2b, since the BYTE DECODE circuit is blocked until about 420 ns., as shown by the waveform W-5. Therefore, the output of the AND circuit 1292 is also passed through a 300 ns. delay unit 1298 to an AND circuit 1300 which gates the BYTE DECODE ERROR on line 206. Thus, the OR circuit 1274 will respond to INSTRUCTION, ADDRESS or BYTE DECODE errors only after a time within which the corresponding error signals would, in fact, represent an error in the final desired INSTRUCTION, ADDRESS or BYTE ADDRESS, respectively. An AND circuit 1302 gates the ADDER ERROR in somewhat more complex manner since there are three times at which the adder may generate separate results and, therefore, three separate possibilities for error have to be recognized. Therefore, the delayed and limited TIMING signal output from the AND circuit 1284 is passed through a 650 ns. delay unit 1304, an 860 ns. delay unit 1306 and a 980 ns. delay unit 1308, the outputs of which each pass through an OR circuit 1310 to gate the adder error on line 159 through the AND circuit 1302. Each of these times correspond with (but is slightly later than) a time at which the ADDER CHECK circuit will compare a corresponding ADDER SUM and UPDATED PARITY, as indicated by the waveforms W-14, W-27 and W-39 in FIG. 2b.

In order to provide the first sum (i.e., CT8 or EXIST, or the first byte of CT16 or CT24) as soon as possible, the CARRY circuit (FIG. 13) provides a SUM LATCH signal without waiting for an OVERFLOW so as to latch the ADDER SUM and the UPDATED PARITY as soon as they are generated. Therefore, the ADDER ERROR signal is too late to prevent latching the first byte, but will prevent latching of the second and third bytes. Similarly, an ADDER ERROR generated in operations performed on the third byte of a CT24 will be too late to prevent the erroneous results from being latched. However, ADDER ERROR generated in response to operations on any of the bytes is available soon enough to block the MEMORY DATA OUT GATE associated with the byte (FIG. 19), so that the erroneous altered data will not be returned to the MEMORY, as illustrated by waveforms W-12 and W-43, W-25 and W-44, and W-38 and W-45 in FIG. 2b.

While the invention has been particularly shown and described with reference to preferred embodiments thereof, it will be understood by those skilled in the art that various changes in form and details may be made therein without departing from the spirit and scope of the invention.

What is claimed is:

1. In a data processing system of the type having a main memory apparatus in which data designating manifestations are stored, a memory cycle control device comprising:
 a function performing means selectively operable to perform different functions on data manifestations;
 means for selectively propagating data from said memory to said function performing means;
 function control means for designating different operations to be performed on said data manifestations by said function performing means, different ones of said operations requiring different amounts of time, at least one of said operations requiring a different amount of time when performed on different data manifestations;
 timing means responsive to said function control means for returning data to said memory apparatus at a time commensurate with the maximum time required to perform operations indicated by said control means;
 and means responsive to the result of said operations and controlling said timing means for foreshortening the time at which data is returned to said memory apparatus in response to completion of the operations being performed.

2. In a data processing apparatus, a variable memory cycle control, comprising:
 a memory means for storing manifestations of data, said memory means adapted to receive and render available said manifestations;
 operation means for performing operations in response to data manifestations, said operation means designating results of operations performed by developing different signals indicative thereof, said operation means conditionally operative to respond to data manifestations and to render data manifestations available to said memory means;
 translating means interconnecting said memory means and said operation means for translating data between said memory and said operation means;
 means for generating a plurality of controlling signals in timed relationship to one another, including memory gate signals for determining a time at which data manifestations may be received from said memory means and a plurality of times at which data manifestations may be returned to said memory means by said operation means;
 means responsive to said controlling signals for conditioning said operation means to respond to data manifestations originating in said memory means and applied to said operation means by said translating means;
 means responsive to a selected one of said controlling signals to condition said operation means to render data manifestations available to said translation means for translation to said memory means;
 and means responsive to said operation means for selecting one of said controlling signals to control the translation of data manifestations from said operation means to said memory means at one of said plurality of times.

3. In a data processing apparatus of the type having a data memory unit and means for performing operations in response to data stored in said memory unit, a variable memory cycle control, comprising:
 a memory means for storing manifestations of data, said memory means including means for propagating manifestations to and from said memory means;

operation means for performing result-determining operations in response to manifestations, said operation means providing different signals indicative of different results, said operation means including means conditionally operative to receive manifestations from said memory means and additional means conditionally operative to render said memory means responsive to said operation means to receive and store data therefrom;

control means for generating a plurality of first and second controlling signals in timed relation, said controlling signals including at least a first signal for designating a time at which said operation means is responsive to data manifestations propagated thereto by said memory means and a plurality of second signals for designating different times at which said memory is selectively responsive to said operation means;

and cycle control means for applying said first signal to said operation means and responsive to said different signals for selecting one of said plurality of signals and for applying said selected signal to said operation means, said cycle control means thereby selecting the time at which said operation means is rendered operative to control said memory means.

4. A data processing apparatus of the type in which a plurality of data designating words are each represented by a group of manifestations arranged in a sequence of ordered bit positions, comprising:

a summing means for generating a sum as a function of the data designation manifested by one of said groups, said summing means having a plurality of augend bit positions, one for each bit position in a group, said summing means operable to manifest an indication of a carry out of the highest ordered bit position thereof;

register means for storing a word comprised of a plurality of said groups;

memory means for storing a plurality of said words;

translating means operable to translate said groups between said memory means and said register means, said translating means being time-responsive to translate groups from said memory means to said register means and conditionally operable to translate manifestations from said register means to said memory means, said control means being externally controlled to designate the time at which a data word is to be translated from said register means to said memory means, said control means selectively operating said translating means to translate said data words from said register means to said memory means;

and means responsive to said summing means for operating said control means in the absence of a manifestation indicating a carry from the highest ordered bit position of said summing means, whereby a data word is translated to said memory means in advance of the time indicated by said control means, selectively, in dependence upon the absence of a carry out of said summing means.

5. In a data processing apparatus, a variable memory cycle control, comprising:

a memory means for storing manifestations of data, said memory means conditionally operable to receive and render available said manifestations;

operation means for performing operations in response to data manifestations, said operation means designating results of operations performed by developing different signals indicative thereof, said operation means conditionally operable to respond to data manifestations and to render data manifestations available to said memory means;

translating means interconnecting said memory means and said operation means for translating data between said memory means and said operation means;

means for generating a plurality of controlling signals in timed relationship to one another, including memory gating signals for determining a time at which data manifestations may be extracted from said memory means and a plurality of times at which data manifestations may be stored in said memory means;

means responsive to said controlling signals for conditioning said memory means to exact data manifestations and for conditioning said operation means to respond to data manifestations extracted from said memory means and applied to said operation means by said translating means;

means responsive to a selected one of said controlling signals to condition said operation means to render data manifestations available to said translation means for translation to said memory means and to condition said memory means to store said data manifestations;

and means responsive to the different signals generated by said operation means for selecting one of said controlling signals to control the translation of data manifestations to said memory means and the storage of said manifestations therein at said plurality of times.

6. A data processing apparatus, comprising:

a memory responsive to reading control signals for reading information manifestations therefrom and responsive to writing control signals for entering information manifestations therein;

timing control means for producing a memory reading control signal and a memory writing control signal in a spaced time relationship for controlling said memory;

operational means responsive to manifestations read from said memory upon reading thereof, said means operable after a time interval to supply manifestations to said memory for storage therein, the length of said time interval being variable in accordance with operations performed on said information by said operational means;

and means responsive to operations performed on said manifestations by said operational means for controlling said timing control means to vary the period between said reading and writing control signals in accordance with said variable time interval.

7. In a data processing apparatus of the type having a data memory unit and means for performing operations in response to data stored in said memory unit, a variable memory cycle control, comprising:

a memory means conditionally operable to store and exact manifestations of data, said memory means including means for propagating manifestations to and from said memory means;

operation means for performing result-determining operations in response to manfestations, said operation means providing different signals indicative of different results, said operation means including means for receiving manifestations from said memory means and additional means for rendering said memory means responsive to said operation means to receive and store data therefrom;

control means for generating a plurality of first and second controlling signals in timed relation, said controlling signals including at least a first signal for designating a time at which said memory means is operative to exact data manifestations for propagation said operation means and a plurality of second signals for designating different times at which said memory is selectively operative to store data manifestations in response to said operation means;

and cycle control means for applying said first signal to said memory means and responsive to said different signals for selecting one of said plurality of signals and for applying said selected signal to said memory means, said cycle control means thereby selecting the time at which said memory means is rendered responsive to said operation means to store data manifestations.

8. In a data processing apparatus, a variable memory cycle control, comprising:
a memory means for storing manifestations of data, said memory means conditionally operable to receive and render available said manifestations;
operation means for performing operations in response to data manifestations, said operation means designating results of operations performed by developing different signals indicative thereof, said operation means responsonding to said rendering data manifestations available to said memory means;
translating means interconnecting said memory means and said operation means for translating data between said memory and said register means;
means for generating a plurality of controlling signals in timed relationship to one another, including memory gating signals for determining a time at which data manifestations may be extracted from said memory means and a plurality of times at which data manifestations may be stored in said memory means;
means responsive to said controlling signals for conditioning said memory means to exact data manifestations originating in said memory means for application to said operation means by said translating means;
means responsive to a selected one of said controlling signals to condition said memory means to store data manifestations translated to said memory means from said operation means by said translation means;
and means responsive to said operation means for selecting one of said controlling signals to control the storing of data manifestations in said memory means at one of said plurality of times.

9. In a data processing system of the type in which data manifestations are arranged in a numerically significant sequence of bit positions in groups called bytes, the bytes thereby having a numerically significant sequence identified by the position is said sequence of the data manifestations contained therein, the bytes of data manifestations being stored in a memory unit, each byte being selectively retrievable from the memory unit for propagation to a function-performing unit, the data designations propagated to said function-performing unit controlling the operations thereof, the function-performing unit selectively performing operations on selected ones of said data designations in response to instruction and address control signals provided by the data processing system to the function-performing unit, comprising:
means for performing a function on first and second bytes of said data designations, in sequence, one after the other, the function performed yielding significantly different results in dependence upon the data content of said bytes;
means for translating first and second bytes to said function-performing means in sequence, one after the other;
and means responsive to the result of performance of a first function on said first byte for selectively recognizing the result of performance of said function on said second byte or terminating said operation in dependence upon the results of performance of an operation on said first byte, alternatively.

10. A data processing apparatus of the type in which a plurality of data designations are each represented by a group of manifestations arranged in a sequence of ordered bit positions, comprising:
a summing means for generating a sum as a function of the data designation manifested by one of said groups, said summing means having a plurality of augend bit positions, one for each bit position in said sequence, said summing means operable to manifest an indication of a carry out of the highest ordered bit position thereof;
register means for storing a word comprised of a plurality of said groups;
transmitting means for transmitting said groups between said summing means and said register means;
latching means conditionally operable to manifest a sum generated by said summing means;
control means responsive to said summing means for operating said latching means, said control means operating said latching means to manifest a sum generated by said summing means in response to a manifestation indicating a carry from the highest ordered bit position of said summing means.

11. A data processing apparatus in which data is manifested in an ordered sequence of bit positions, the bit positions being divided into similar groups, the bit position sequence in a first group being a continuous extension of the bit position sequence in an adjacent group, comprising:
an adder having an augend capacity equal to the size of each of said groups, said adder propagating carries through successive bit positions therein and manifesting an overflow indication in response to a carry propagating out of the highest ordered bit position thereof;
latch means responsive to said adder and conditionally operable to manifest the sum resulting from operations performed by said adder;
means for translating to said adder successive ones of said groups in timed sequence;
time control means for assuming a carry into one of said groups by adding into the lowest bit position of said adder;
and sum latch means for manifesting said sum in said latch means, said sum latch means causing said latch means to manifest a first sum resulting from addition performed on a first one of said groups automatically, said sum latch means causing said latch means to manifest a subsequent sum resulting from an assumed carry into a subsequent one of said groups from a first one of said groups selectively, in dependence upon the presence of an overflow manifestation from said adder.

12. Data processing apparatus of the type in which a sequence of data manifestations are arranged in similar groups, comprising:
timing control means including means for developing different control signals at differential times;
an adder responsive to said timing control means having an augend capacity equal to the size of one of said groups, said adder developing an overflow designation in response to a carry propagating out of the highest ordered position thereof in response to addition performed on any one of said groups;
register means for storing said groups;
address means for designating a first one of said groups;
means responsive to said address means and said timing control means for propagating selected ones of said groups from said register means to said adder;
address adjusting means responsive to said address means and said timing control means for controlling the group selected by said propagating means, said address adjusting means initially designating said first group and thereafter, in response to timing control signals, designating a group subsequent in said sequence to said first group, said timing control means causing said first group to be propagated to said adder and thereafter causing said subsequent group to be propagated to said adder;
and means for manifesting the results of addition on any one of said groups, said means automatically manifesting the results of adding to a first group in response to said timing control means and being responsive to an overflow designation for manifesting the results of addition on a subsequent group, selectively, in response only to said overflow designation.

13. A data processing apparatus of the type in which a plurality of data designating words are each represented by a plurality of data-significant groups of manifestations, each group arranged in a sequence of ordered bit positions, comprising:

register means for storing a word comprised of a plurality of said groups;

timing means for providing a plurality of controlling signals in a sequential timed relationship;

a summing means having a plurality of augend bit positions, one for each bit position in a group, and responsive to a single bit position addend, said addend being selectively addressable to any of the bit positions of said summing means, said summing means capable of manifesting an indication of a carry propagation out of the highest ordered bit position thereof;

sum latching means conditionally operable to manifest a sum resulting from operations performed by said adder;

group address means for registering a manifestation of a first one of said groups;

translating means responsive to said group address means and said timing means for selectively translating one of said groups from said summing means to said register at a first time;

means responsive to said timing means and said group address means for causing said translating means to propagate a group to said adder which is next in sequence to the group manifested in said group address means at a second time subsequent to said first time;

bit address means for manifesting an addend at a selected bit position within said summing means during a period of time inclusive of said first time;

means responsive to said timing means for manifesting said addend at the lowest ordered bit position of said adder notwithstanding the manifestation of said bit address means, during a period of time inclusive of said second time;

control means responsive to said timing means and said summing means for operating said latching means, said control means being externally controlled to designate the number of said groups through which carries may propagate, said control means selectively operating said latching means to manifest the sums generated by said summing means, said control means automatically latching the result of an addition performed by said summing means upon said selected group in response to a timing signal generated at the end of said first time and before said second time, and for thereafter selectively manifesting the results of the addition to said second group of data with the addend applied to the lowest ordered bit position of said adder in response to a timing signal generated at the end of said second time;

and means responsive to the carry indication manifested by said summing means for operating said control means in response to a manifestation indicating a carry from the highest ordered bit position of said summing means, whereby a sum is manifested by said latching means automatically for a first group and selectively in dependence upon a carry out of said summing means for a subsequent group.

References Cited by the Examiner
UNITED STATES PATENTS

| | | | |
|---|---|---|---|
| 2,914,248 | 11/1959 | Ross et al. | 235—157 |
| 2,914,681 | 11/1959 | Steele | 307—88.5 |
| 2,969,469 | 1/1961 | Richards | 307—88.5 |
| 3,014,660 | 12/1961 | Patterson et al. | 235—157 |
| 3,017,091 | 1/1962 | Ulrich | 235—153 |
| 3,021,063 | 2/1962 | Von Kummer | 235—153 |

ROBERT C. BAILEY, *Primary Examiner.*

WALTER W. BURNS, Jr., *Examiner.*

UNITED STATES PATENT OFFICE

CERTIFICATE OF CORRECTION

Patent No. 3,222,652                                              December 7, 1965

Fred E. Sakalay

It is hereby certified that error appears in the above numbered patent requiring correction and that the said Letters Patent should read as corrected below.

Column 42, lines 9, 52 and 67 and column 43, line 27, for "exact", each occurrence, read -- extract --; column 43, line 14, for "responsonding" read -- responding --.

Signed and sealed this 20th day of December 1966.

(SEAL)

Attest:

ERNEST W. SWIDER                                        EDWARD J. BRENNER

Attesting Officer                                              Commissioner of Patents